US008589290B2

(12) United States Patent  
Baskerville

(10) Patent No.: US 8,589,290 B2
(45) Date of Patent: Nov. 19, 2013

(54) SYSTEMS AND METHODS TO IDENTIFY CARRIER INFORMATION FOR TRANSMISSION OF BILLING MESSAGES

(75) Inventor: Daniel Baskerville, San Francisco, CA (US)

(73) Assignee: Boku, Inc., San Francisco, CA (US)

( * ) Notice: Subject to any disclaimer, the term of this patent is extended or adjusted under 35 U.S.C. 154(b) by 0 days.

(21) Appl. No.: 13/207,721

(22) Filed: Aug. 11, 2011

(65) Prior Publication Data

US 2012/0041870 A1    Feb. 16, 2012

Related U.S. Application Data

(60) Provisional application No. 61/372,830, filed on Aug. 11, 2010.

(51) Int. Cl.
*G06Q 40/00* (2012.01)

(52) U.S. Cl.
USPC .......................................................... 705/39

(58) Field of Classification Search
USPC .......................................................... 705/39
See application file for complete search history.

(56) References Cited

U.S. PATENT DOCUMENTS

| | | | |
|---|---|---|---|
| 5,283,829 A | 2/1994 | Anderson | |
| 5,708,422 A | 1/1998 | Blonder et al. | |
| 5,845,260 A | 12/1998 | Nakano et al. | |
| 5,905,873 A | 5/1999 | Hartmann et al. | |
| 5,914,472 A | 6/1999 | Foladare et al. | |
| 5,953,710 A | 9/1999 | Fleming | |
| 6,227,447 B1 | 5/2001 | Campisano | |
| 6,282,276 B1 | 8/2001 | Felger | |
| 6,302,326 B1 | 10/2001 | Symonds et al. | |
| 6,473,808 B1 | 10/2002 | Yeivin et al. | |
| 6,612,488 B2 | 9/2003 | Suzuki | |
| 6,704,409 B1 | 3/2004 | Dilip et al. | |
| 6,718,178 B1 | 4/2004 | Sladek et al. | |
| 6,788,771 B2 | 9/2004 | Manto | |
| 6,807,410 B1 | 10/2004 | Pailles et al. | |

(Continued)

FOREIGN PATENT DOCUMENTS

GB    2379525    3/2003
JP    2007109014    4/2007

(Continued)

OTHER PUBLICATIONS

"International Application No. PCT/US2011/029760", International Search Report and Written Opinion, Oct. 28, 2011.

(Continued)

*Primary Examiner* — Lindsay M. Maguire
(74) *Attorney, Agent, or Firm* — Stephen M. De Klerk

(57) ABSTRACT

In one aspect, a system includes an interchange with a data storage facility. The interchange includes a common format processor and a plurality of converters to interface with a plurality of different controllers of mobile communications. The converters are configured to communicate with the common format processor in a common format and to communicate with the controllers in different formats. The interchange is to receive a request identifying a phone number, a payment amount and a payee, and in response, use a pinging message to determine telecommunication carrier information of the phone number, select a converter, determine a set of premium messages in accordance with the telecommunication carrier information, and use the selected converter to transmit the set of premium messages to the phone number to collect funds to pay the payee on behalf of a user of the mobile phone.

19 Claims, 32 Drawing Sheets

(56) References Cited

U.S. PATENT DOCUMENTS

| | | |
|---|---|---|
| 6,928,558 B1 | 8/2005 | Allahwerdi et al. |
| 6,965,872 B1 | 11/2005 | Grdina |
| 6,996,409 B2 | 2/2006 | Gopinath et al. |
| 7,013,125 B2 | 3/2006 | Henrikson |
| 7,080,049 B2 | 7/2006 | Truitt et al. |
| 7,089,208 B1 | 8/2006 | Levchin et al. |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,386,477 B2 | 6/2008 | Fano |
| 7,413,119 B2 | 8/2008 | Kubo et al. |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,527,192 B1 | 5/2009 | Chaskin et al. |
| 7,558,777 B1 | 7/2009 | Santos |
| 7,660,772 B2 | 2/2010 | Verkama |
| 7,748,614 B2 | 7/2010 | Brown |
| 7,752,135 B2 | 7/2010 | Brown et al. |
| 7,792,518 B2 | 9/2010 | Trioano et al. |
| 7,848,500 B2 | 12/2010 | Lynam et al. |
| 7,848,980 B2 | 12/2010 | Carlson |
| 7,870,044 B2 | 1/2011 | Robertson |
| 7,870,077 B2 | 1/2011 | Woo et al. |
| 7,890,433 B2 | 2/2011 | Singhal |
| 8,073,774 B2 | 12/2011 | Pousti |
| 8,116,730 B2 | 2/2012 | Smith |
| 8,245,044 B2 | 8/2012 | Kang |
| 8,280,906 B1 | 10/2012 | Lillibridge et al. |
| 2001/0003093 A1 | 6/2001 | Lundin |
| 2001/0037264 A1 | 11/2001 | Husemann et al. |
| 2002/0013727 A1 | 1/2002 | Lee |
| 2002/0016769 A1 | 2/2002 | Barbara et al. |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0111908 A1 | 8/2002 | Milberger et al. |
| 2002/0120582 A1 | 8/2002 | Elston et al. |
| 2002/0193094 A1 | 12/2002 | Lawless et al. |
| 2003/0065525 A1 | 4/2003 | Giachhetti |
| 2003/0119478 A1 | 6/2003 | Nagy et al. |
| 2003/0125969 A1 | 7/2003 | Kizer et al. |
| 2003/0126076 A1 | 7/2003 | Kwok |
| 2003/0212601 A1 | 11/2003 | Silva et al. |
| 2004/0019564 A1 | 1/2004 | Goldhwaite et al. |
| 2004/0044582 A1 | 3/2004 | Chowdhary |
| 2004/0122685 A1 | 6/2004 | Bunce |
| 2004/0185827 A1 | 9/2004 | Parks |
| 2004/0230527 A1 | 11/2004 | Hansen et al. |
| 2004/0248596 A1 | 12/2004 | Panchal |
| 2004/0252814 A1 | 12/2004 | Eakin |
| 2005/0055296 A1 | 3/2005 | Hattersley et al. |
| 2005/0055309 A1 | 3/2005 | Williams |
| 2005/0086164 A1 | 4/2005 | Kim et al. |
| 2005/0177442 A1 | 8/2005 | Sullivan et al. |
| 2005/0177517 A1 | 8/2005 | Leung et al. |
| 2005/0197892 A1 | 9/2005 | Bilibin et al. |
| 2005/0199709 A1 | 9/2005 | Linlor |
| 2005/0245257 A1 | 11/2005 | Woodhill |
| 2006/0018450 A1 | 1/2006 | Sandberg-Diment |
| 2006/0121880 A1 | 6/2006 | Cowsar et al. |
| 2006/0131390 A1 | 6/2006 | Kim |
| 2006/0206709 A1 | 9/2006 | Labrou et al. |
| 2006/0248011 A1 | 11/2006 | Hecht-Nielsen |
| 2006/0253335 A1 | 11/2006 | Keena et al. |
| 2006/0258331 A1 | 11/2006 | Syrett et al. |
| 2006/0259438 A1 | 11/2006 | Randle et al. |
| 2006/0276171 A1 | 12/2006 | Pousti |
| 2006/0294025 A1 | 12/2006 | Mengerink |
| 2007/0005467 A1 | 1/2007 | Haigh et al. |
| 2007/0011104 A1 | 1/2007 | Leger et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0063017 A1 | 3/2007 | Chen et al. |
| 2007/0094080 A1 | 4/2007 | Wiken |
| 2007/0118477 A1 | 5/2007 | Graves et al. |
| 2007/0123219 A1 | 5/2007 | Lovell, Jr. |
| 2007/0123229 A1 | 5/2007 | Pousti |
| 2007/0124490 A1 | 5/2007 | Kalavade et al. |
| 2007/0130025 A1 | 6/2007 | Nakajima |
| 2007/0130044 A1 | 6/2007 | Rowan |
| 2007/0133768 A1 | 6/2007 | Singh |
| 2007/0156517 A1 | 7/2007 | Kaplan et al. |
| 2007/0168462 A1 | 7/2007 | Grossberg |
| 2007/0175978 A1 | 8/2007 | Stambaugh |
| 2007/0198510 A1 | 8/2007 | Ebanks |
| 2007/0203792 A1 | 8/2007 | Rao |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tummianaro et al. |
| 2007/0250711 A1 | 10/2007 | Storey |
| 2007/0255653 A1 | 11/2007 | Tumminard et al. |
| 2007/0255662 A1 | 11/2007 | Tumminaro |
| 2007/0260556 A1 | 11/2007 | Pousti |
| 2007/0265921 A1 | 11/2007 | Rempe |
| 2007/0266034 A1 | 11/2007 | Pousti |
| 2007/0266130 A1 | 11/2007 | Mazur et al. |
| 2007/0270125 A1 | 11/2007 | Pousti |
| 2008/0009263 A1 | 1/2008 | Pousti |
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0082509 A1 | 4/2008 | Bessieres et al. |
| 2008/0091614 A1 | 4/2008 | Bas Bayod et al. |
| 2008/0097851 A1 | 4/2008 | Bemmel et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1 | 6/2008 | Carlson |
| 2008/0167017 A1 | 7/2008 | Wentker et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0275779 A1 | 11/2008 | Lakshminarayanan |
| 2008/0279360 A1 | 11/2008 | Veenstra et al. |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2009/0006184 A1 | 1/2009 | Leach et al. |
| 2009/0006217 A1 | 1/2009 | Smith |
| 2009/0024614 A1 | 1/2009 | Pousti |
| 2009/0029687 A1 | 1/2009 | Ramer et al. |
| 2009/0044216 A1 | 2/2009 | McNicoll |

(56) References Cited

U.S. PATENT DOCUMENTS

| | | |
|---|---|---|
| 2009/0055292 A1 | 2/2009 | Chong et al. |
| 2009/0063178 A1 | 3/2009 | Pousti |
| 2009/0063312 A1 | 3/2009 | Hurst |
| 2009/0070583 A1 | 3/2009 | Von Mueller et al. |
| 2009/0081989 A1 | 3/2009 | Wuhrer |
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupali et al. |
| 2009/0281904 A1 | 11/2009 | Pharris |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0070757 A1 | 3/2010 | Martinez |
| 2010/0094732 A1 | 4/2010 | Smith |
| 2010/0106620 A1 | 4/2010 | Marcus |
| 2010/0114775 A1 | 5/2010 | Griffen |
| 2010/0125514 A1 | 5/2010 | Blackhurst et al. |
| 2010/0125737 A1 | 5/2010 | Kang |
| 2010/0145802 A1 | 6/2010 | Nowacek et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223183 A1 | 9/2010 | Smith |
| 2010/0235276 A1 | 9/2010 | Smith |
| 2010/0250687 A1 | 9/2010 | Smith |
| 2010/0267362 A1 | 10/2010 | Smith |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0125610 A1 | 5/2011 | Goodsall et al. |
| 2011/0143710 A1 | 6/2011 | Hirson |
| 2011/0143711 A1 | 6/2011 | Hirson |
| 2011/0287748 A1 | 11/2011 | Angel et al. |
| 2011/0295750 A1 | 12/2011 | Rammal |
| 2012/0171990 A1 | 7/2012 | Williams et al. |

FOREIGN PATENT DOCUMENTS

| | | |
|---|---|---|
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | WO-9738538 | 10/1997 |
| WO | WO-2007004792 | 1/2007 |
| WO | WO-2007084593 | 7/2007 |
| WO | WO-2007102648 | 9/2007 |
| WO | WO-2007127521 | 11/2007 |
| WO | WO-2009/036511 | 3/2009 |
| WO | WO-2009044396 | 4/2009 |

OTHER PUBLICATIONS

"International Application No. PCT/US2011/051094", International Search Report and Written Opinion, Dec. 23, 2011.

European Patent Application No. 09711520.8, Extended Search Report mailed Apr. 27, 2011.

International Application No. PCT/US2009/033823, International Search Report and Written Opinion, Sep. 24, 2009.

International Application No. PCT/US2009/039723, International Search Report and Written Opinion, Oct. 30, 2009.

International Application No. PCT/US2010/020189, International Search Report and Written Opinion, Dec. 10, 2010.

International Application No. PCT/US2010/021054, International Search Report and Written Opinion, Jul. 29, 2010.

International Application No. PCT/US2010/024525, International Search Report and Written Opinion, May 17, 2010.

International Application No. PCT/US2010/024535, International Search Report and Written Opinion, May 25, 2010.

International Application No. PCT/US2010/030338, International Search Report & Written Opinion, Jun. 3, 2010.

International Application No. PCT/US2010/032668, International Search Report and Written Opinion, Jul. 1, 2010.

International Application No. PCT/US2010/036940, International Search Report and Written Opinion, Jul. 21, 2010.

International Application No. PCT/US2010/037816, International Search Report and Written Opinion, Aug. 5, 2010.

International Application No. PCT/US2010/042703, International Search Report and Written Opinion, Sep. 13, 2010.

International Application No. PCT/US2010/046266, International Search Report and Written Opinion, Oct. 20, 2010.

International Application No. PCT/US2010/050616, International Search Report and Written Opinion, Apr. 26, 2011.

International Application No. PCT/US2010/057472, International Search Report and Written Opinion, Jan. 18, 2011.

International Application No. PCT/US2010/059295, International Search Report and Written Opinion, Feb. 1, 2011.

International Application No. PCT/US2010/059466, International Search Report and Written Opinion, Feb. 1, 2011.

International Application No. PCT/US2011/022419, International Search Report and Written Opinion, Mar. 29, 2011.

International Application No. PCT/US2011/022426, International Search Report and Written Opinion, Mar. 28, 2011.

International Application No. PCT/US2011/30039, International Search Report and Written Opinion, May 23, 2011.

International Application No. PCT/US2011/30038, International Search Report and Written Opinion, May 25, 2011.

OneBip S.R.L , "OneBip—to Pay Online with Your Mobile Phone", Youtube online video at http://www.youtube.com/watch?v=RiEsMccOtJY, May 23, 2007.

Amazon.com, Inc., "Get Gold Box Deals Every Day with Amazon Text Alerts", located at http://www.amazon.com/gp/ anywhere/sms/goldbox, available at least by Jun. 10, 2009.

Aradiom Inc., "The Real Solution—Aradiom SolidPass", located at http://www.aradiom.com/SolidPass/2fa-OTP-security-token.htm, available at least by Apr. 24, 2009.

Arrington, Michael , "Mobile Payments Getting Traction on Social Networks but Fees are Sky High", Tech Crunch, located a http://

(56) References Cited

OTHER PUBLICATIONS techcrunch.com/2009/01/13mobile-payments-getting-traction-on-social-networks-but-fees-are-sky-high/,, Jan. 13, 2009.

Brooks, Rod, "MobilCash:Worlds First in Mobile Payments", YouTube online video located at http://youtube.com/wacth?v=j6Xv35qSmbg,, Oct. 12, 2007.

Bruene, Jim, "PayPal Launches on Facebook: Who Wants to be the First Bank?", located at http://www.netbanker.com/2007/06paypal_launches_on_facebook_who_wants_to_be_the_first_bank_on_facebook.hml,, Jun. 22, 2007.

Chen, Will, "Gift Shop Credits Have Arrived", The Facebook Blog, located at gttp://blog.facebook.com/blog.php?post=36577782130, Oct. 31, 2008.

Chua, Lye H., "How Customers Applied Java CAPS?", Sun Microsystems, Inc. presentation, Nov. 6, 2007.

Federal Trade Commission,, "Children's Online Privacy Protection Act (COPPA)", 15 U.S.C. §§ 6501-6506, Oct. 21, 1998.

Hassinen, Marko et al., "An Open, PKI-Based Mobile Payment System", Emerging Trends in Information and Communication Security, Lecture Notes in Computer Science, vol. 3995/2006, pp. 86-89, Jun. 1, 2006.

Ihlwan, Moon, "In Korea, Cell Phones Get a New Charge", http://businessweek.com/globalbiz/content/mar2006/gb20060301_260288.htm, Mar. 1, 2006.

Lee, Jessica, "Payment Industry Perspectives: Q&A with Zong CEO David Marcus", http://www.insidefacebook.com/2009/05/19payment-industry-perspectives-qa-with-zong-ceo-david-marcus/, May 19, 2009.

Mobilians Co. Ltd.,, company website located at http://www.mobilians.co.kr/english/, available at least by Jan. 12, 2009.

Nicole, Kirsten, "Pay me Lets You Send and Receive Money Through Facebook", http://mashable.com/2007/06/17pay-me-facebook-app/, Jun. 17, 2007.

Paypal, Inc,, "Get What You Want, When You Want It" located at https://www.paypal.com/cgi-bin/webscr?cmd=xpt/ Marketing/mobile/MobileBuyStuff-outside, available at least by Mar. 5, 2009.

Paypal, Inc.,, "Texting with PayPal—Easy as Lifting a Finger", located at https://www.paypal.com/cgi-bin/webscr? cmd=xpt/Marketing/mobile/MobileAdvancedFeatures-outside, available at least by Mar. 5, 2009.

Squidoo, LLC,, "ntroducing MobillCash: Make a Secure Sale Even When an Online Customer Has No Cash, Credit Cards or I.D.", located at http://www.squidoo.com/mobillcash-pay-by-mobile-phone, available at least by Aug. 29, 2008.

Sun Microsystems Inc.,, "The Road to Mobile Banking", white paper, Jun. 2008.

Tindal, Suzanne, "St. George Counts Down to Two-Factor Authentication", ZDNet Australia, Feb. 19, 2008.

Trusted Mobile Payment Framework,, "Scheme Rules", version 2.0, Aug. 6, 2008.

Visualtron Software Corporation,, "2-Factor Authentication—What is MobileKey?", located at http://www.visualtron.com/products_mobilekey.htm, available at least by 2008.

Wikimedia Foundation, Inc.,, "Authentication", located at en.wikipedia.org/wiki/Authentication, Mar. 17, 2009.

Wikimedia Foundation, Inc.,, "Two-Factor Authentication", located at en.wikipedia.org/wiki/Two-factor_authentication, Apr. 24, 2009.

Zabawskyj, Bohdan, "In the Media: The Mobile Money Opportunity",, Billing World and OSS Today, located at http://www.redknee.com/news_events/in_the_media/43/?PHPSESSID=1e0ca1ab057bf9dc2c88104877ca8010, Sep. 2007.

Zong, Inc.,, "Virtual Goods/Currency and Mobile Payments: The Business Model for Social Apps", The Zong Blog at http://blog-zong.com/2008/10/25/virtual-goods-currency-and-mobile-payments-the-business-model-for-social-apps/, Oct. 28, 2008.

Zong, Inc.,, "Zong Mobile Payment Demo on A Facebook App", You Tube online video at http://www.youtube.com/watch?v=aLjRcAFrGil, Jan. 5, 2009.

Zong, Inc.,, "Zong—Mobile Payments for Your Web App", You tube online video at http://www.youtube.com/watch?v=O2C3SQraAvQ, Sep. 5, 2008.

Zong, Inc.,, "Zong Mobile Payments in Smallworlds", You Tube online video at htttp://www.youtube.com/watch?v=Y6CEw3tSgBc, Feb. 10, 2009.

International Patent Application No. PCT/US11/51094 filed on Sep. 9, 2011, International Preliminary Report on Patentability mailed on Nov. 2, 2012.

SYSTEMS AND METHODS TO IDENTIFY CARRIER INFORMATION FOR TRANSMISSION OF BILLING MESSAGES

RELATED APPLICATIONS

The present application claims priority to Prov. U.S. Pat. App. Ser. No. 61/372,830, filed Aug. 11, 2010 and entitled "Systems and Methods to Identify Carrier Information for Transmission of Premium Messages," the disclosure of which is incorporated herein by reference.

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity to deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods to collect funds via mobile phones are described herein. Some embodiments are summarized in this section.

In one aspect, a system includes: a data storage facility; and an interchange coupled with the data storage facility. The interchange includes a common format processor and a plurality of converters to interface with a plurality of different controllers of mobile communications. The converters are configured to communicate with the controllers in different formats; and the converters are configured to communicate with the common format processor in a common format.

In one embodiment, in response to a request identifying a phone number, a payment amount and a payee, the interchange is to: transmit a pinging message to the phone number; receive a response to the pinging message and identify telecommunication carrier information of the phone number from the response; store in the data storage facility carrier data associating the telecommunication carrier information and the phone number; select a first converter from the converters based on the telecommunication carrier information associated with the phone number; determine at least one premium message based on the payment amount and a set of predetermined prices for premium messages to be transmitted via a telecommunication carrier of a mobile phone at the phone number; and transmit the at least one premium message to the mobile phone using the first converter of the converters.

In another aspect, a method implemented in a computing device includes: receiving in an interchange a request identifying a phone number, a payment amount and a payee; in response to the request, transmitting from the common format processor a first message in accordance with the phone number; receiving at the interchange a response to the first message; identifying telecommunication carrier information of the phone number from the response; determining at least one premium message based on the payment amount and a set of predetermined prices for premium messages to be transmitted via a telecommunication carrier of a mobile phone at the phone number; and transmitting the at least one premium message to the mobile phone using a first converter of the converters according to the telecommunication carrier information.

In one embodiment, the telecommunication carrier of the mobile phone is to collect funds from a user of the mobile phone according to the set of predetermined prices for premium messages and to provide the funds to the interchange according to the at least one premium message; and the interchange is to pay the amount to the payee in accordance with the request.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to associate account information with phone numbers to facilitate electronic payments via mobile devices, such as cellular phones. The interchange is configured to communicate with the mobile phones through the different controllers to provide security and convenience for online transactions.

Figure 1:
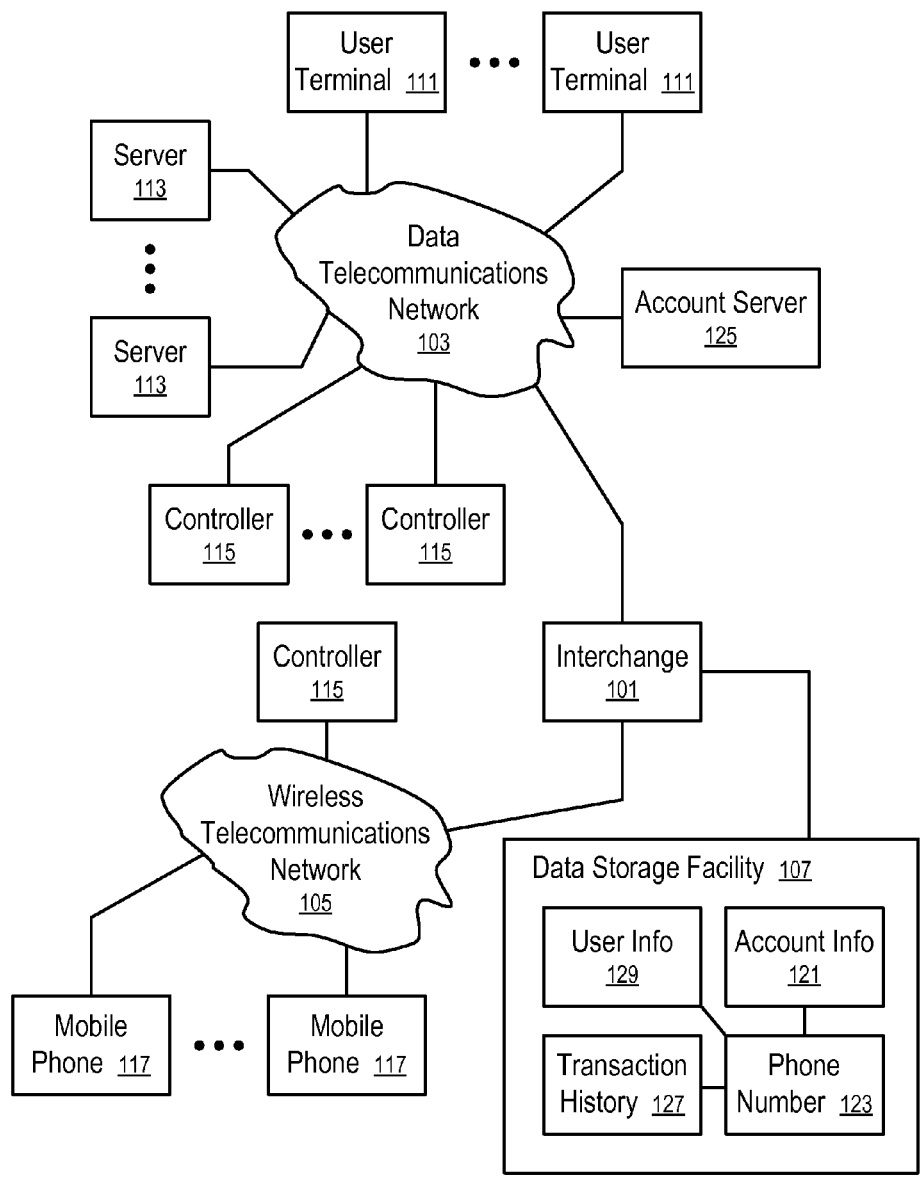
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user account information (121) and the corresponding phone numbers (123) of the mobile phones (117). The interchange (101) is coupled with the data storage facility (107) to communicate with the mobile phones (117) at the corresponding phone numbers (123) to confirm operations that are performed using the account information (121). Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding account information (121), such as bank accounts, credit card numbers, charge card numbers, etc.

In FIG. 1, the user terminals (111) may use a unified interface to send requests to the interchange (101). For example, a website of the interchange (101) may be used to receive the account information (121) from the web browsers running in the user terminals (111). The user terminals (111) are typically different from the mobile phones (117). However, in some embodiments, users may use the mobile phone (117) to access the web and submit the account information (121). Alternatively, the users may use the mobile phone (117) to submit the account information (121) to the interchange (101) via text messaging, email, instant messaging, etc.

The use of the mobile phones (117) in the confirmation of activities that involve the account information (121) increases the security of the transaction, since the mobile phones (117) are typically secured in the possession of the users.

Further, in one embodiment, the interchange (101) may use the phone bills of the mobile phones (117) to pay for purchases, in order to use the account information (121) to pay for the phone bills, and/or to deposit funds into the accounts identified by the account information (121) by charging on the phone bills of the corresponding mobile phones (117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phones (117) via their phone numbers (123) stored in the data storage facility (107), the users may use the user terminals (111) to access online servers (113) of various merchants or service providers to make purchases. From the user terminals (111), the users can use the accounts identified by the account information (121) to make the payment for the purchases, without revealing their account information (121) to the operators of the servers (113).

In one embodiment, the mobile phones (117) are used by the corresponding users to make payments and/or manage funds, such as for making purchases in various websites hosted on the servers (113) of merchants and service providers and/or for transferring funds to or from an account identified by the account information (121), such as phone bills of land-line telephone services, credit card accounts, debit card accounts, bank accounts, etc., or an account hosted on the data storage facility (107) or telecommunication accounts of the mobile phones (117) with telecommunication carriers. The mobile phones (117) are used to confirm and/or approve the transactions associated with the account identified by the account information (121) (or other accounts). The interchange (101) interfaces the mobile phones (117) and the servers (113) to confirm and/or approve transactions and to operate on the account identified by the account information (121) (and/or other accounts associated with the phone number (123)).

For example, the user terminal (111) may provide the phone numbers (123) to the servers (113) to allow the servers (113) to charge the account identified by the account information (121) associated with the phone number (123). The interchange (101) sends a message to the mobile phone (117) via the phone number (123) to confirm the payment request. Once the payment is confirmed or approved via the corresponding mobile phone (117), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) may not even provide the phone number (123) to the server (113) to process the payment. The server (113) may redirect a payment request to the interchange (101), which then prompts the user terminal (111) to provide the phone number (123) to the website of the interchange (101) to continue the payment process.

For example, the server (113) may redirect the payment request to the website of the interchange (101) with a reference indicating the purchase made via the user terminal (111). The interchange (101) can use the reference to subsequently complete the payment with the server (113) for the purchase, after receiving the phone number (123) directly from the user terminal (111) to confirm the payment via the mobile phone (117).

In some embodiments, instead of directly providing the phone number (123) to identify the account information (121), the user may provide other information to identify the phone number (123), such as an account identifier of the user assigned to the user for obtaining the services of the interchange (101).

In one embodiment, the account information (121) is pre-associated with the phone number (123) prior to the payment request. The account information (121) may be submitted to the interchange (101) via the user terminal (111) or the mobile phone (117) via a secure connection.

Alternatively, the user may supply the account information (121) to the interchange (101) at the time the payment request is submitted from the user terminal (111) to the interchange (101). Alternatively, the user may supply the account information (121) to the interchange (101) at the time the user responds to the confirmation message for the payment request.

In some embodiments, the user may supply the account information (121) after a transaction using funds collected via the telecommunication carrier of the mobile phone (117) at the phone number (123). For example, after the transaction, the interchange (101) may send an invitation message, such as a text message to the mobile phone (117) at the phone number (123), to the user to invite the user to register with the interchange (101) and provide the account information (121). The user may register with the interchange (101) via the mobile phone (117) (e.g., by a replying text message), or via a web page of the interchange (101) (e.g., using a link and/or a unique code provided in the invitation message).

After the user registers with the interchange (101) (e.g., via the mobile phone (117) and by providing the account information (121)), the user may create a customized personal identification number (PIN) or receive a PIN for enhanced security. Using the PIN, the user may use the account information (121) to complete an online transaction without having to confirm and/or approve a transaction using the mobile phone (117). In some embodiments, the PIN may be used to reduce unwanted messages to the mobile phone (117). For example, once the phone number (123) and the account information (121) are associated with a PIN, the interchange (101) may require the user of the user terminal (111) to provide the correct PIN to initiate the payment process. Thus, a spammer having only the phone number (123) (or a different user mistakenly using the phone number (123)) may not successfully use the user terminal (111) to request the interchange (101) to send confirmation messages to the mobile phone (117) protected by the PIN. In some embodiments, the interchange (101) may offer further incentives to the user for registering with the interchange (101), such as reduced fees, discounts, coupons, free products and services, etc.

In one embodiment, once the account information (121) is associated with the phone number (123) in the data storage facility (107), the user does not have to resubmit the account information (121) in subsequent payment requests.

By delegating the payment task to the interchange (101) and securing the account information (121) in the data storage facility (107), the system as shown in FIG. 1 can increase the security of using the account information (121) in an online environment.

In some embodiments, the interchange (101) can also fulfill the payment requests using the funds collected via the phone bill of the phone numbers (123). The interchange (101) can collect the funds via sending premium messages to the mobile phones (117) at the phone numbers (123), after receiving confirmation from the mobile phone (117).

For example, after the confirmation or approval message is received from the mobile phone (117), the interchange (101) performs operations to collect funds via the phone bill of the phone number (123). The interchange (101) may calculate the required premium messages to bill to the mobile phone (117). For example, mobile terminated premium SMS messages may have a predetermined set of prices for premium messages. The interchange (101) determines a combination of the premium messages that has a price closest to the amount required by the transaction, and sends this combination of premium messages to the mobile phone (117). For example, mobile originated premium SMS messages may also have a predetermined set of prices for premium messages. The interchange (101) can calculate the set of messages required for the transaction and transmit a text message to the mobile phone (117) of the user to instruct the user to send the required number of premium messages to provide the funds.

In one embodiment, the data storage facility (107) stores the transaction history (127) associated with the phone number (123) and uses the transaction history (127) to approve payment requests and to reduce the time period for processing a subsequent payment request.

For example, from the transaction history (127) the interchange (101) may identify a pattern of prior payment requests made via the phone number (123) and match subsequent requests with the identified pattern. When a subsequent request matches the pattern, the interchange (101) may skip the communication with the mobile phone (117) at the phone number (123), which communication is otherwise performed after the payment request and before the payment operation for payment confirmation and/or approval. Skipping such a communication between the payment request and the payment operation can reduce the time period for payment processing and improve user experience.

Examples of transaction patterns may include the use of the individual user terminals (111), the typical time period of payment requests, range of payment amounts, and/or certain characteristics of payees, such as a collection of frequently used payees, payees who provide certain types of products or services, the geographical region of payees, etc.

In one embodiment, when the subsequent payment request is received within a predetermined time limit of a previous confirmed payment request from the same user terminal (111), the interchange (101) may approve the payment request without communicating with the mobile phone (117) at the phone number (123) for approval or confirmation.

In one embodiment, when the interchange (101) skips the communication with the mobile phone (117) at the phone number (123) for approval or confirmation and approves a transaction request based on the transaction history (127), the interchange (101) may send a notification message to the mobile phone (117) at the phone number (123) for enhanced security but not requiring a response from the user. If the user determines that the notification message corresponds to an unauthorized use of the phone number (123), the user may reply to the notification message from the mobile phone (117) to report the unauthorized use and/or stop or reverse the payment operation.

In some embodiments, the user may start a session (e.g., a web session) authenticated using a password associated with the phone number (123), prior to the payment request. When the payment request is made within the authenticated session (e.g., before the user logs off the session, or before the session times out), the interchange (101) may skip the confirmation/approval communication with the mobile phone (117) at the phone number (123) to reduce the time period for payment processing.

In one embodiment, the session is authenticated via communications with the mobile phone (117) at the phone number (123). For example, after the user provides the phone number (123) to log into a session on a user terminal (111), the interchange (101) may generate a code (e.g., a code for one time use) and send the code to the user via the user terminal (111) (or the mobile phone (117) at the phone number (123)). The interchange (101) then requests the code back from the user via the mobile phone (117) at the phone number (123) (or the user terminal (111)), which is not used to send the code. When the code sent by the interchange (101) matches the code received back from the user, the association between the user terminal (111) and the mobile phone (117) at the phone number (123) can be established; and the identity of the user of the user terminal (111) can be confirmed. Such confirmation can be logged in the transaction history (127) for subsequent approval of payment requests.

In one embodiment, the user may specify a time period for the session, or the time period for the association between the user terminal (111) and the phone number (123). The user may specify the time period using the user terminal (111) when providing the phone number (123) to initiate the session, or specify the time period using the mobile phone (117) when providing the one-time code back to the interchange (101). During the time period of the confirmed association between the user terminal (111) and the phone number (123), a payment request from the user terminal (111) can be automatically identified with the phone number (123) without the user having to explicitly specify the phone number (123) for the payment request. Alternatively, for enhanced security and/or flexibility, the interchange (101) may require the user to identify the phone number (123) in the payment request, even though the payment request is from the user terminal (111) that is associated with the phone number (123).

In one embodiment, the code for the authentication of the session can be communicated to and/or from the mobile phone (117) via short message service (SMS), voice message, voice mail, or other services, such as email, instant messaging, multimedia messaging service (MMS), etc.

In one embodiment, after the user provides the phone number (123) to log into a session on a user terminal (111), the interchange (101) provides a message to the mobile phone (117) at the phone number (123) and receives a reply to the message from the mobile phone (117) within a predetermined period of time to authenticate the session and associate the user terminal (111) with the phone number (123). If the reply is not received from the mobile phone (117) with the predetermined period of time, the session is not authenticated.

In one embodiment, the user may provide an advance approval for subsequent payment requests to pay via the phone number (123). The advance approval may include a number of limitations, such as the time limit for the expiration of the advance approval, the budget limit for the advance approval, a limit on payees for the advance approval, etc. For example, the advance approval may limit the payees based on their business category, web address, product type, service type, geographic location, etc. For example, the budget limit may include the frequency of subsequent payment requests, limit for individual payment requests, and total limit for subsequent payment requests, etc.

In one embodiment, the advance approval is specific for a user terminal. For example, the advance approval may be obtained via communications with the user via both a specific user terminal (111) and the mobile phone (117) at the phone number (123). Thus, the advance approval applies only to subsequent payment requests from the specific user terminal (111) identified by the advance approval.

Alternatively, the advance approval may not be limited to a specific user terminal (111). The advance approval may be used for any user terminals (111) used by the user of the phone number (123) to request payments via the phone number (123). In some embodiments, the advance approval is limited to user terminals (111) of certain characteristics identified by the advance approval, such as a geographic region of the user terminal (111) (e.g., determined based on the communication addresses, routing paths, access points for wireless connections, base stations for cellular communications, etc.). In some embodiments, the interchange (101) automatically identifies these characteristics based on the communications to obtain the advance approval (e.g., based on transaction history (127)), without the user explicitly specifying the characteristics.

In one embodiment, the data storage facility (107) also stores user information (129) associated with the phone number (123). When authorized, the interchange (101) provides the user information (129) to the servers (113) to facilitate transactions between the user terminals (111) and the servers (113).

For example, the user information (129) may include shipping address, billing address, user preferences, login credentials, etc. In some embodiments, the interchange (101) may also provide the account information (121) to the server (113) to allow the server (113) to charge the user using the account information (121). Thus, the account information (121) may also be considered as part of the user information (129) in some embodiments.

In one embodiment, after a request for payment to a merchant is confirmed/approved via the mobile phone (117) at the phone number (123), the interchange (101) provides the server (113) with the user information (129) that is associated with the phone number (123) in the data storage facility (107), to provide assistance in the transaction. For example, the user may store the shipping address as part of the user information (129) associated with the phone number (123) on the data storage facility (107). After the interchange (101) finishes processing the payment request, the interchange (101) may provide the shipping address to the server (113) to allow the merchant to ship a product to the user; thus, the user does not have to manually submit the shipping address to various servers (113).

In one embodiment, after a request is confirmed/approved via the mobile phone (117) at the phone number (123), the interchange (101) may provide at least a portion of the account information (121) to the server (113) to allow the server (113) to process the payment using the account information (121). For example, the interchange (101) may provide the account identifier (e.g., a credit card number, a bank account number, a debit card number), or a portion of the account identifier, to the server (113) to allow the server (113) to charge the user using the account identifier. Thus, the user does not have to manually supply the corresponding information to the server (113). In one embodiment, the entire account identifier is provided to the server (113) for the convenience of the user. In one embodiment, a partial account identifier is provided to the server (113) to balance convenience and security; and the user provides the remaining portion of the account identifier directly to the server (113) to complete the transaction. In some embodiments, the interchange (101) provides the server (113) with information related to account type, expiration date, billing address, etc. to assist the user in the check out process on the server (113). In some embodiments, the interchange (101) does not provide the account identifier to the server (113) for improved security; and the server (113) obtains the account identifier from the user directly and obtains other information, such as account type, expiration date, billing address, etc. from the interchange (101).

In one embodiment, the interchange (101) dynamically determines the amount of information that is provided to the server (113). For example, the decision may be based on matching the current transaction with a pattern of past transactions (e.g., determined based on the transaction history (127)) and/or the security levels at the server (113). When there is a match, some of the information that is not otherwise provided may be provided from the interchange (101) to the server (113), such as a portion of the account information (121).

In some embodiments, the interchange (101) provides the information to the server (113) based on an advance approval obtained from the mobile phone (117), or based on an approval decision made based on the transaction history (127).

In one embodiment, the interchange (101) provides the user information (129) to sign into an authenticated session with the server (113). In some embodiments, the authenticated session is associated with the interchange (101) and/or used as an advance approval for payment requests occurring in the session.

Figure 2:
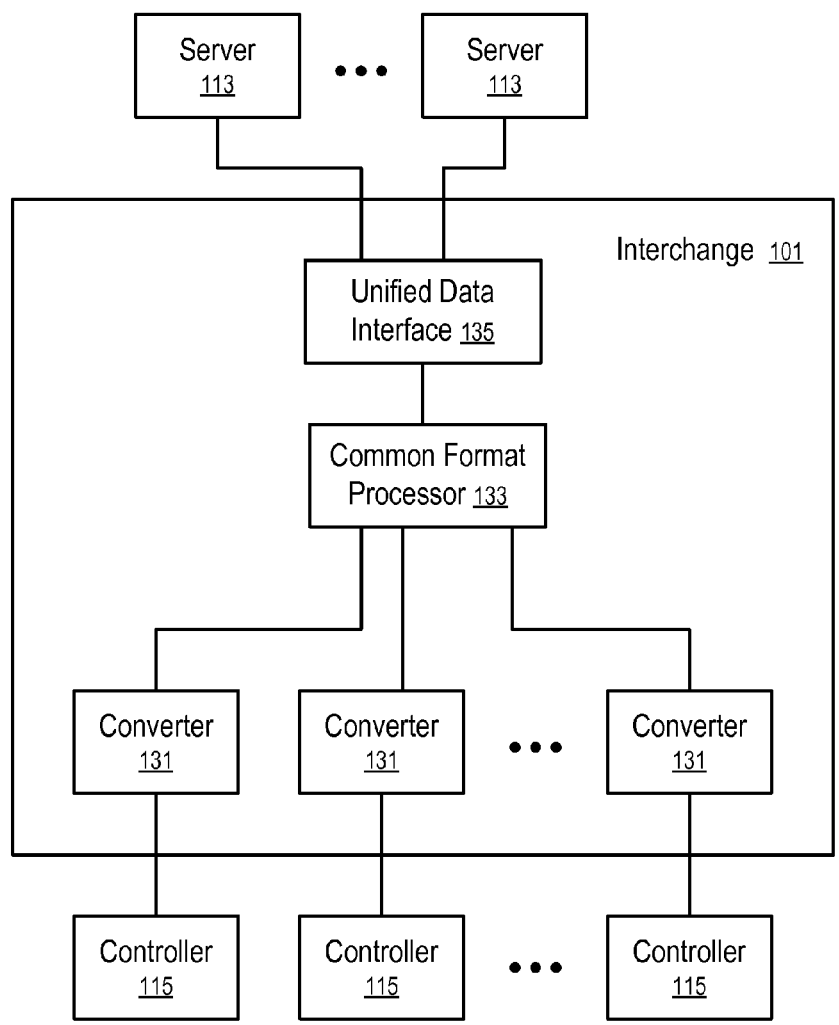
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (123), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
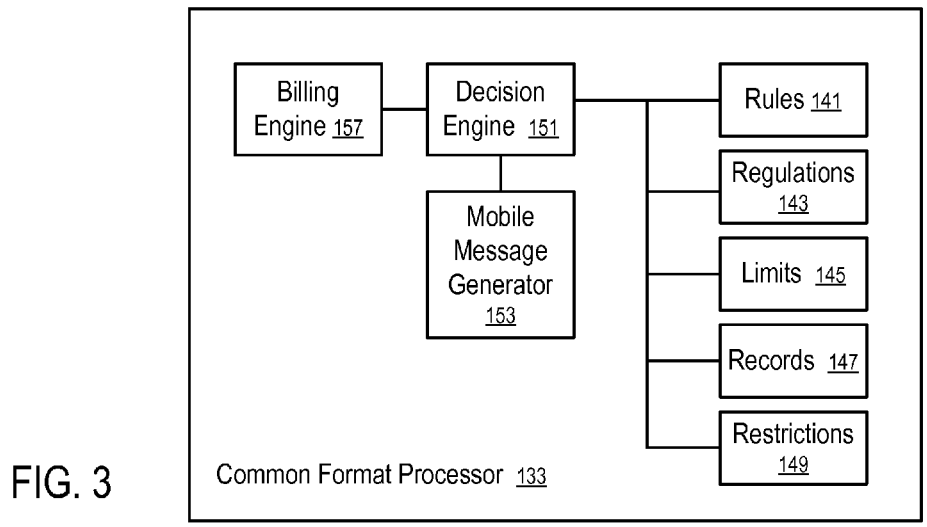
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (117) to bill the user, or requests the mobile phone (117) to send mobile originated premium SMS messages to a short code representing the interchange (101).

In one operator billing method, the interchange (101) directly sends a message to the mobile carrier of the mobile phone (117) to bill the amount on the phone bill of the mobile phone (117), without having to send a premium message to the mobile phone (117).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing the mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (117) about the transaction (e.g., a request to collect funds via the phone bill of the user for a payment request, or for deposit into an account identified by the account information (121)). The converter (131) then interfaces with the corresponding controller (115) to transmit the messages to the mobile phones (117).

Figure 4:
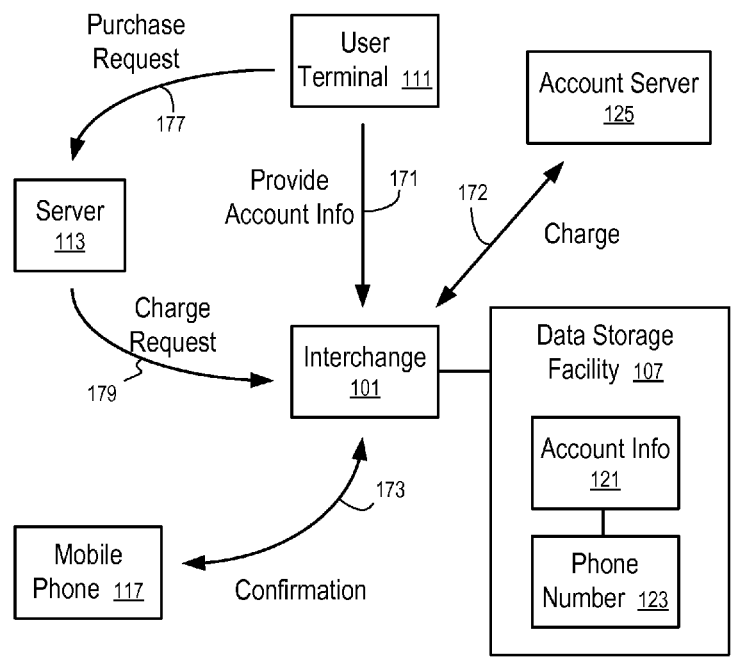
FIG. 4 shows a method to facilitate an online transaction using an interchange according to one embodiment.

FIG. 4 shows a method to facilitate an online transaction using an interchange according to one embodiment. In FIG. 4, the user terminal (111) provides (171) account information (121) to the interchange (101) for association with the phone number (123). For example, the user may use a device running a web browser as the user terminal (111) to submit the account information (121) via a secure web connection. The user terminal (111) is typically different from the mobile phone (117). However, in some embodiments, the mobile phone (117) may also be used as the user terminal (111) to submit the account information (121) (e.g., via a wireless application protocol (WAP) application, or via a message sent via short message service (SMS) or multimedia message service (MMS), or via an email message or an instant message).

After the user provides the account information (121) to the interchange (101) for storage in the data storage facility (107), the user can send (177) a charge request to the server (113) of a merchant from the user terminal (111). The server (113) of the merchant can send or redirect (179) the charge request to the interchange (101). In response to the charge request, the interchange (101) sends (173) a confirmation message to the mobile phone (117). If the user sends (173) an approval, or an appropriate reply, to the confirmation message from the mobile phone (117), the interchange (101) communicates with the account server (125) to charge an account of the user identified by the account information (121), without revealing the account information (121) to the server (113). The interchange (101) pays the merchant on behalf of the user using the funds collected via charging the account of the user. For example, the interchange (101) may use its own bank account to pay the merchant operating the server (113). Thus, the financial information of the user is not revealed to the merchant.

Upon the completion of the payment process, the interchange (101) can notify the user via the mobile phone (117) and/or the user terminal (111).

In some embodiments, the server (113) of the merchant redirects the charge request to allow the user terminal (111) to communicate with the interchange (101) to continue the payment process; and the user terminal (111) may provide (171) the account information (121) directly to the interchange (101) after the charge request is redirected.

In alternative embodiments, the user may provide the account information (121) from the mobile phone (117) together with the approval of the charge request.

In one embodiment, the interchange (101) communicates with the mobile phone (117) for the confirmation of the charge request via SMS messages. Alternatively, the confirmation and approval messages can be sent (173) via emails, instant messages, voice message, live calls from operators, etc.

In some embodiments, the user of the mobile phone (117) may choose to fulfill the charge request via the phone bill, instead of charging the account identified by the account information (121). Thus, after the confirmation, the interchange (101) sends the premium messages to the mobile phone (117) to collect funds via the phone bill of the mobile phone (117). In other embodiments, the interchange (101) may send an instruction with the confirmation message to the mobile phone (117) to instruct the user to send mobile originated premium messages to the interchange (101) to collect the funds via the phone bill of the mobile phone (117).

Figure 5:
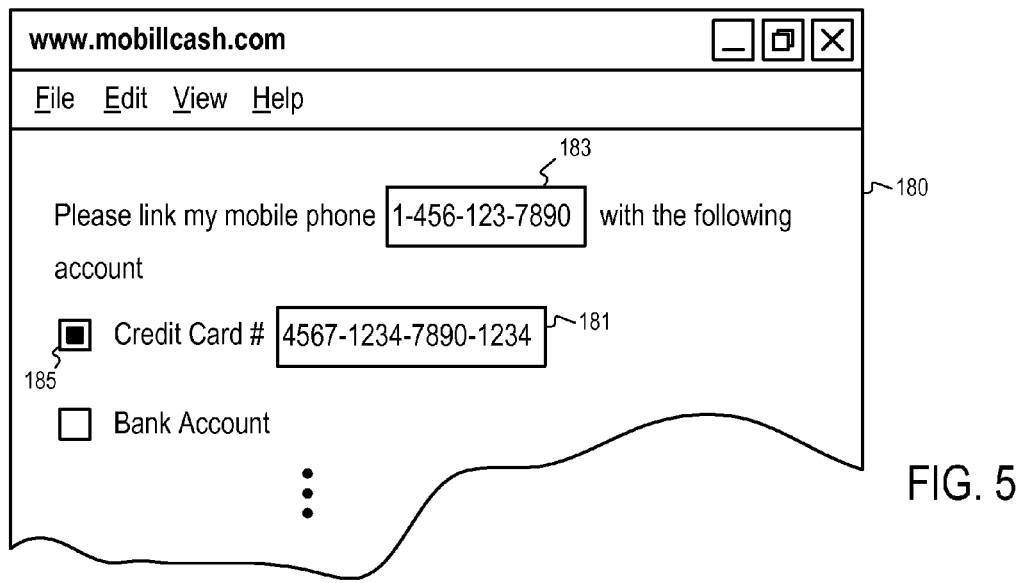
FIG. 5 illustrates a user interface to associate an account with a telephone number according to one embodiment.

FIG. 5 illustrates a user interface to associate an account with a telephone number according to one embodiment. In FIG. 5, the user interface (180) includes a text field (183) that allows the user to specify the phone number (123) with which the account information (121) provided in the text field (181) is to be associated.

In FIG. 5, the user interface (180) further includes an option list, which allows the user to select various types of accounts, such as credit card accounts, bank accounts, charge card accounts, etc. In the example illustrated in FIG. 5, the checkbox (185) is selected to specify a credit card account.

In some embodiments, the user interface (180) may further present a text field (not shown in FIG. 5) to allow the user to specify an alias for the account information (121) supplied in the text input field (181). For enhanced security, the alias can be used for subsequent communications with the user without revealing the account information (121).

In FIG. 5, the user interface (180) may be presented via a web browser (or a custom application) to submit account information (121) in the text input field (181) from a user terminal (111) to the interchange (101). Alternatively, the account number can be submitted from the mobile phone (117) via a message sent via SMS, WAP, voice mail, or via an interactive voice response (IVR) system.

In one embodiment, the server (113) presents the payment option (185) via an online shopping cart system or a third party checkout system. Alternatively or in combination, the server (113) presents the payment option (185) via a web widget. For example, a web widget may include a program code that is portable and executable within a web page without requiring additional compilation. The web widget allows the user to select the option (185) to pay for the product and/or service without leaving the web page or refreshing the web page. In one embodiment, the interchange (101) provides the web widget to facilitate the payment processing.

Figure 6:
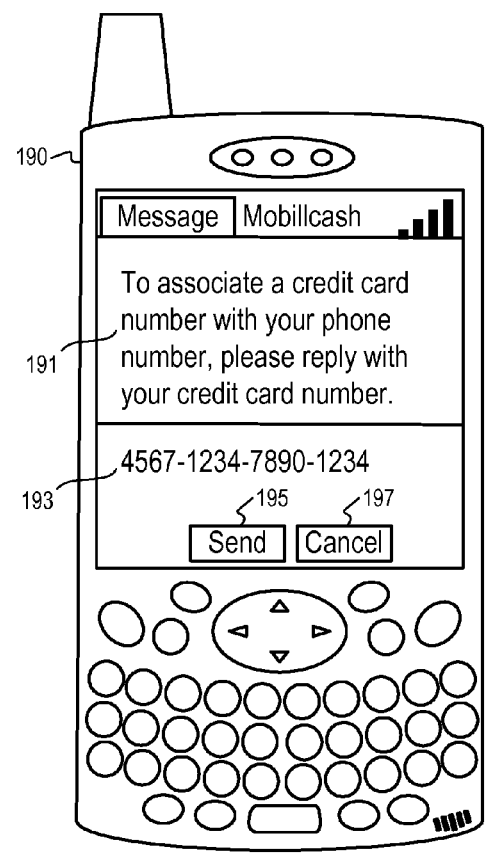
FIG. 6 illustrates another user interface to associate an account with a telephone number according to one embodiment.

FIG. 6 illustrates another user interface to associate an account with a telephone number according to one embodiment. In FIG. 6, the user interface (190) is presented on the mobile phone (117) of the user. The user interface (190) presents a message (191) from the interchange (101) to the mobile phone (117) at the phone number (123). The message (191) prompts the user to submit the account information (121) by providing a reply message (193). The user may select the "send" button (195) to provide the account information (121) for association with the phone number (123) or select the "cancel" button (197) to ignore the prompt.

In one embodiment, the messages (191 and 193) are transmitted to the mobile phone (117) via a short message service (SMS). Alternatively, the messages can be transmitted to the mobile phone (117) via other protocols, such as multimedia message service (MMS), email, instant messaging, WAP, voice mail, voice messages via an interactive voice response (IVR) system, etc.

Figure 7:
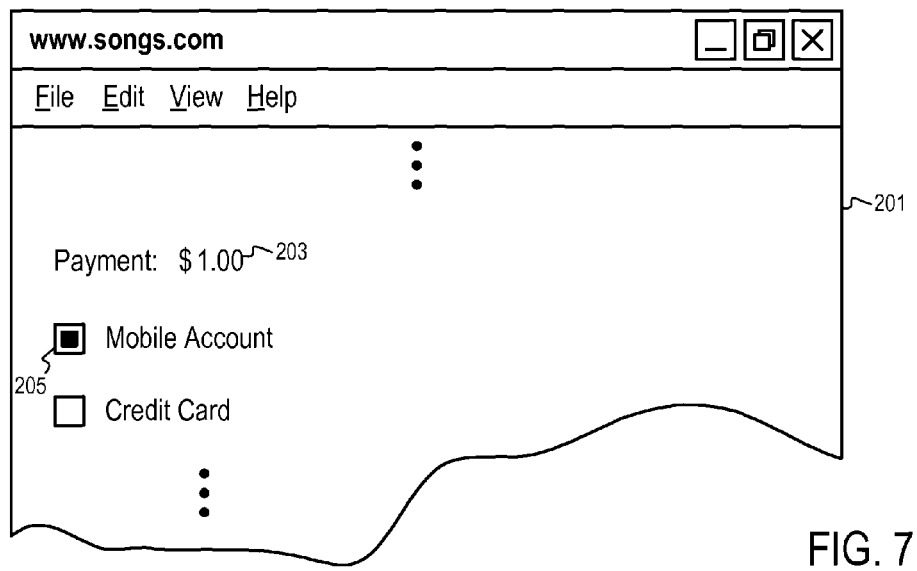
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number (123) to the merchant to process the payment. Thus, the user does not have to visit the website of the interchange (101) to complete the payment.

Figure 8:
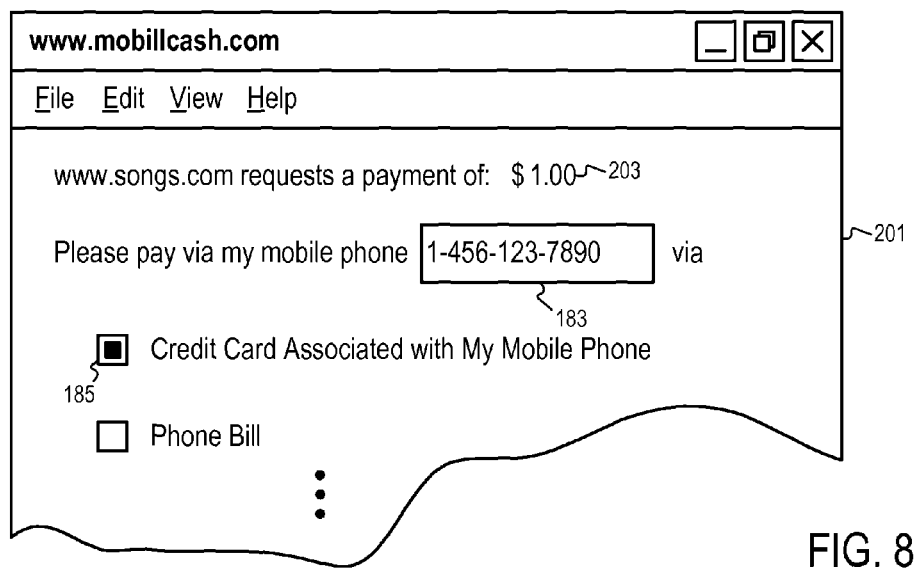
FIG. 8 illustrates a user interface to initiate a payment request according to one embodiment.

FIG. 8 illustrates a user interface to initiate a payment request according to one embodiment, after the payment request is redirected to the website of the interchange (101). In FIG. 8, the user interface (201) includes the identity of the merchant and the amount (203) of the requested payment. The user interface (201) includes a text field (183) to allow the user to provide the phone number (123) to identify the account information (121) via its association with the phone number (123) in the data storage facility (107).

Further, user authentication may be used to reduce false messages to the phone number (123). For example, the user interface (201) may request a PIN for enhanced security. For example, the user may be required to register with the interchange (101) prior to using the services of the interchange (101); and after registering with the interchange (101), the user is provided with the PIN or can created a customized PIN to access the functionality provided by the user interface (201).

Alternatively, the user interface (201) may request an identifier associated with the phone number (123) to initiate the payment transaction. In some embodiments, the user interface (201) requires the user to provide no information other than the phone number (123) in the text field (183) to initiate the transaction.

In FIG. 8, the user interface (201) allows the user to select one option from a plurality of payment options, including paying via the phone bill, and paying via one or more of the accounts identified by the account information (121) associated with the phone number (123) in the data storage facility (107).

In some embodiments, the user interface (201) may present the payment options after authenticating the user (e.g., via a personal identification number or password) for enhanced security.

In some embodiments, the user interface (201) identifies the different accounts represented by the account information (121) by showing aliases of the accounts. The aliases may be previously specified by the user, or be dynamically generated by the interchange (101) based on the types of the accounts and/or portions of the account information (121) (e.g., the first or last few digits of the account number, etc.)

In one embodiment, once the user submits the payment request via the user interface (201), the interchange (101) transmits a confirmation message to the mobile phone (117) according to the phone number (123) provided in the text field (183). In one embodiment, the interchange (101) transmits the confirmation to the mobile phone (117) after the user is authenticated via the user interface (201) to reduce the possibility of unauthorized/unwelcome messages to the mobile phone (117), which may occur when the user intentionally or unintentionally provides an unrelated phone number in the entry box (183).

Figure 9:
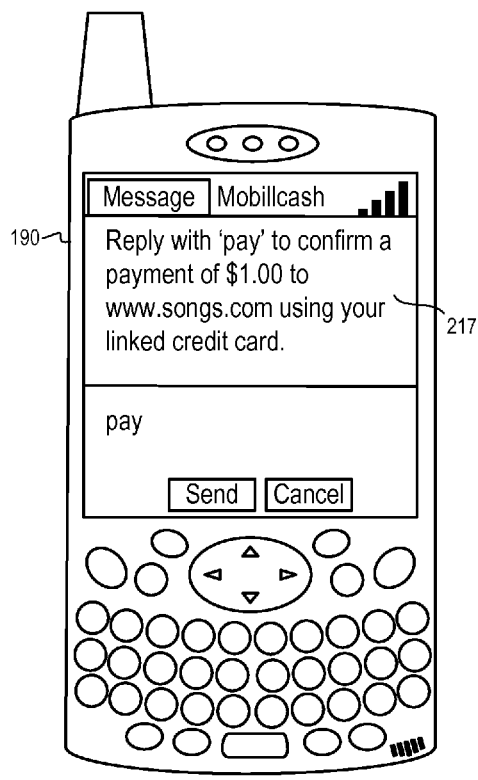
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 9.

The presence of the code in the reply message is an indication of the user approving the request; and the requirement for such a code in the reply eliminates false confirmations (e.g., generated via accidental replies or automated replies).

Alternatively or in combination, the requested code may include a PIN associated with the account, and/or a code (not shown) randomly generated and presented in the user interface used to initiate the payment transaction (e.g., user interface (201)).

In some embodiments, the code requested in the text message (217) may be a personal identification number (PIN) associated with the phone number (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 8). The code may be generated randomly at the time the request is received via the user interface (201), or when the user interface (201) is presented to the user. The code provided to the user interface (201) can be requested in the reply received from the user interface (190) to indicate that the user who is in possession of the mobile phone (117) has actual knowledge about the payment request submitted via the user interface (201).

After the correct reply is received, the interchange (101) communicates with the account server (125) to electronically charge the user using the account information (121) and pays the payee using the funds collected via communicating with the account server (125). The interchange (101) then notifies the user when the payment transaction is complete.

Figure 10:
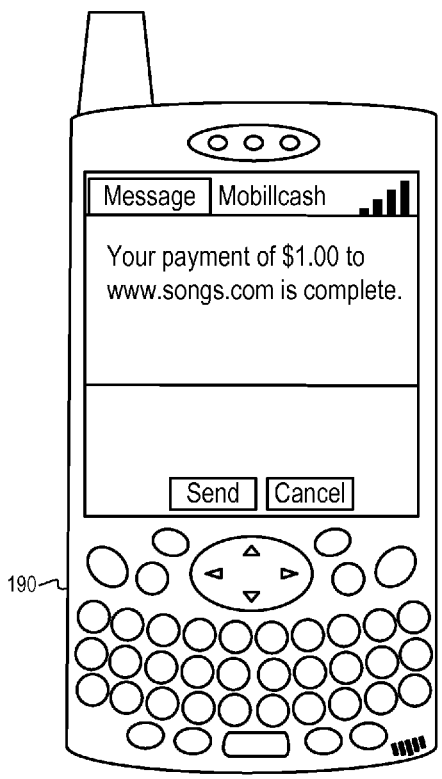
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number (123) and may select one as a delivery address in the confirmation/approve message to the interchange (101). Alternatively, the interchange (101) may receive an address for product delivery from the mobile phone (117) together with the confirmation/approve message and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 11:
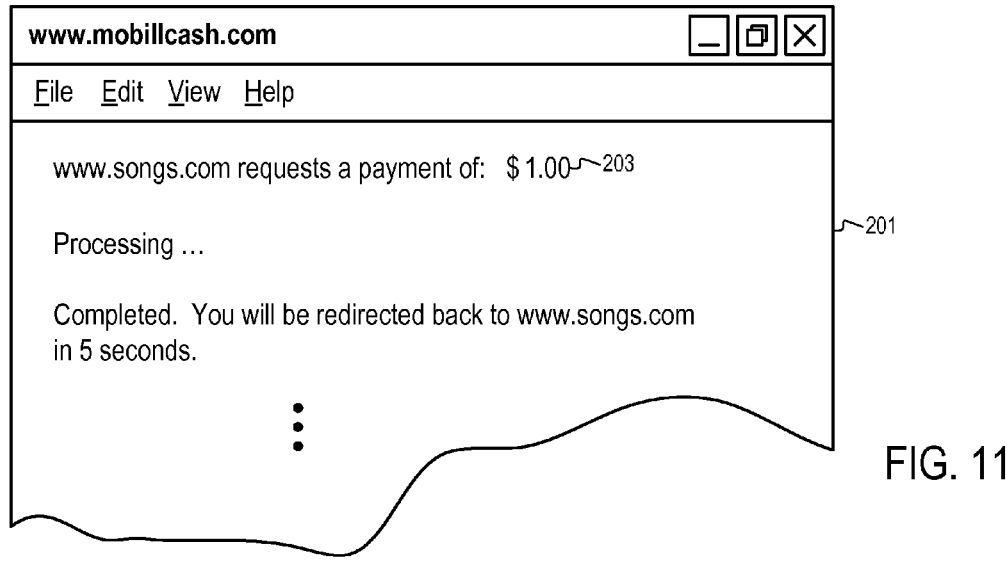
FIG. 11 illustrates a way to redirect a payment confirmation according to one embodiment.

FIG. 11 illustrates a way to redirect a payment confirmation according to one embodiment. For example, after the user submits the payment request to the interchange (101) via the user interface (201) shown in FIG. 8, the interchange (101) may present the user interface (201) illustrated in FIG. 11 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the user is required to provide the approval in response to the confirmation message (217), as illustrated in FIG. 9, within a predetermined period of time. If the user fails to provide the approval from the mobile phone (117) within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 12:
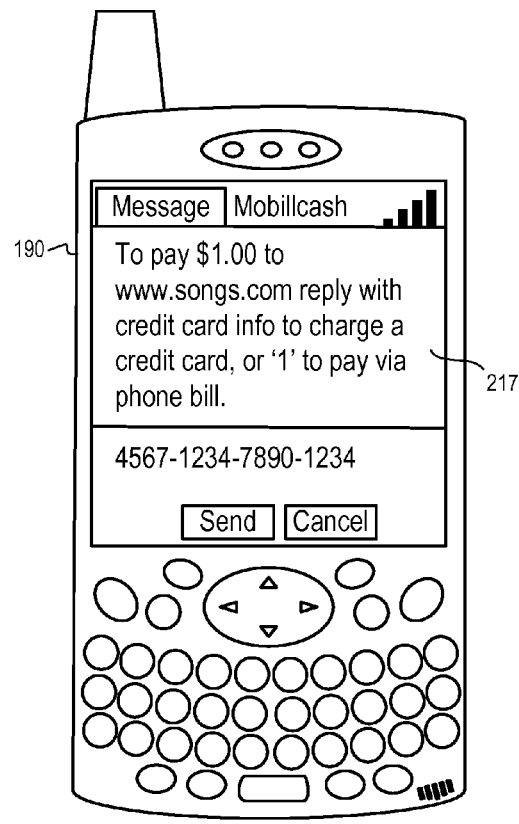
FIG. 12 illustrates a user interface to receive payment options according to one embodiment.

FIG. 12 illustrates a user interface to receive payment options according to one embodiment. In FIG. 12, the interchange (101) sends a message (217) to the mobile phone (117) to provide a number of options to the user. The message (217) identifies the amount (203) of the requested payment and the identity of the payee (e.g., a merchant operating the server (113)) and asks the user to approve the payment request via a reply that contains a selected payment option.

In FIG. 12, the user may reply with the code "1" to approve the payment request and to pay via the phone bill of the mobile phone (117). Alternatively, the user may reply with the credit card information to charge the payment to a credit card, as illustrated in FIG. 12.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.) Thus, each of the accounts can be identified to the user via the account type in the confirmation message, without revealing the details of the account information.

For example, the interchange (101) may combine the name of the financial institutions and the type of accounts to generate aliases for the account information.

In some embodiment, the user may define the aliases for the account information by supplying the aliases with the account information (121) for association with the phone number (123).

Figure 13:
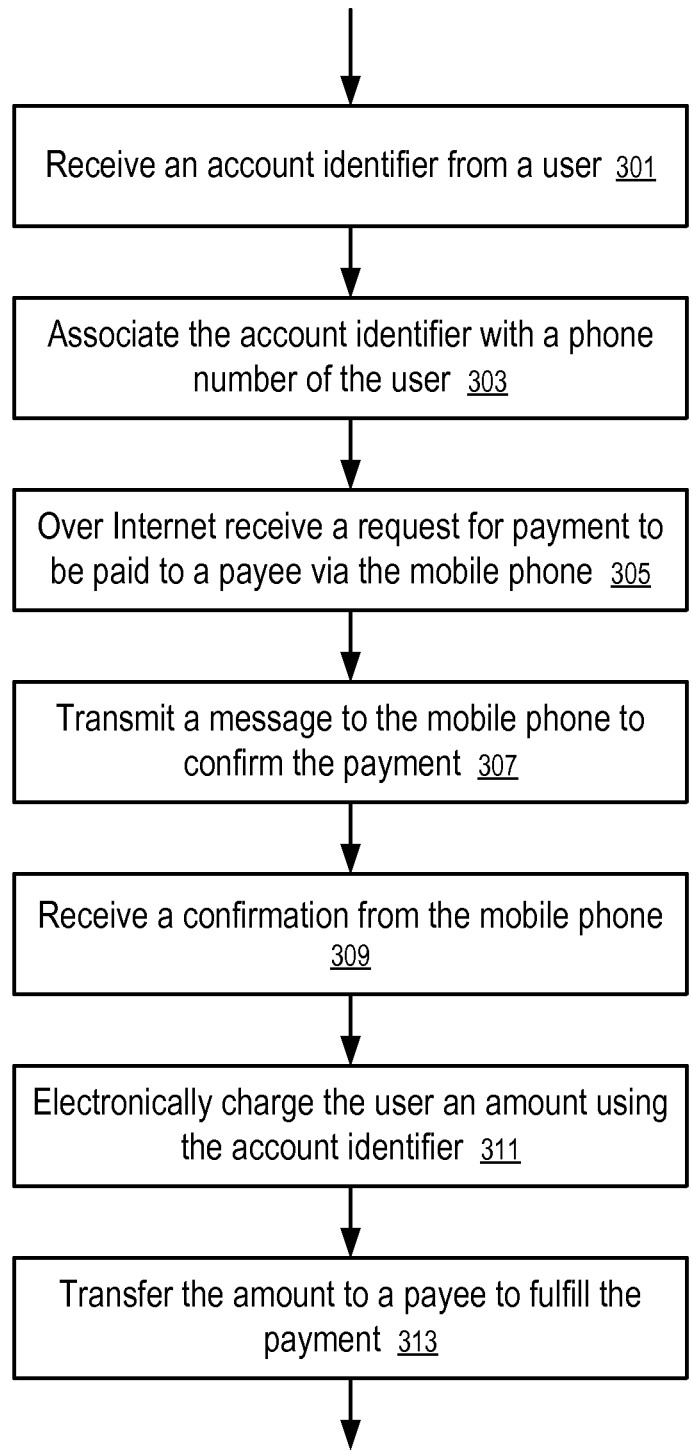
FIG. 13 shows a method to process an online payment according to one embodiment.

FIG. 13 shows a method to process an online payment according to one embodiment. In FIG. 13, the interchange (101) receives (301) an account identifier (e.g., 121) from a user and associates (303) the account identifier with a phone number (123) of the user in the data storage facility (107). Over the Internet the interchange (101) subsequently receives (305) a request for payment to be paid to a payee via the mobile phone (117) identified by the phone number (123). In response to the request, the interchange (101) transmits (307) a message (217) to the mobile phone (117) to confirm the payment.

After receiving (309) a confirmation or approval from the mobile phone (117) for the payment, the interchange (101) electronically charges (311) the user an amount using the account identifier (e.g., via communicating with the account server (125) using the account identifier). The interchange (101) then transfers (313) the amount to a payee to fulfill the payment.

Figure 14:
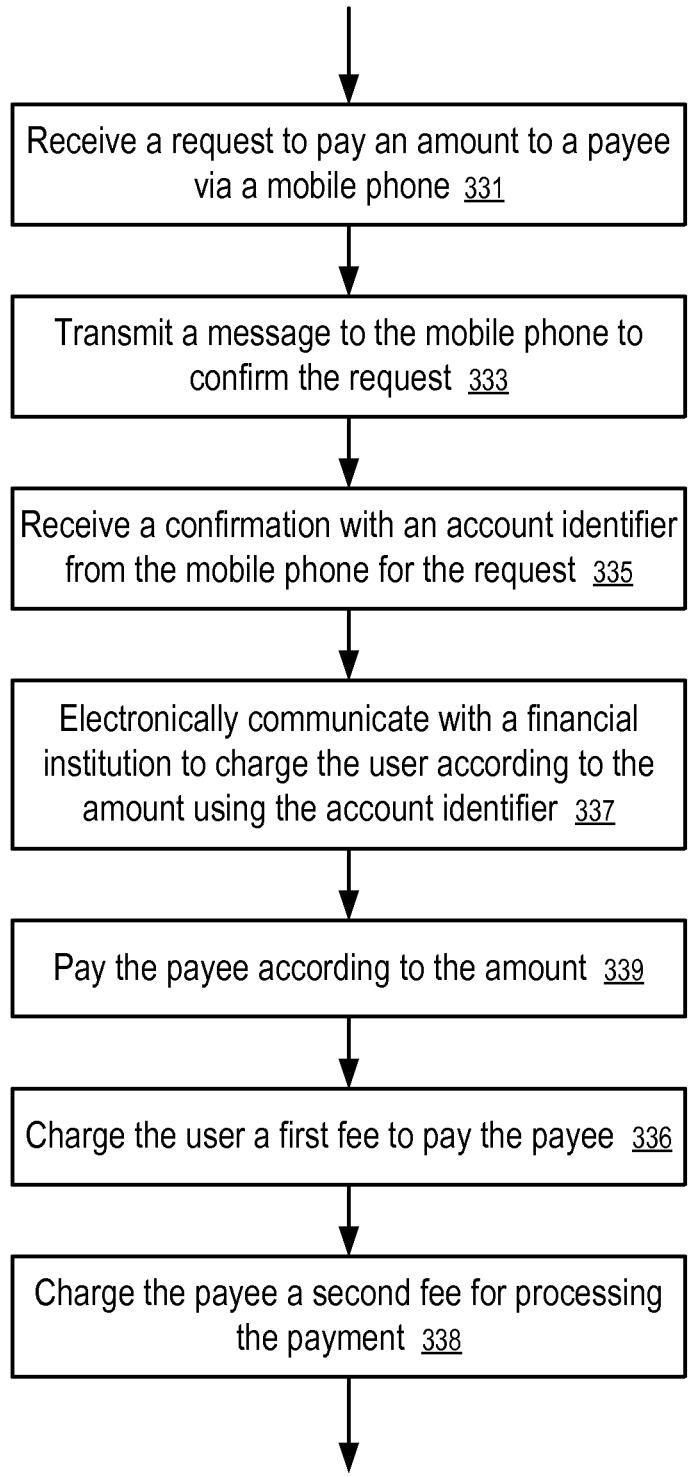
FIG. 14 shows another method to facilitate a payment transaction according to one embodiment.

FIG. 14 shows another method to facilitate a payment transaction according to one embodiment. In FIG. 14, the interchange (101) receives (331) a request to pay an amount to a payee via a mobile phone (117). The interchange (101) transmits (333) a message (217) to the mobile phone (117) to confirm the request via the converter (131) corresponding to the controller (115) of the mobile phone (117).

After the interchange (101) receives (335) a confirmation with an account identifier (e.g., 121) from the mobile phone (117) for the request, the interchange (101) electronically communicates (337) with a financial institution to charge the user the specified amount using the account identifier. The interchange (101) pays (339) the payee according to the amount, optionally charges (336) the user a first fee to pay the payee, and optionally charges (338) the payee a second fee for processing the payment.

In one embodiment, the users are given an incentive to provide the account information (121) for electronic payments via the account servers (125). For example, the interchange (101) may charge a lower fee for fulfilling payment requests via the account server (125) than for fulfilling payments requests via the phone bill. For example, the interchange (101) may offer rebates, discounts, etc. to the users who provide the account information (121). In some embodiments, the interchange (101) can complete a payment process via the account server (125) with fewer restrictions than via the phone bill.

In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., fees charged by the telecommunication carrier for collecting the funds via the mobile phone bill associated with the phone number (123) and/or the fees charged by the interchange (101) for processing the payments). Since the first fee is charged to the customer (e.g., the purchaser of products and services), the cost to the customer can vary based on the selection of the merchant. For the same purchase prices, the first fee (and thus the cost to the customer) may be different for purchases made via different merchants, because the merchants may offer different percentage of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

FIGS. 15-18 show methods to approve a payment transaction according to some embodiments.

Figure 15:
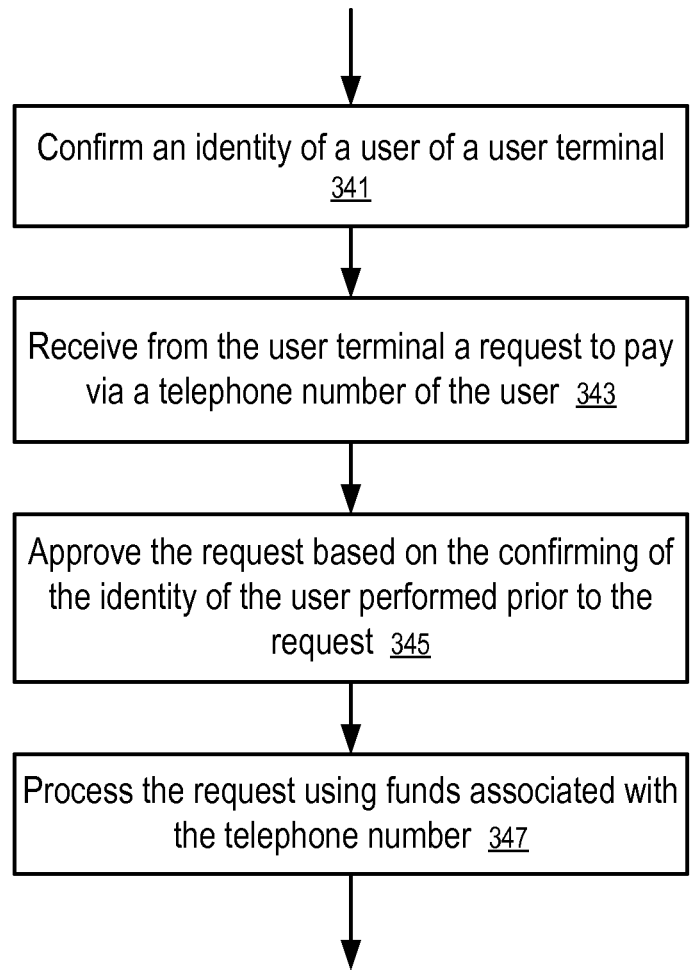
FIGS. 15-18 show methods to approve a payment transaction according to some embodiments.

In FIG. 15, after the interchange (101) confirms (341) an identity of a user of a user terminal (111), the interchange (101) receives (343) from the user terminal (111) a request to pay via a phone number (123) of the user. In one embodiment, the interchange (101) confirms the identify of the user of the user terminal (111) and/or associates the identity of the user of the user terminal (111) with the phone number (123) of the mobile phone (117) prior to the user submitting a request to pay via the phone number (123). Thus, communications with the mobile phone (117) at the phone number (123) for the confirmation and/or approval of the request does not have to take place between the request and the payment operation; and thus the delay between the request and the payment operation can be reduced.

For example, the user terminal (111) may include a web browser; and the user may log into a web server of the interchange (101) using the web browser. The interchange (101) may prompt the user via the web browser running on the user terminal (111) to provide the phone number (123) and a password associated with the phone number (123). After verifying the password, the user is logged into a session tracked by the web browser on the user terminal (111); and the web browser running on the user terminal (111) is associated with the phone number (123).

In one embodiment, the interchange (101) further communicates with the mobile phone (117) at the phone number (123) to complete the verification process. For example, the interchange (101) may send a one-time verification code to the mobile phone (117) at the phone number (123) and request the user to provide the correct one-time verification code back via the user terminal (111) to verify the association between the user terminal (111) and the phone number (123). Alternatively, the interchange (101) may provide the one-time verification code to the user terminal (111) and instruct the user to communicate the code back to the interchange (101) via the mobile phone (117) at the phone number (123). Alternatively, after the user logs in using the user terminal (111), the interchange (101) may send a message to the mobile phone (117) to request a reply from the mobile phone (117) at the phone number (123) within a predetermined period of time to validate the session. In some embodiments, after the user provides the phone number (123) using the user terminal (111) to the interchange (101), the user is instructed to provide the password via the mobile phone (117) to complete the log in process.

In one embodiment, the user terminal (111) tracks the session. For example, the user terminal (111) may use a web browser to track the session via information maintained by the web browser (e.g., cookies). Alternatively or in combination, the interchange (101) may track the session by maintaining information on the data storage facility (107). For example, after the user completes the log in process, the interchange (101) may identify the user terminal (111) via identifiers such as Internet address, Media Access Control address (MAC address), a different phone number (e.g., when the user terminal is a different cell phone), or other software or hardware identification number associated with the user terminal (111), such as a digital certificate; and the interchange (101) may associate the phone number (123) with such identifiers until the expiration of a predetermined time period, or after the user signals an end of the session using the user terminal (111) or using the mobile phone (117) at the phone number (123). In one embodiment, the interchange (101) associates a plurality of identifiers of the user terminal (111) with the phone number (123) for the session. When at least one of the identifiers of the user terminal (111) is changed, the interchange (101) may terminate the session automatically.

In FIG. 15, after the user terminal (111) submits the request to pay via the phone number (123), the interchange (101) approves (345) the request based on the confirming of the identity of the user performed prior to the request and processes (347) the request using funds associated with the phone number (123). For example, the interchange (101) may transmit premium messages, via a corresponding converter (131), to a mobile phone (117) at the phone number (123) to collect the funds, or receive premium messages from a mobile phone (117) at the phone number (123) to collect the funds. For example, the interchange (101) may determine the account information (121) (e.g., an account identifier, such as a credit card number, a bank account number, a debit card number, etc.) stored and associated with the phone number (123) on the data storage facility (107) of the interchange (101) to charge the user using the account information (121).

In one embodiment, in response to the payment request from the user terminal (111), the interchange (101) may send a notification message to the mobile phone (117) at the phone number (123). The user is not required to provide a reply to complete the payment process. However, the user of the mobile phone (117) is provided with the option/opportunity to reply and report a fraudulent use, or to cancel the request (e.g., within a predetermined period of time).

Figure 16:
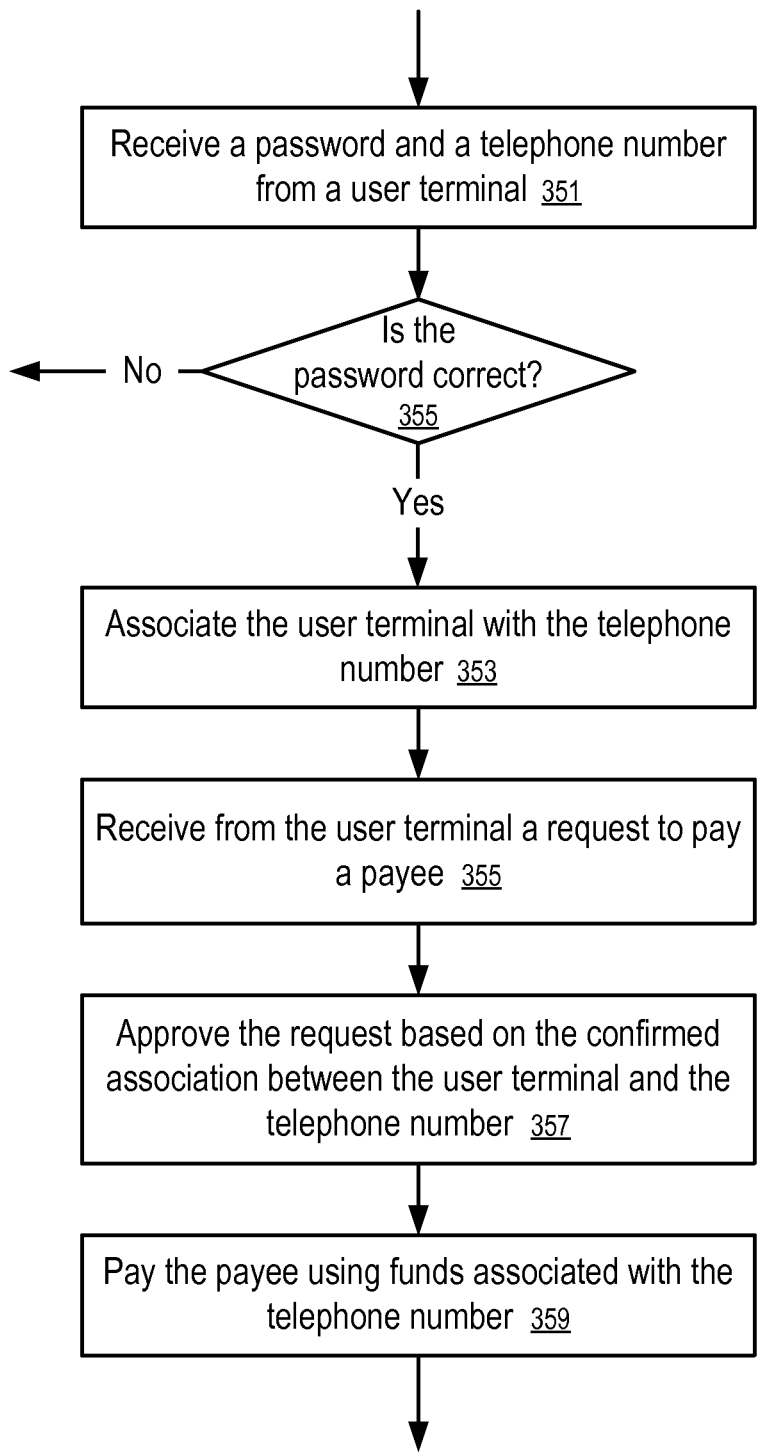

In one embodiment, the data storage facility (107) stores a password associated with the phone number (123) for authentication. In FIG. 16, after the interchange (101) receives (351) a password and a phone number (123) from a user terminal (111), the interchange (101) determines (352) whether the received password is the correct password for the phone number (123). If the received password is the correct password for the phone number (123), the interchange (101) associates (353) the user terminal (111) with the phone number (123) in the data storage facility (107). If, during the time period in which the user terminal (111) is associated with the phone number (123), the interchange (101) receives (355) from the user terminal (111) a request to pay a payee (e.g., via the user interface (201) illustrated in FIG. 8), the interchange (101) may approve (357) the request based on the confirmed association between the user terminal (111) and the phone number (123) and pay the payee using funds associated with the phone number (123), without requiring a confirmation via the mobile phone (117) at the phone number (123). In some embodiments, after the user terminal (111) submits the phone number (123) to the interchange (101), the interchange (101) may request the password from the mobile phone (117) at the phone number (123).

In one embodiment, during the time period in which the user terminal (111) is associated with the phone number (123), the interchange (101) may automatically provide the phone number (123) in the text field (183) in the user interface (201) for submitting a payment request, illustrated in the FIG. 8, based on the association between the user terminal (111) and the phone number (123). The phone number (123) can be provided by the interchange (101) in the text field (183) as a default input. Alternatively, the interchange (101) may not provide the phone number (123) and may require the user to enter the phone number (123) in the text field (183) for enhanced security. In some embodiments, the interchange (101) may dynamically determine whether or not to present the phone number (123) in the text field (183) based on a transaction pattern associated with the phone number (123). For example, if the current request matches the pattern, the interchange (101) presents the phone number (123) as the default input to simplify user interactions; otherwise, the interchange (101) does not provide the phone number (123) in the text field (183) for enhanced security.

Figure 17:
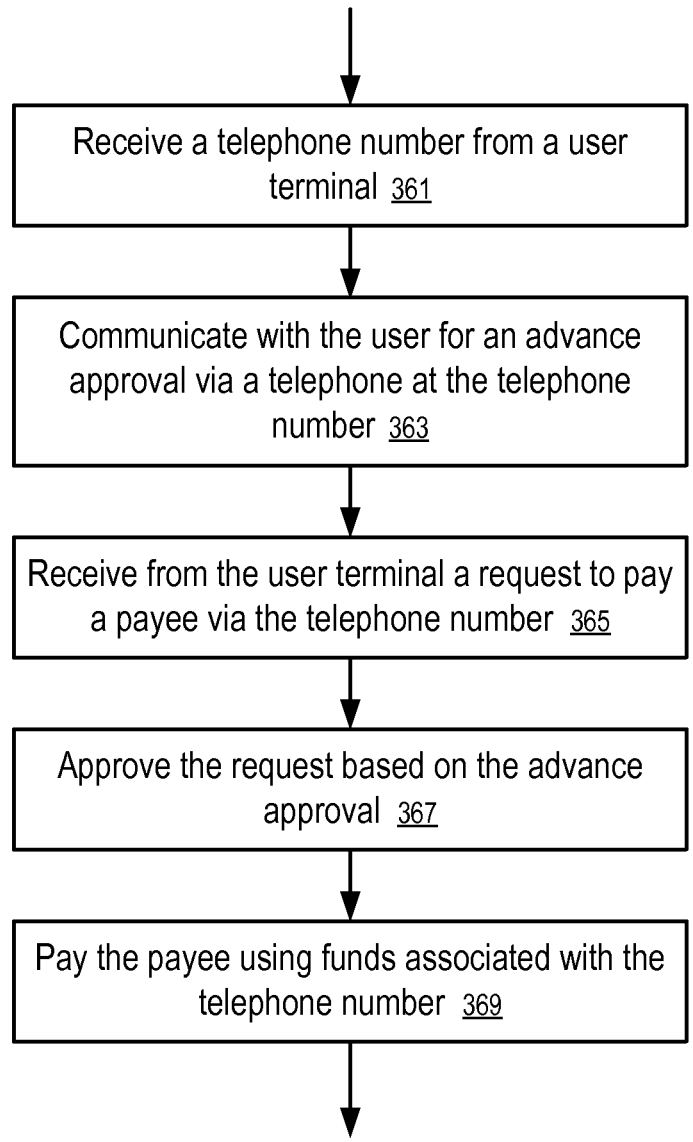

In FIG. 17, after the interchange (101) receives (361) a phone number (123) from a user terminal (111), the interchange (101) communicates (363) with the user for an advance approval for the user terminal (111) via a mobile phone (117) at the phone number (123). For example, the interchange (101) may communicate with the mobile phone (117) at the phone number (123) for the advance approval and/or communicate with the user terminal (111) to confirm a password associated with the phone number (123).

In one embodiment, the advance approval is specific for the user terminal (111); and the interchange (101) stores identifiers of the user terminal (111) with the advance approval. For example, the interchange (101) may communicate with the user terminal (111) and/or the mobile phone (117) to associate the user terminal (111) with the phone number (123) for the advance approval of one or more subsequent payment requests.

In some embodiments, the advance approval is not limited to a particular user terminal (111). For example, the user may directly use the mobile phone (117) at the phone number (123) to communicate the advance approval to the interchange (101) without having to identify the user terminal (111). Alternatively, the user may use a particular user terminal (111) to initiate the communications with the interchange (101) for the advance approval without limiting the advance approval to subsequent payment requests for the same particular user terminal (111).

In one embodiment, the advance approval is associated with the phone number (123) on the data storage facility (107). When a request to pay via the funds associated with the phone number (123) is received, the advance approval associated with the phone number (123) is identified and applied by the interchange (101). The user does not have to explicitly identify the advance approval in making the payment request.

In one embodiment, the interchange (101) may assign an identification code for the advance approval for enhanced security. The user may use the identification code in the payment request to explicitly identify the advance approval.

In one embodiment, the advance approval specifies a time limit for the expiration of the approval, a budget amount for one or more payment requests, a limit on the types of permitted products and/or services, a time window for permissible payment requests, a frequency for permissible payment requests, and one or more limits based on certain characteristics of the payees (e.g., web addresses, countries, categories, etc.).

In one embodiment, the advance approval may specify some limits on the permissible user terminals (111). For example, the advance approval may limit the advance approval to user terminals located with certain geographic areas. The interchange (101) may determine the geographic areas of the user terminals (111) based on the IP addresses of the user terminals (111), the access points for wireless local area communications, the base stations for cellular communications, etc.

After the advanced approval is associated with the phone number (123), the interchange (101) may receive (365) from the user terminal (111) a request to pay a payee via the phone number (123). Based on the advance approval the interchange (101) may approve (367) the request and pay (369) the payee using funds associated with the phone number (123), without requiring a confirmation message from the user via communications with the mobile phone (117) at the phone number (123).

In some embodiments, the interchange (101) may use the transaction history (127) to determine whether or not to require a confirmation message from the user via communications with the mobile phone (117) at the phone number (123). The transaction history (127) may include a number of records of prior confirmed/approved payment requests.

For example, based on the records of prior payment requests the interchange (101) may determine a payment pattern for the phone number (123), such as a list of frequently used user terminals (111) for the phone number (123), a range for typical payment amounts, a time period of a day within which typical payment requests are received for the phone number (123), a list of frequently used payees paid via the phone number (123), a list of categories of services and/or products frequently paid via the phone number (123), a recent payment requested confirmed within a predetermined period of time, etc.

Figure 18:
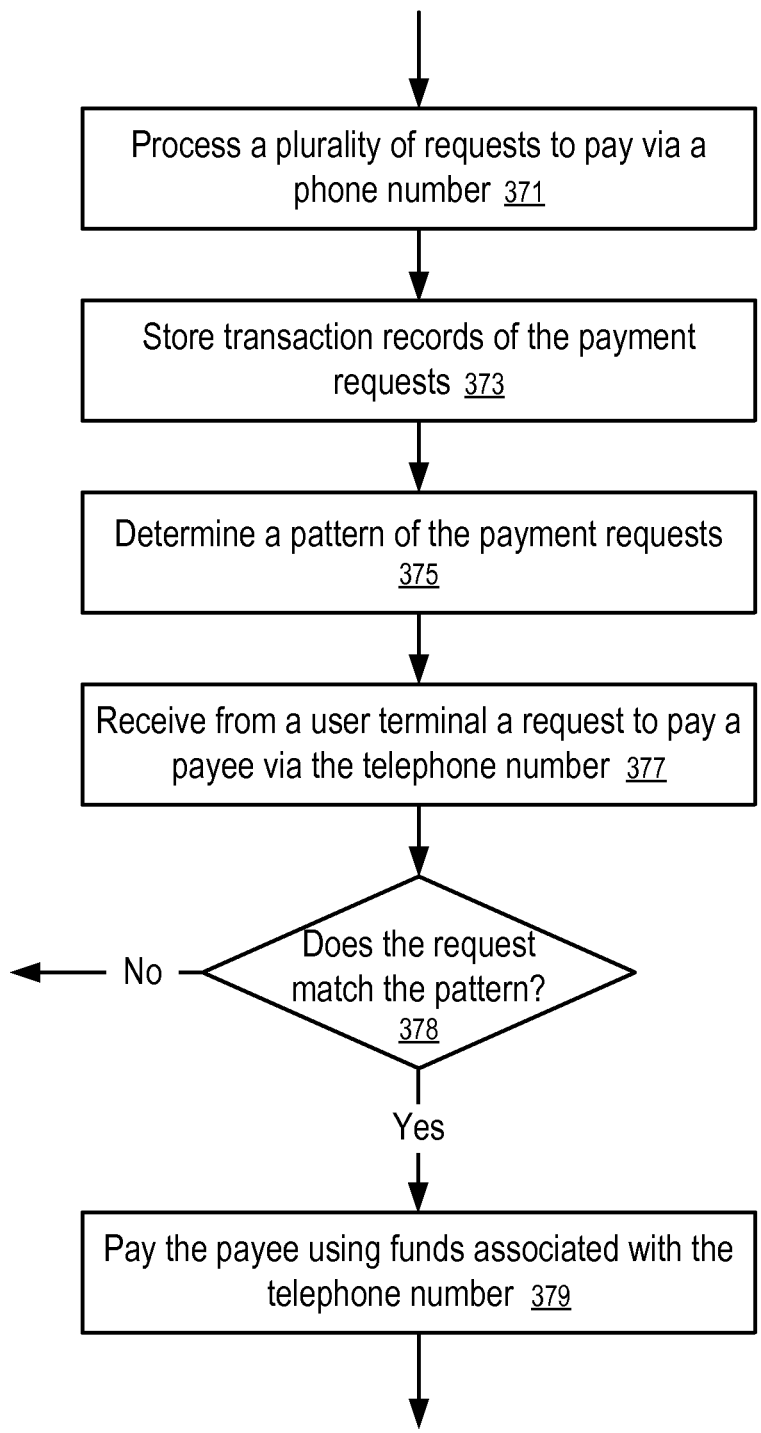

In FIG. 18, the interchange (101) processes (371) a plurality of requests to pay via a phone number (123). The interchange (101) processes (371) the requests via communicating with the mobile phone (117) at the phone number (123). For example, the interchange (101) may send a message to the mobile phone (117) at the phone number (123) and request a reply to the message from the mobile phone (117). For example, the interchange (101) may request a PIN from the mobile phone (117) at the phone number (123) to confirm the requests. For example, the interchange (101) may send one-time codes representing the requests to the mobile phone (117) or receive one-time codes representing the requests from the mobile phone (117).

The interchange (101) stores (373) transaction records of the payment requests and determines (375) a pattern of the payment requests.

Subsequently, when the interchange (101) receives (377) from a user terminal (111) a request to pay a payee via the phone number (123), the interchange (101) determines (378) whether the request matches the pattern. If the request matches the pattern, the interchange (101) pays (379) the payee using funds associated with the phone number (123), without requiring a confirmation communicated via the mobile phone (117) at the phone number (123) to speed up the payment process. The interchange (101) may send a notification to the mobile phone (117) at the phone number (123), without requiring a reply prior to making the payment.

Figure 19:
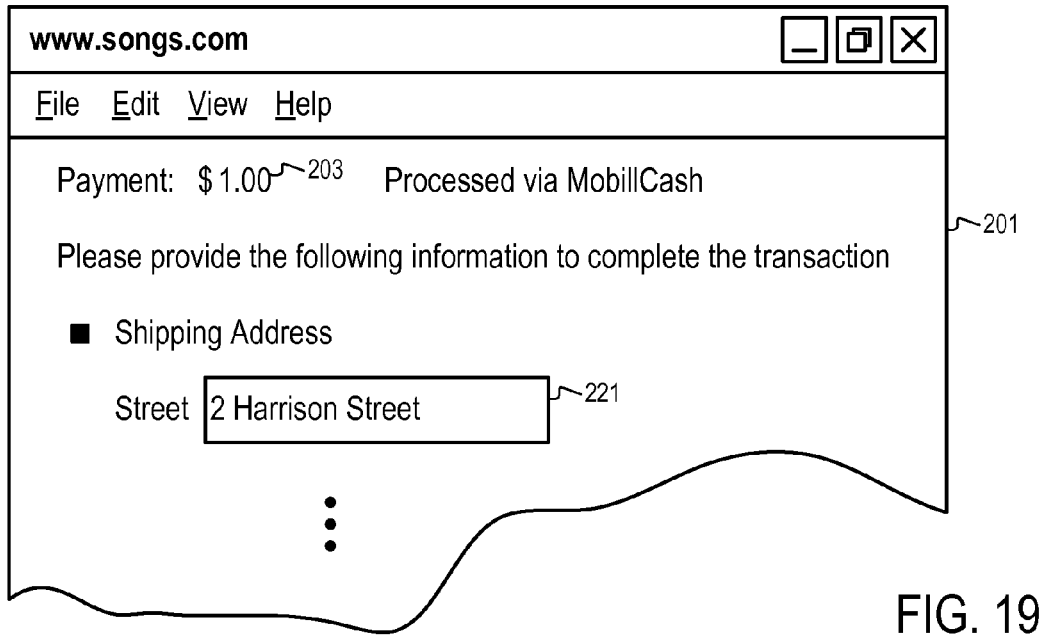
FIG. 19 shows a user interface to provide user information in connection with payment processing according to one embodiment.

FIG. 19 shows a user interface to provide user information in connection with payment processing according to one embodiment. In FIG. 19, the user interface (201) is presented after the interchange (101) finishes processing a payment request. For example, the user interface (201) in FIG. 19 may be displayed after the user is redirected from the website of the interchange (101) to the website of the payee on the server (113) (e.g., redirected from the user interface (201) illustrated in FIG. 11).

In one embodiment, the server (113) uses the user information (129) received from the interchange (101) to fill in the entry boxes (e.g., 221) as the default values to assist the user in the transaction. For example, the transaction may require a shipping address (221) and/or other information, such as shipping preferences, billing addresses, etc.

In one embodiment, the user information (129) is provided from the interchange (101) to the server (113) during the interchange (101) redirecting the user to the server (113). For example, the user information (129) can be embedded or encoded in the uniform resource locator (URL) for redirecting the user to the server (113). In another embodiment, the server (113) queries the interchange (101) in relation with the transaction to obtain the user information (129). For example, the server (113) may access an application programming interface (API) or a web service of the interchange (101) to obtain the user information (129).

In some embodiments, the interchange (101) operates in the background. After the user provides the phone number (123) to the server (113), the server (113) accesses an application programming interface (API) or a web service of the interchange (101) to process the payment and/or obtain the user information (129). The interchange (101) may secure the access to the information via communications with the mobile phone (117) at the phone number (123) in response to the server (113) accessing the API or web service of the interchange (101). Alternatively or in combination, the interchange (101) may secure the access to the information based on advance approval from the mobile phone (117), and/or based on the transaction patterns determined from the transaction history (127).

In some embodiments, the interchange (101) does not obtain funds from the user to pay the payee on behalf of the user of the mobile phone (117). Instead, the interchange (101) may provide the account information (121) to the server (113) to allow the server (113) to charge the user using the account information (121), as illustrated in FIG. 20.

Figure 20:
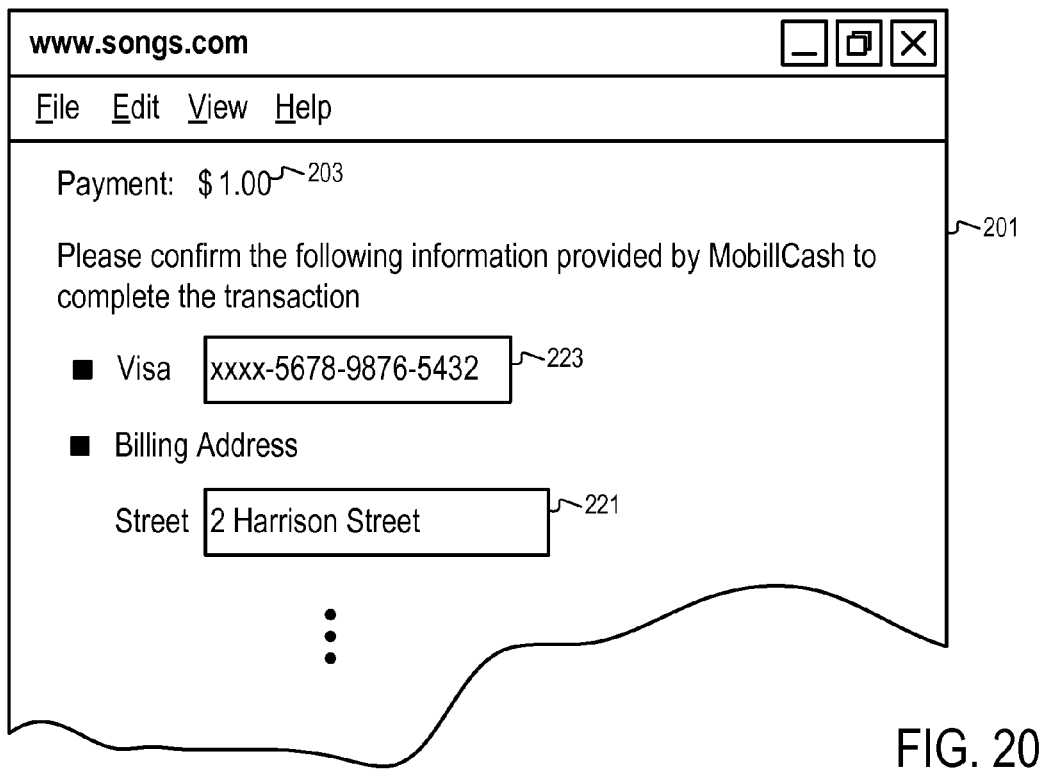
FIG. 20 shows a user interface to provide user information to facilitate payment processing according to one embodiment.

FIG. 20 shows a user interface to provide user information to facilitate payment processing according to one embodiment. In FIG. 20, the user interface (201) is presented after the interchange (101) confirms that the user of the mobile phone (117) approves the transaction and after the interchange (101) provides the account information (121) to the server (113).

In one embodiment, after obtaining the account information (121) from the interchange (101), the server (113) may present the account information (121) in a form back to the user for confirmation and/or modification, as illustrated in FIG. 20.

For example, in FIG. 20, the account type (e.g., visa) and the account number are presented to the user. To improve security, the entry box (223) shows only a portion of the account number and hides the remaining portion of the account number. In some embodiments, the user is required to provide the portion of the account number that is hidden in the entry box (223); and the server (113) matches the portion obtained from the interchange (101) and the portion obtained from the user via the entry box (223) to determine whether to accept the request.

In some embodiments, the interchange (101) may provide only a portion of the account number (e.g., the first or last portion of the account number); and the user interface (201) requires the user to complete the remaining portion of the account number. In some embodiments, the interchange (101) does not provide the account number; and the user interface (201) requires the user to provide the account number.

In one embodiment, the interchange (101) also provides other information, such as billing address (221), shipping address, etc. Such information can be displayed in the user interface (201) as the default values for user confirmation. Thus, if the user accepts the default values, the user does not have to provide manual input, which provides convenience and improves user experience.

In some embodiments, the server (113) may directly process the payment using the account number and/or complete the transaction using the user information (129) without presenting it to the user. For example, after obtaining the account information (121) from the interchange (101), the server (113) may communicate with the account server (125) to charge the user for the purchased products and/or services; and after successfully charging the user, the server (113) may further present the shipping information to the user (e.g., as illustrated in FIG. 19), without showing the account information (121). In one embodiment, the user stores a preference option on the data storage facility (107) to indicate whether to request the interchange (101) to pay the servers (113) on behalf of the user, or to request the interchange (101) to release the account information (121) to the server (113) when needed. In one embodiment, the user may specify such a preference when the user confirms a payment request via the mobile phone (117) having the phone number (123).

Figure 21:
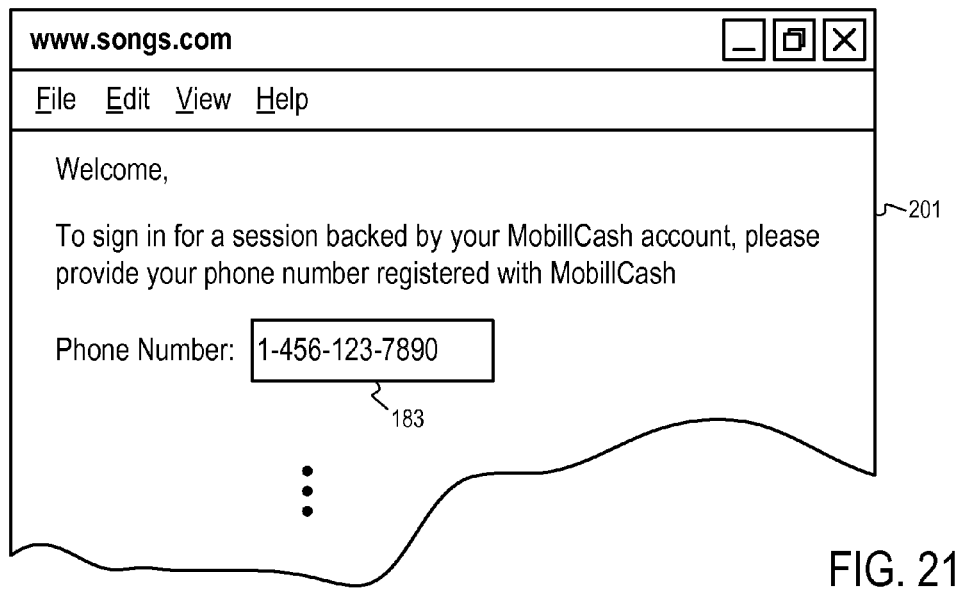
FIGS. 21 and 22 illustrate user interfaces for authentication according to some embodiments.
Figure 22:
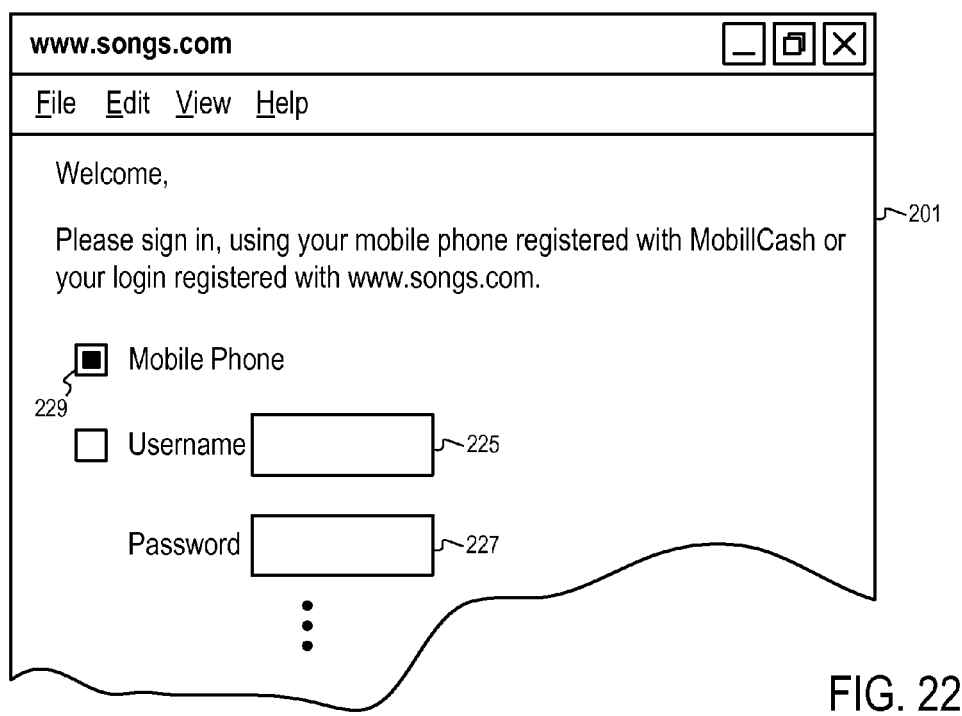

FIGS. 21 and 22 illustrate user interfaces for authentication according to some embodiments.

In FIG. 21, the user interface (201) allows the user to provide the phone number (123) in the entry box (183) to start an authenticated session. In one embodiment, after the server (113) receives the phone number (123) from the entry box (183), the server (113) requests the interchange (101) to confirm the identity of the user via the mobile phone (117).

For example, the interchange (101) may transmit an SMS message (or a voice message, or an email) to the mobile phone (117) at the phone number (123). When an appropriate reply to the SMS message is received back from the mobile phone (117), the interchange (101) determines that the user identity is confirmed.

For example, the interchange (101) may provide a one time code to the user (e.g., via the server (113) or via the mobile phone (117)) and request the user to provide the one time code back to the interchange (101) via the mobile phone (117) (e.g., via an SMS message, via a voice call, via a web request from the mobile phone (117) having the phone number (123), etc.). In some embodiments, the server (113) may generate the one time code, and requests the user to submit the code to the interchange (101) to complete the authentication process. The interchange (101) and/or the server (113) may determine if the code received from the mobile phone (117) matches the code provided (e.g., the code generated by the server (113) or the code generated by the interchange (101)).

In some embodiment, the one time code may be provided to the mobile phone (117) at the phone number (123) and the user is required to provide the one time code back to the server (113) and/or the interchange (101) to complete the authentication process.

In one embodiment, the server (113) (or the interchange (101)) may request a correct password or personal identification number (PIN), transmitted from the mobile phone (117) having the phone number (123) via the interchange (101), to complete the authentication process.

In one embodiment, the authentication process serves as an advance approval for payment requests occurring in the session. For example, after the authentication process, the web session on the user terminal (111) is associated with the phone number (123); and before the web session is timed out (or the user signs out of the web session), payment requests can be processed using the phone number (123) without having to provide the phone number (123) again from the user terminal (111) and/or to receive a communication from the user via the mobile phone (117) at the phone number (123) to confirm the payment requests.

In one embodiment, the web session authenticated via the interchange (101) is associated with a particular website of a merchant or service provider. For example, the authenticated web session can be used as an advanced approval for the particular website but not for a different website. In another embodiment, the web session authenticated via the interchange (101) is associated with the user terminal (111) and is applicable to different websites. For example, the authenticated web session initiated via one website may be used as an advance approval for other websites visited during the session.

In one embodiment, the user information (129) includes login credentials of the user with the server (113). When the user entity is confirmed with the mobile phone (117) having the phone number (123), the login credentials of the user can be provided from the data storage facility (107) to the server (113) to start an authenticated session, as illustrated in FIG. 22.

In FIG. 22, the user may select the option (229) to sign in via the mobile phone (117). Once the mobile phone option is selected in the user interface (201) illustrated in FIG. 22, the user is directed to a website of the interchange (101), which obtains the mobile phone number (123) from the user. After communicating with the mobile phone (117) at the phone number (123) to confirm the login request, the interchange (101) provides the corresponding login credentials of the user to server (113) to start an authenticated session on the server (113).

In one embodiment, after the server (113) obtains the login credentials (e.g., username and/or password) from the interchange (101), the server (113) may present the information in entry boxes (225 and 227) as default values, allowing the user to sign in by simply confirming the request. For security, the password may be presented as a string of hidden characters. The user may confirm the values and/or modify the values to sign into an authenticated session that is associated with both the server (113) and the interchange (101).

In one embodiment, after the server (113) obtains the login credentials (e.g., username and/or password) from the interchange (101), the server (113) may sign the user in directly without presenting the login credentials back to the user. Thus, the user does not have to provide additional input to the server (113) to sign in, after the request is confirmed via the interchange (101).

In one embodiment, the communications to confirm the user identity may involve communications via the server (113). For example, a one time code may be provided or received via the server (113) and the mobile phone (117) having the phone number (123). In some embodiments, the user is required to submit the password via the mobile phone (117) to sign into the server (113) for a web session running on the user terminal (111).

In one embodiment, the user may use the entry boxes (225 and 227) of the user interface (201), shown in FIG. 22, to sign into a session at the server (113) directly, without going through the interchange (101). During the session, when the payment is required, the user may provide the mobile phone number (123) to confirm the payment request via the mobile phone (117).

Alternatively, during the session the server (113) may identify the user by the login information to the interchange (101), which then looks up the phone number (123) via matching the login information and then confirming the payment request via communications with the mobile phone (117) at the phone number (123). Thus, during the session the user does not have to separately identify the phone number (123) in a payment request.

In one embodiment, during the session, after the first payment request is confirmed via communications with the mobile phone (117), the session is associated with both the server (113) and the interchange (101); and subsequent payment requests in the session may not require confirmation via the mobile phone (117).

In some embodiments, the user information (129) may not include login credentials for the server (113). After the interchange (101) confirms the identity of the user via the mobile phone (117), the interchange (101) does not provide login credentials to the server (113); however, the interchange (101) may indicate to the server (113) that the identity of the user is confirmed and that the user is associated with the phone number (123); and the server (113) may start a session for an account assigned to the phone number (123). In some embodiments, the interchange (101) may not even give the phone number (123) to the server (113); instead, a token (e.g., a user identifier) representing the phone number (123) may be used to identify the user to the server (113), and the token can be used in subsequent communications between the server (113) and the interchange (101) to identify the phone number (123) and the associated user.

Figure 23:
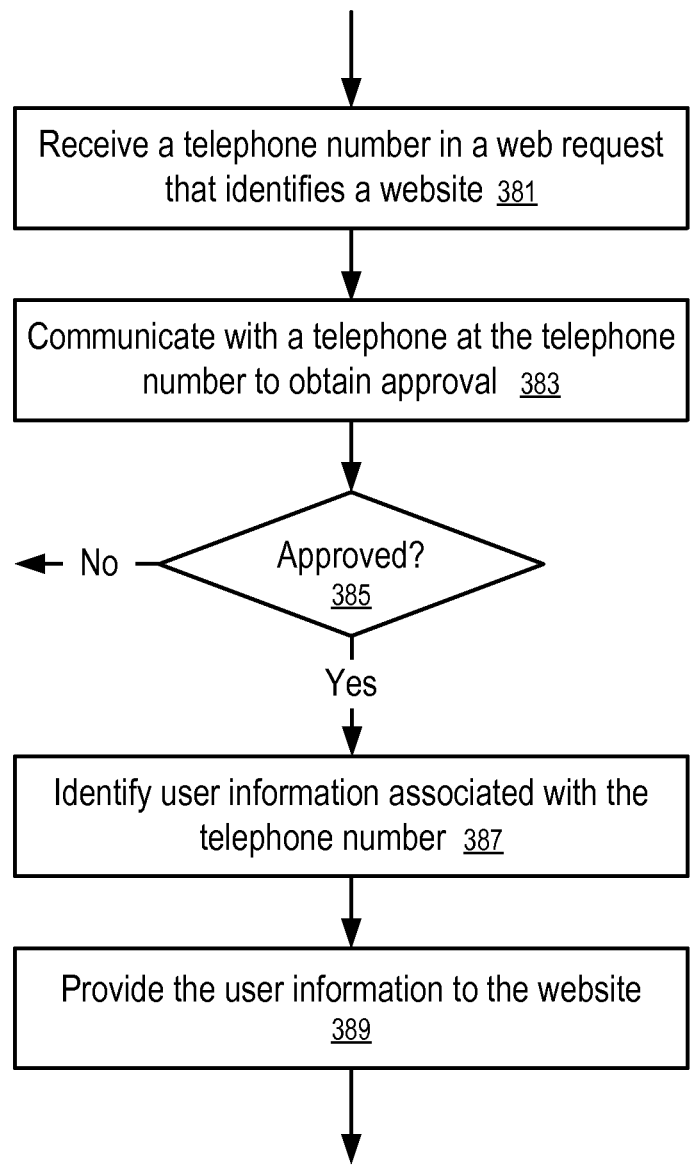
FIG. 23 shows a method to provide information according to one embodiment.

FIG. 23 shows a method to provide information according to one embodiment. In FIG. 23, a phone number (123) is received (381) in a web request that identifies a website. The web request may be forwarded from a server (113) to the interchange (101), after the user provides the phone number (123) to the server (113). Alternatively, the web request may be received directly in the interchange (101) from the user terminal (111), after the server (113) forwards the request to the interchange (101). In some embodiments, the server (113) sends the web request to the interchange (101) via an application programming interface (API) or a web service.

Using the phone number (123), the interchange (101) communicates (383) with a mobile phone (117) at the phone number (123) to obtain approval from the user. In some embodiments, the interchange (101) obtains the advance approval prior to the web request. The user information (129) may be an address of the user, a login credential of the user at a third party website, or financial account information of the user, such as a credit card number, a debit card number, and a bank account number, etc.

In one embodiment, to obtain the approval the interchange (101) transmits a message to the mobile phone (117) at the phone number (123) and receives a reply to the message back from the mobile phone (117). In one embodiment, the message and reply are transmitted via short message service (SMS).

In one embodiment, to obtain the approval the interchange (101) transmits a first code to the mobile phone (117) at the phone number (123), provides a web page in response to the web request, and receives a second code in the web page in the server (113). The interchange (101) marches the first code with the second code to determine whether to approve the providing of the user information (129) to the third party website.

In one embodiment, to obtain the approval the interchange (101) provides a first code in a web page in response to the web request, receives a second code from the mobile phone (117), and matches the first code with the second code to determine whether to approve the providing of the user information (129) to the third party website.

In one embodiment, to obtain the approval the interchange (101) receives, from the mobile phone (117) at the phone number (123), a first personal identification number (PIN) (or password) and matches the first PIN with a second PIN associated with the phone number (123) in the data storage facility (107) to determine whether to approve the providing of the user information (129) to the third party website.

In FIG. 23, if the web request is approved (385), the interchange (101) identifies (387) user information (129) associated with the phone number (123) and provides (389) the user information (129) to the website.

In one embodiment, the interchange (101) further makes a payment to the third party website in accordance with the web request, using funds associated with the phone number (123) of the user. The interchange (101) may collect the funds via at least one premium message originated from or terminated at the mobile phone (117) at the phone number (123), or by charging the user using the account information (121) associated with the phone number (123).

In one embodiment, advertisements are sent to mobile phones to enable the users of the mobile phones to purchase items via the interchange (101). For example, a merchant can send an advertisement message via wireless technology (e.g., cellular telecommunications, wireless wide area network (WWAN), wireless local area network (WLAN), wireless personal area network (WPAN), Bluetooth) to the mobile phone (117) of the user. For example, the advertisement can be selected and sent to the mobile phone (117), based on the location of the mobile phone (117), when the user approaches the merchant. The user can purchase the item presented on the advertisement via the interchange (101).

In one embodiment, merchants can send out mobile messages to alert users about deals on their sites. If the user simply replies to that message, the interchange (101) can bill the purchase to the mobile phone (117).

In some embodiments, the interchange (101) stores the user information (129) in the data storage facility (107), such as the default address of the user which can be used to facilitate the completion of the transaction without further input from the user. In some embodiments, the user may also specify the shipping address in the reply to the advertisement message.

Figure 24:
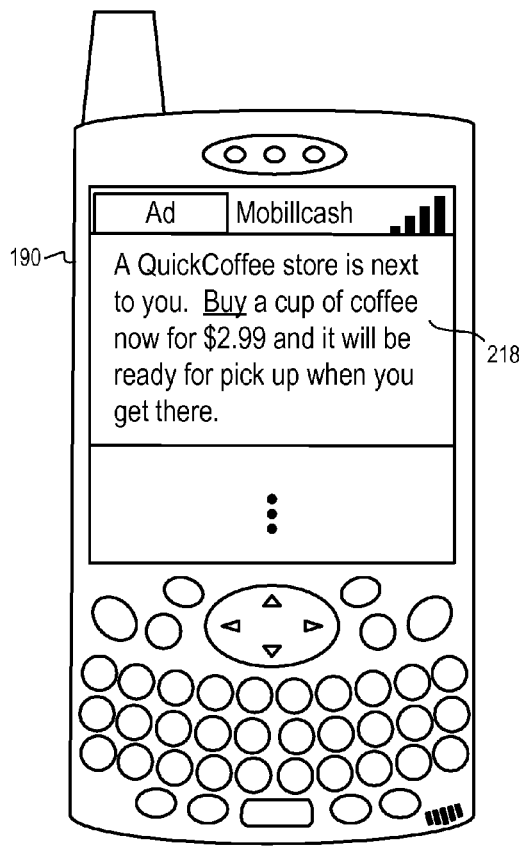
FIG. 24 shows an advertisement on a mobile phone according to one embodiment.

FIG. 24 shows an advertisement on a mobile phone according to one embodiment. In FIG. 24, the advertisement message (218) is presented on the mobile phone (117) at the phone number (123) when the mobile phone (117) is near the seller of the item presented in the advertisement.

In one embodiment, the mobile phone (117) determines its own location and transmits the location to a server (113) to obtain location dependent services; and the advertisement message (218) is transmitted to the mobile phone (117) in response to the location of the mobile phone (117). In another embodiment, a location server monitors the location of the mobile phone (117) based on wireless signals emitted from the mobile phone (117). A server (113) transmits the advertisement message (218) to the mobile phone (117) when the location and/or the preference of the user of the mobile phone (117) meet a set of requirements.

In one embodiment, the advertisement message (218) is transmitted from the server (113) of a merchant. For example, a location-based service provider may notify the server (113) of the merchant about the presence of the mobile phone (117) near the store of the merchant. In another embodiment, a centralized server (113) is configured to send the advertisement message (218) to the mobile phone (117) on behalf of the merchant.

In FIG. 24, the advertisement message (218) includes a "Buy" link, which can be selected by the user of the mobile phone (117) to generate a purchase request to buy the item presented in the advertisement message (218). In one embodiment, the selection of the "Buy" link causes the mobile phone (117) to send a text message, to submit a web or WAP request, or to send one or more premium messages to the interchange (101) (or the server (113) of the advertiser/seller).

In one embodiment, the purchase request from the mobile phone (117) is sent to the interchange (101). The purchase request includes an indication of the advertisement, which allows the interchange (101) to determine information about the purchase, such as the item to be purchased, the seller, the price, the quantity, etc. The interchange (101) then purchases the item as requested on behalf of the user, using funds associated with the phone number (123).

In another embodiment, the purchase request from the mobile phone (117) is sent to the server (113) of the merchant, which determines the amount for the purchase and communicates with the interchange (101) to request a payment.

In one embodiment, the purchase request also includes the phone number (123) of the mobile phone (117) to identify the buyer. The interchange (101) uses the funds associated with the phone number (123) to pay for the purchases. In one embodiment, the phone number (123) of the mobile phone (117) on which the purchase request is generated is added to the purchase request to identify the buyer. In one embodiment, the phone number (123) of the mobile phone (117) to which the advertisement message (218) is sent is embedded in the advertisement message (218) and included in the purchase request.

In one embodiment, both the phone number to which the advertisement message (218) is sent and the phone number at which the purchase request is generated are included in the purchase request. The interchange (101) may skip the operations to confirm the transaction with the mobile phone (117) at the phone number (123), when the phone number to which the advertisement message (218) is sent is the same as the phone number at which the purchase request is generated, when the purchase request (177) is generated via a reply message, and/or when the purchase matches a pattern of prior transactions determined based on the transaction history (127).

In some embodiments, the advertisement message may include the offer of a plurality of items. The user may select and purchase a subset of the items by specifying the selected items. In some embodiments, the user can further specify selected options for the purchased items and/or the quantities of the items to be purchased.

In one embodiment, the advertisement message is encoded such that when the advertisement message is selected (or replied to), a request is transmitted from the mobile phone (117) to the interchange (101), which identifies the items purchased and the seller of items, and purchases the items from the seller on behalf of the user. The interchange (101) uses the funds associated with the phone number (123) of the mobile phone (117) to pay for the purchases.

For example, the interchange (101) may send premium messages to the mobile phone (117) at the phone number (123) to collect funds for the purchase via the telecommunication carrier of the mobile phone (117). For example, the interchange (101) may send a message to the mobile phone (117) to instruct the user to send premium messages to the interchange (101) to provide the funds for the purchase. In some embodiments, the advertisement message is configured to cause the mobile phone (117) to send the premium message to the interchange (101) when the items in the advertisement message are selected for purchase. In some embodiments, the interchange (101) uses the account information (121) associated with the phone number (123) on the data storage facility (107) to communicate with the account server (125) to obtain the funds from the account of the user for the purchase.

In some embodiments, the advertisement message (218) is sent to the mobile phone (117) via short message service (SMS). The user may reply to the advertisement message (218) to generate the purchase request. In one embodiment, the advertisement message (218) is configured to have the reply sent to the interchange (101). Alternatively, the advertisement message (218) is configured to have the reply sent to the server (113) of the merchant (or the centralized advertisement agency). In one embodiment, the interchange (101) is configured to send the advertisement message (218) to the mobile phone (117). In another embodiment, the server (113) of the merchant sends the advertisement message (218) to the mobile phone (117).

Figure 25:
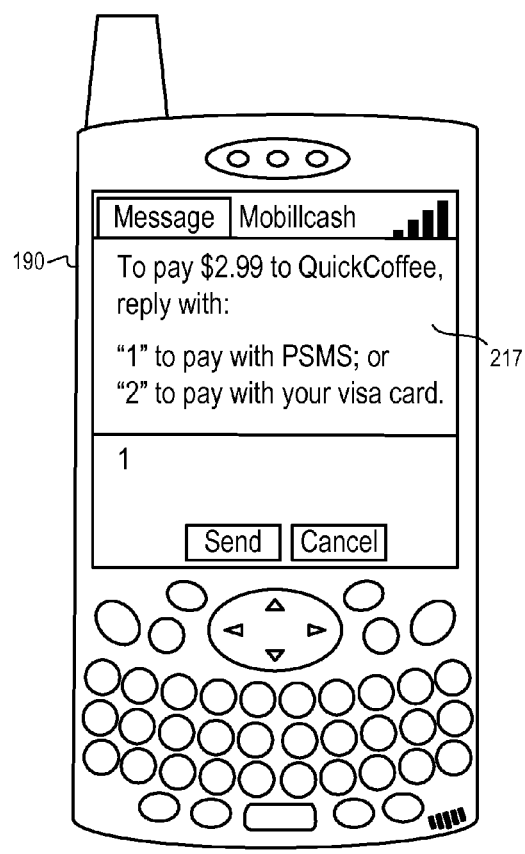
FIG. 25 shows a message to confirm a purchase made via an advertisement on a mobile phone according to one embodiment.

In one embodiment, in response to the purchase request generated on the mobile phone (117) when the advertisement message (218) in FIG. 24 is selected or replied to, the interchange (101) transmits a confirmation message (217), as illustrated in FIG. 25, to the mobile phone (117) to request a confirmation of the purchase request. In another embodiment, the interchange (101) may skip the confirmation message (217), when the purchase request is generated on the mobile phone (117) at the phone number (123).

FIG. 25 shows a message to confirm a purchase made via an advertisement on a mobile phone according to one embodiment. In FIG. 25, the confirmation message (217) provides the user with a number of options to pay for the purchase. For example, the user may select the option "1" to pay for the purchase with funds collected via the interchange (101) sending premium messages to the mobile phone (117). For example, the user may select the option "2" to pay for the purchase using the account information (121) associated in the data storage facility (107) with the phone number (123), such as a credit card number (or a debit card number, or a bank account).

In one embodiment, after the interchange (101) pays for the purchase using the funds associated with the phone number (123), the interchange (101) provides the mobile phone (117) with an electronic receipt, which indicates that the user of the mobile phone (117) has purchased and paid for the item.

In one embodiment, the receipt includes a code (e.g., a one time code), which can be presented to the merchant to obtain the purchased item. For example, the user may show the code to the merchant to pick up the purchased item.

In some embodiments, the purchased item is a virtual object which can be delivered to the user via the mobile phone (117). For example, the virtual object may be a song, an article, a receipt, a video clip, etc. In some embodiments, the virtual object may be delivered to the user via an email address associated with the phone number (123) in the data storage facility (107). In another embodiment, the purchased item is to be delivered to a street address of the user (e.g., identified from the user information (129)).

Figure 26:
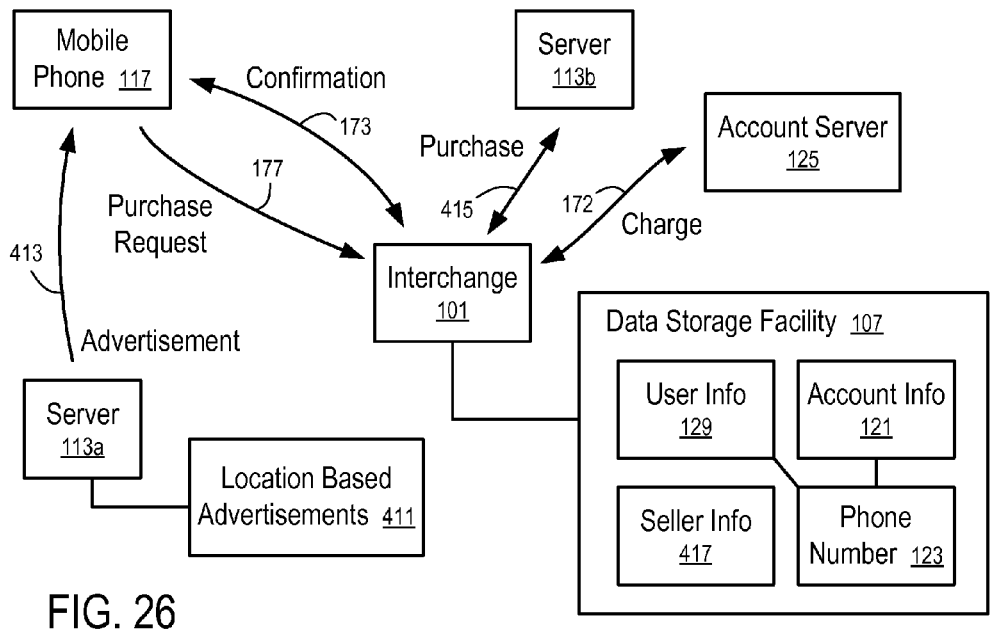
FIGS. 26-28 illustrate systems to facilitate purchases on a mobile phone according to some embodiments.
Figure 27:
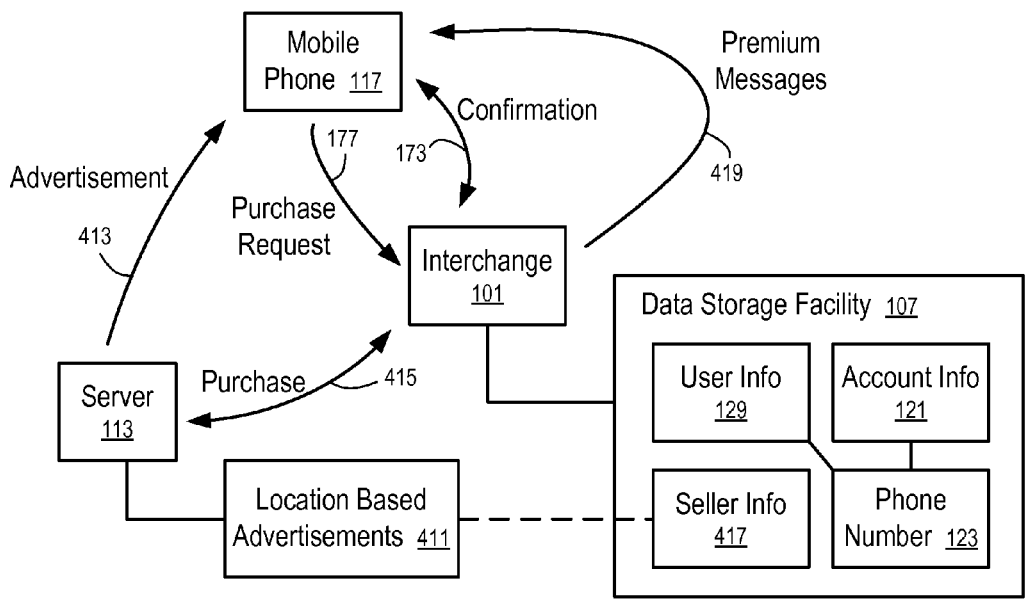
Figure 28:
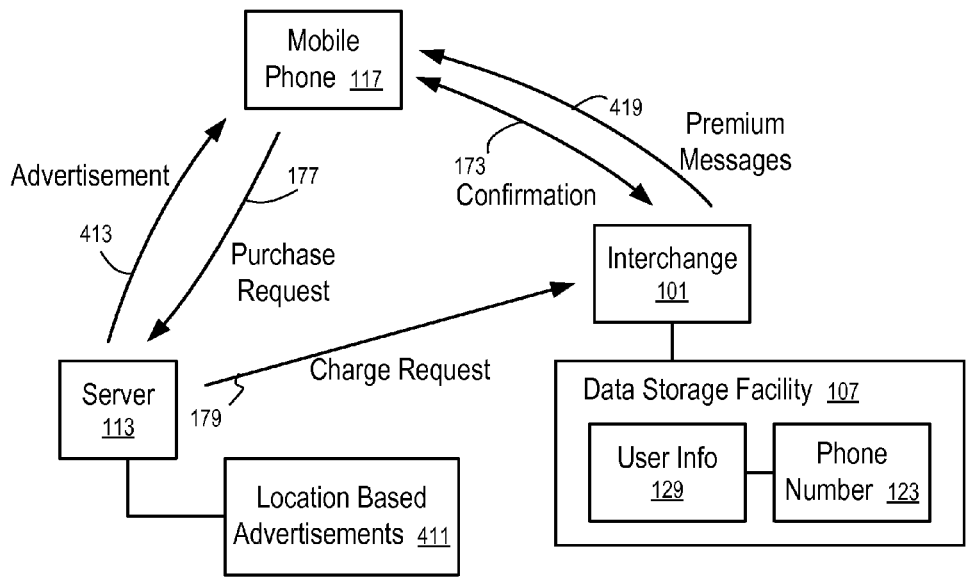

FIGS. 26-28 illustrate systems to facilitate purchases on a mobile phone according to some embodiments.

In FIG. 26, the server (113a) is configured to present location based advertisements (411) to the mobile phone (117). For example, an advertisement (413) may be selected from the location based advertisements (411) according to the current location of the mobile phone (117). The advertisement (413) includes the indication of an item, which is sent to the interchange (101) together with the purchase request (177) when the user of the mobile phone (117) selects the advertisement (413).

In FIG. 26, the purchase request (177) includes the phone number (123) of the mobile phone (117). The interchange (101) communicates with the mobile phone (117) for the confirmation (173). If the purchase request (177) is confirmed with the mobile phone (117), the interchange (101) communicates with server (113b) of the seller to make the purchase (415) on behalf of the user of the mobile phone (117).

In one embodiment, the interchange (101) stores the seller information (417) to identify the items and/or the sellers based on the information received from the purchase request (177). For example, the advertisement may include a code to represent the item and/or the seller. The purchase request (177) includes the code; and the interchange (101) uses the code to look up the item and/or the seller from the seller information (417) from the data storage facility (107).

In one embodiment, the data storage facility (107) also stores the account information (121) associated with the phone number (123). The interchange (101) uses the account information (121), such as a credit card number, a debit card number, a bank account number, etc., to collect funds from the user of the mobile phone (117) via electronic communications with the account server (125).

In one embodiment, the server (113a) configures the advertisement (413) to generate the purchase request (177) to the interchange (101) when the advertisement (413) is selected or replied to (e.g., by embedding a reference to the interchange (101) in the advertisement (413)). In some embodiments, the interchange (101) generates a code to represent the item and/or the seller; the code is provided to the sever (113a) for embedding in the advertisement (413). When the code is received from the mobile phone (117) in the purchase request (177), the interchange (101) uses the code to identify the corresponding item and/or seller.

In some embodiments, the server (113a) stores the seller information for the local based advertisements (411). After the interchange (101) receives the purchase request (177) that includes an identification of the advertisement (413), the interchange (101) communicates with the server (113a) to obtain details about the item for the confirmation (173) and/or the seller information for the purchase (415) on behalf of the user of the mobile phone (117).

In some embodiments, the advertisement (413) is sent from the server (113) of the merchant, as illustrated in FIG. 27. In FIG. 27, the interchange (101) registers items to be advertised as seller information (417) and provides codes to the server (113) of the merchant to represent the items. The server (113) of the merchant embeds the code in the advertisement (413), which is transmitted as part of the purchase request (177) to the interchange (101). In response to the purchase request (177), the interchange (101) extracts the code to identify the items purchased by the user and communicates with the server (113) of the merchant to make the purchase (415) on behalf of the user of the mobile phone (117).

In FIG. 27, after the confirmation (173) of the purchase request (177), the interchange (101) transmits premium messages (419) to the mobile phone (117) to collect funds for the purchase. Alternatively, the interchange (101) may use the account information (121) associated with the phone number (123) in the data storage facility (107) to electronically charge an account of the user to collect the funds.

In some embodiments, the server (113) of the merchant communicates with the mobile phone (117) to present the advertisement (413) and to receive the purchase request (177), as illustrated in FIG. 28. In FIG. 28, the sever (113) of the merchant sends a charge request (179) to the interchange (101). The charge request (179) includes the phone number (123) of the mobile phone (117) that made the purchase request (177). Thus, in response to the charge request (179), the interchange (101) communicates with the mobile phone (117) to confirm the charge request (179). Once the charge request (179) is confirmed, the interchange (101) sends premium messages (419) to the mobile phone (117) to collect funds to satisfy the charge request (179).

Figure 29:
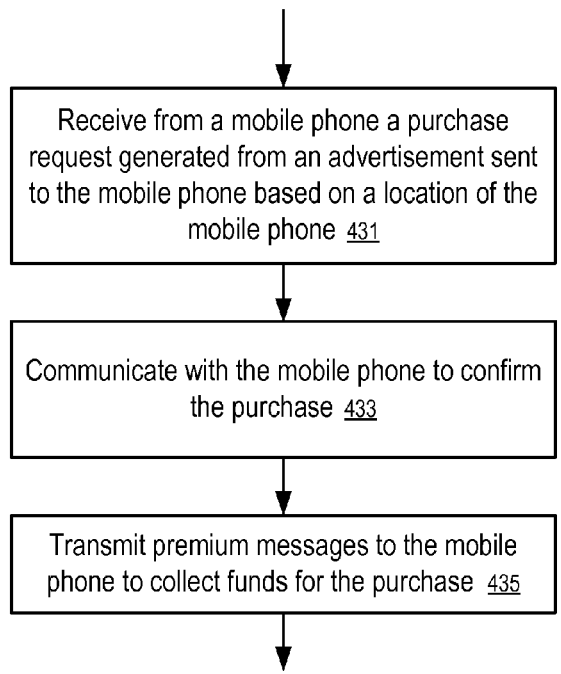
FIGS. 29-30 show methods to facilitate purchases on a mobile phone according to some embodiments.
Figure 30:
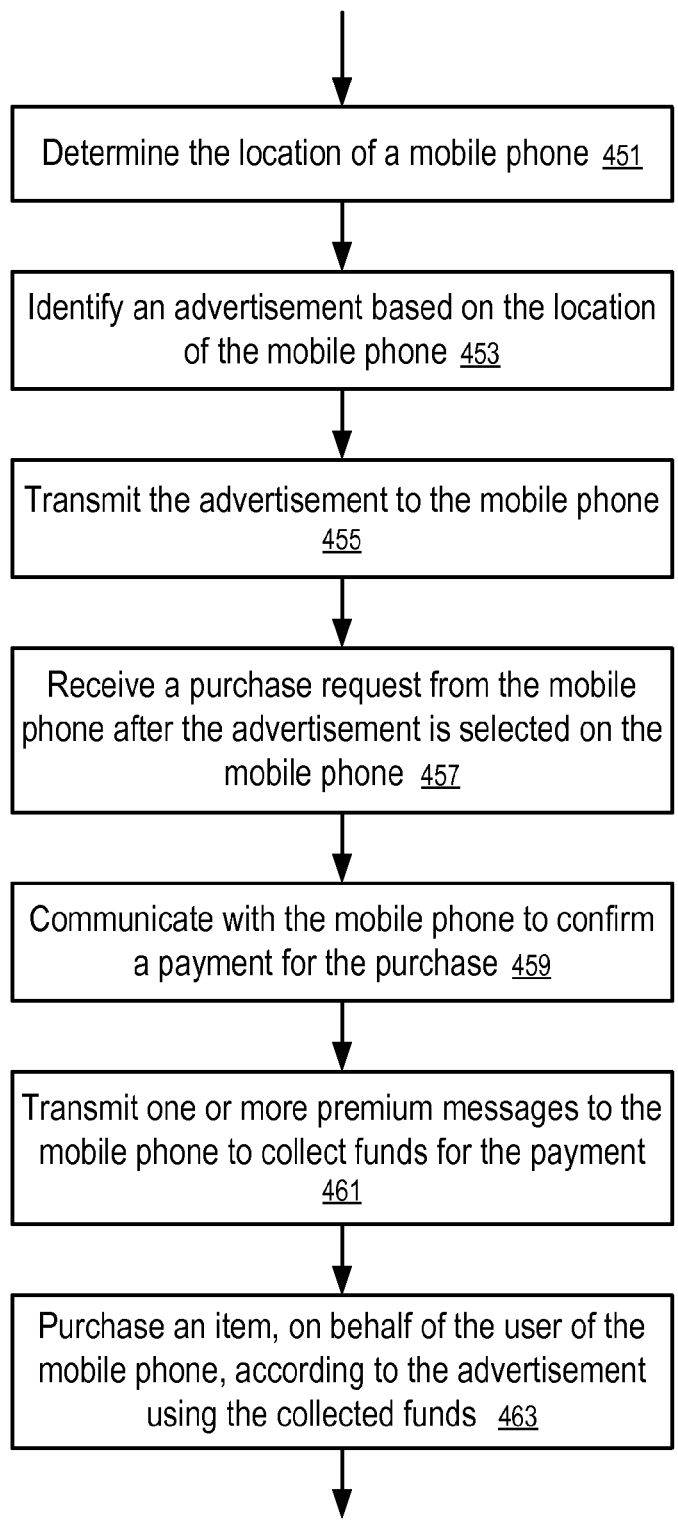

FIGS. 29-30 show methods to facilitate purchases on a mobile phone according to some embodiments.

In FIG. 29, the interchange (101) receives (431) from a mobile phone (117) a purchase request (177) generated from an advertisement (413) sent to the mobile phone (117) based on a location of the mobile phone (117). The interchange (101) communicates (433) with the mobile phone (117) to confirm the purchase and transmits (435) premium messages (419) to the mobile phone (117) to collect funds for the purchase.

In FIG. 30, after the location of a mobile phone (117) is determined (451), an advertisement is identified (453) based on the location of the mobile phone (117). The location may be determined by the mobile phone (117) based on wireless signals received at the mobile phone (117), such as Global Positioning System (GPS) signals, cellular telecommunication signals, etc. Alternatively, the location may be determined by a server based on signals transmitted from the mobile phone (117), such as cellular telecommunication signals received at one or more base stations for cellular communications. The advertisement may be identified by the interchange (101), the server (113) of a merchant, or the server (113a) of an advertisement agency. The advertisement is transmitted (455) to the mobile phone (117) for presentation to the user.

In FIG. 30, the interchange (101) receives (457) a purchase request (177) from the mobile phone (117) after the advertisement (413) is selected on the mobile phone (117). The purchase request (177) includes the phone number (123) of the mobile phone (117). The interchange (101) thus communicates (459) with the mobile phone (117) at the phone number (123) to confirm a payment for the purchase.

In one embodiment, the interchange (101) transmits (461) one or more premium messages (419) to the mobile phone (117) to collect funds for the payment.

In one embodiment, the interchange purchases (463) an item on behalf of the user of the mobile phone (117), according to the advertisement (413), using the collected funds.

In one embodiment, the interchange (101) stores seller information (417) identifying an item and a seller of the item. The item is presented in an advertisement (413) on a mobile phone (117) at a phone number (123). The advertisement (413) includes an indication of the item offered in the advertisement (413) and a reference to the interchange (101). When the advertisement (413) is selected (or replied to), the advertisement (413) causes the mobile phone (117) to generate a purchase request (177) that includes the indication of the item offered in the advertisement (413) and the phone number (123) of the mobile phone (117). The interchange (101) identifies the seller based on the indication of the item and the seller information (417) stored by the server computer to electronically purchase the item on behalf of a user of the mobile phone (117).

In one embodiment, the one or more premium messages are sent to the mobile phone (117) in response to the user confirming the request via the mobile phone (117). In other embodiments, premium messages are sent to the mobile phone (117) to collect funds into an account hosted on the interchange (101) before the purchase request (177) is made.

In one embodiment, to confirm the purchase request (177), the interchange (101) sends a message to the mobile phone (117) at the phone number (123) via short message service (SMS) and receives a reply to the message via SMS. If no reply is received from the mobile phone (117) within a predetermined period of time, the purchase request (177) is rejected.

In one embodiment, the seller has a presence near the location of the mobile phone (117); and after the user purchases the item via the mobile phone (117), the user can go to the seller to pick up the purchased item. In one embodiment, the seller delivers the item electronically to the mobile phone (117).

In one embodiment, the interchange (101) sends to the mobile phone (117) a message to confirm completion of purchasing the item from the seller, such as a message containing a receipt for the purchase. In one embodiment, the message includes a code identifying that the item is paid for by the user of the mobile phone (117).

In one embodiment, the interchange (101) identifies an address of the user based on the user information (129) stored with the phone number (123) on the data storage facility (107). The interchange (101) communicates the address of the user to the seller to facilitate delivery of the item. The address may be an email address for the delivery of virtual goods (and/or the receipt, a token representing the purchases item, etc.), or a street address for the delivery of physical goods.

In one embodiment, the interchange (101) receives from the seller the information identifying the item and the seller of the item, and provides to the seller a code to be embedded in the advertisement (413). The code is to cause the advertisement (413) to include the reference to the interchange (101) and the indication of the item. In one embodiment, the code is to further cause the purchase request (177) to include the phone number (123) of the mobile phone (117).

In one embodiment, the advertisement (413) is received in the mobile phone (117) via text messaging; and the purchase request (177) is transmitted to the interchange (101) via text messaging.

In one embodiment, the interchange (101) offers a merchant mobile offer platform. For example, merchants can use the interchange (101) to send promotions, coupons, or discounts to mobile account users as stored values to be used as store credit, or as cash/credit. In one embodiment, the offers can be used as credit gift cards or as stored value within the account associated with a mobile phone number (123).

In one embodiment, users who receive the offers can send them to people (e.g., friends or family) in their address book on the mobile phone (117), or through their social network(s), email, or other internet based connections.

FIGS. 31-34 illustrate systems to provide offers according to some embodiments.

Figure 31:
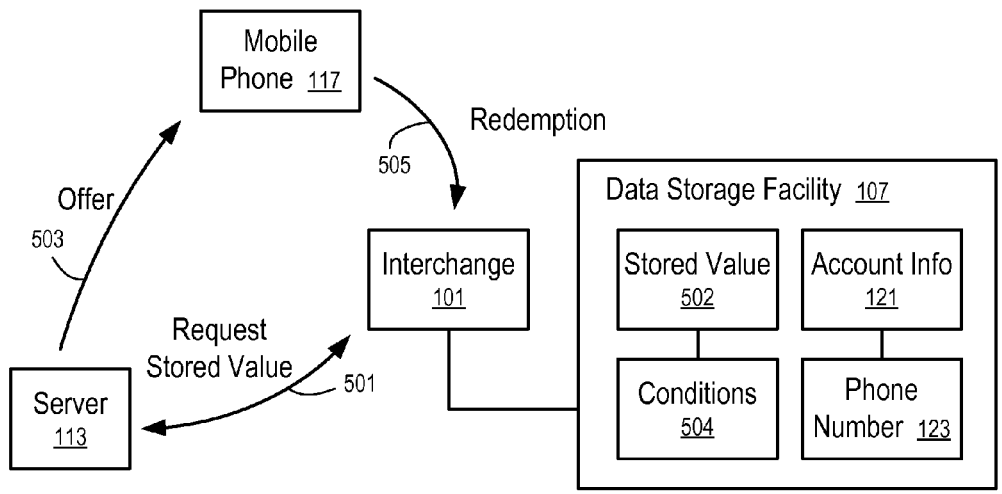
FIGS. 31-34 illustrate systems to provide offers according to some embodiments.

In FIG. 31, the server (113) of a merchant may register a stored value (502) with the interchange (101). The interchange (101) stores the stored value (502) with a set of conditions (504) that the merchant wants to enforce as prerequisites for the redemption of the stored value (502).

For example, the conditions (504) may include one requirement that the stored value (502) be used when making a purchase from the merchant. For example, the conditions (504) may include one requirement that the stored value (502) be used before a predetermined date. For example, the conditions (504) may include one requirement that the stored value (502) be used with a purchase above a predetermined amount. For example, the conditions (504) may include one requirement that the stored value (502) be used when an accumulated amount of purchases made within a predetermined period of time from the merchant is above a predetermined amount.

In some embodiments, the stored value (502) has no conditions attached for its redemption. Thus, the stored value (502) can be used as cash or credit from the interchange (101).

In another embodiment, the conditions (504) may be associated with a coupon offer that provides a discount, an incentive, a reward, etc. The stored value (502) has a predetermined value; and the merchant is to purchase the stored value (502) from the interchange (101) before providing the stored value (502) with the coupon offer.

Alternatively, the stored value (502) may be a predetermined portion of a purchase, such as a certain percent of an item to be selected and purchased by a customer of the merchant. The stored value (502) is to be deducted from the purchase.

In other embodiments, the stored value (502) is paid by the merchant at the time the stored value (502) is redeemed. For example, the stored value (502) may be provided as a reward, and may not be conditioned upon a future purchase. When the stored value (502) is redeemed by a user, the merchant is debited for the amount corresponding to the stored value (502).

In one embodiment, the stored value (502) is represented by a code, or a reference to the stored value (502). In response to the request from the server (113), the interchange (101) provides the code, or the reference to the stored value (502), to the server (113), which allows the server (113) to provide an offer (503) with the stored value (502).

For example, the offer (503) may include an advertisement (413) to the mobile phone (117). The advertisement (413) may include the code, or the reference to the stored value (502), as a coupon to provide an incentive, a discount, or a rebate.

In another embodiment, the server (113) may provide the offer (503) as a reward for past purchases, or other activities (e.g., providing a referral, viewing an advertisement).

In one embodiment, the server (113) may provide the offer (503) without going through the interchange (101). For example, the server (113) may obtain the phone number (123) of the mobile phone (117) (e.g., from the user) and transmit the offer (503) to the mobile phone (117) via SMS, email, WAP, or other communications protocols.

In FIG. 31, the user may provide the code, or the reference to the stored value (502), back to the interchange (101) for redemption. For example, the code, or the reference to the stored value (502), can be provided for redemption (505) in a confirmation message for a payment request in connection with a purchase, in accordance with the conditions (504).

For example, the mobile phone (117) may provide the code representing the stored value (502), or the reference to the stored value (502), to the interchange (101) via an SMS message, or an email.

In one embodiment, the user may use a web browser running on the user terminal (111) separate from the mobile phone (117) to provide the code representing the stored value (502), or the reference to the stored value (502), to a web portal of the interchange (101). The user may use the web browser to identify the phone number (123) of the mobile phone (117) to deposit the stored value (502) with the phone number (123).

In one embodiment, to complete depositing the stored value (502) with the phone number (123), the interchange (101) may send a message to the mobile phone (117) at the phone number (123) for a confirmation. When a confirmation is received from the mobile phone (117), the stored value (502) is associated with the phone number (123) (e.g., as being deposited by the interchange (101) into the account associated with the phone number (123)).

In one embodiment, once the stored value (502) is associated with the phone number (123), the interchange (101) monitors events related to the phone number (123) against the set of conditions (504) for the application of the stored value (502).

For example, the application of the stored value (502) may be triggered by a payment transaction for a purchase from the server (113). When the purchase from the server (113) causes the conditions (504) to be met, the interchange (101) uses the stored value (502) towards the payment transaction for the purchase.

Since the interchange (101) automatically monitors the conditions for the application of the stored value (502), the user of the mobile phone (117) does not have to look for the code representing the stored value (502), or the reference to the stored value (502), when making the purchase (or making the payment for the purchase). However, the user does have to deposit the stored value (502) into an account associated with the phone number (123) prior to making the purchase. The interchange (101) may allow the user to provide the code representing the stored value (502) with the confirmation (173) of the payment or purchase.

In one embodiment, the stored value (502) can be used only once. Once it is redeemed, it is marked invalid. Alternatively, the stored value (502) may be used multiple times (e.g., like a discount coupon).

Figure 32:
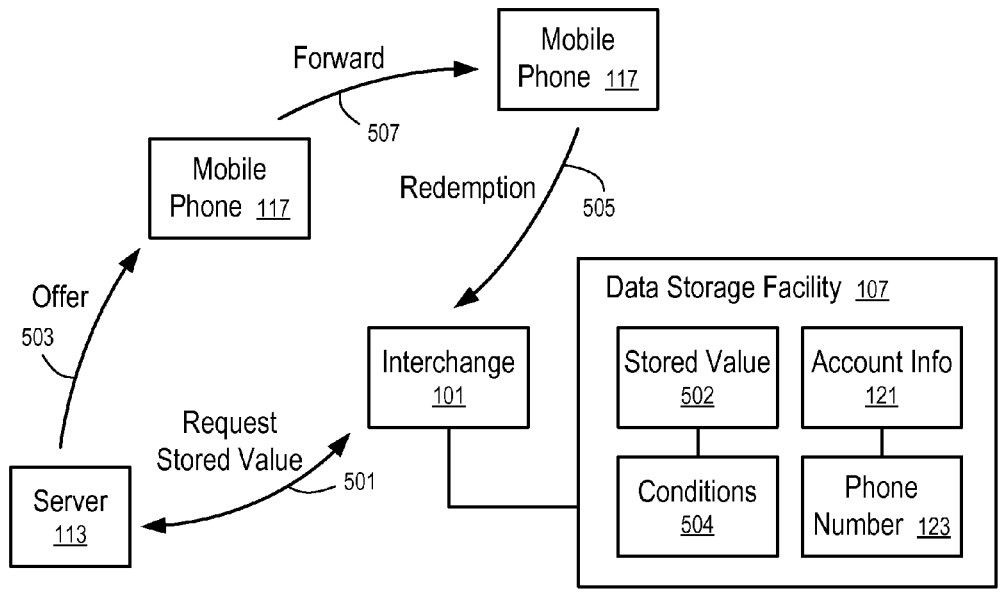

In one embodiment, the stored value (502) is configured to be transferrable, as illustrated in FIG. 32. For example, the code representing the stored value (502), or the reference to the stored value (502), may be forwarded (507) from one mobile phone (117) to another mobile phone (117), before the redemption (505) of the stored value (502).

In one embodiment, when the stored value (502) can be used multiple times by multiple users (e.g., as allowed by the conditions (504)), the stored value (502) can be associated with multiple phone numbers (123). Alternatively, copies of the stored value (502) can be created and associated with different users, if the different users individually provide the code representing the stored value (502) to make a deposit.

In one embodiment, the stored value (502) is to be used by one user (e.g., represented by one phone number (123)). After the stored value (502) is associated with one phone number (123), the previous user is still able to forward (507) the stored value (502) to the next user. When the interchange (101) receives the code representing the stored value (502) for deposit by the next user, the interchange (101) may transmit a message to the previous user for the confirmation of the transfer. If the transfer is confirmed via communicating with the mobile phone (117) at the phone number (123) of the previous user, the interchange (101) re-associates the stored value (502) with the phone number of the next user. Thus, the stored value (502) is associated with one phone number (123) at a time; and the transfer of the stored value (502) may or may not require a confirmation communication between the mobile phone (117) of the previous user and the interchange (101). In one embodiment, the interchange (101) identifies the previous user by looking up the phone number (123) to which the stored value (502) is associated.

Figure 33:
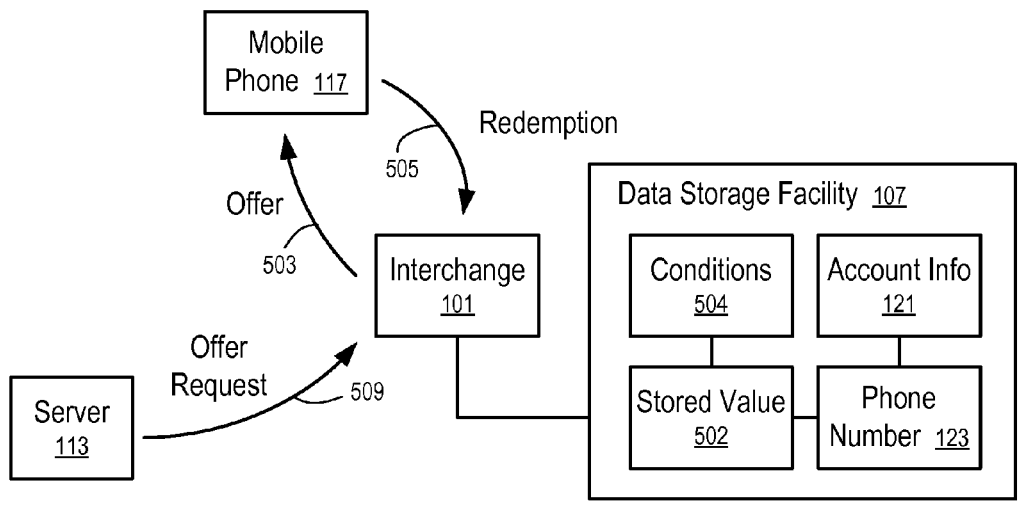

In one embodiment, the stored value (502) is provided to a mobile phone (117) via the interchange (101), as illustrated in FIG. 33. In FIG. 33, in response to the offer request (509) from the server (113) of the merchant, the interchange (101) generates the code representing the stored value (502), records the conditions (504) for the use of the stored value (502), associates the stored value (502) with the phone number (123), and provides the code in an offer (503) to the mobile phone (117) at the phone number (123) (e.g., according to the phone number (123) specified by the server (113) in the offer request (509)).

In one embodiment, the server (113) may request the interchange (101) to provide the offer (503) to mobile phones at different phone numbers. The interchange (101) may link the same stored value (502) with multiple phone numbers, or create multiple copies of the stored value (502) for the different phone numbers.

After the offer (503) arrives at the mobile phone (117), the user of the mobile phone (117) may transfer the offer (503) or propagate the offer (503) to other users, via sending a request to the interchange (101), specifying the code representing the stored value (502) and the phone number of the destination mobile phone. Thus, the stored value (502) is always associated with the correct phone number (123), until the stored value (502) expires, is used or becomes invalid.

In one embodiment, when there is a transaction associated with the phone number (123), the interchange (101) is to check whether there is a stored value (502) associated with the phone number (123) (e.g., deposited in the account represented by the phone number (123)); and if there is a stored value (502), the interchange (101) checks the conditions (504) to determine whether the stored value (502) can be applied to the transaction. Thus, after the stored value (502) is associated with the phone number (123), the interchange (101) can automatically apply the stored value to relevant transactions. The user does not have to remember to apply the stored value (502).

In some embodiments, the interchange (101) provides a web portal to allow the user to view the stored values (502) that are associated with the phone number (123) of the user; and the user may provide one of the stored values (502) to another user (e.g., a friend or a family member). In one embodiment, the user may initiate a purchase required by the conditions (504) to redeem the stored value (502).

In one embodiment, the server (113) (or the merchant operating the server (113)) pays the interchange (101) for the stored value (502) when the stored value (502) is requested (e.g., 501 or 509). The stored value (502) may not have a condition associated with the server (113) or the merchant operating the server (113). The stored value (502) can be viewed as cash, or as stored/purchased credit with the interchange (101). The merchant may provide such cash-type stored values (502) to provide refunds, rewards, etc. The stored value (502) can be redeemed once, after which the stored value (502) becomes invalid, depleted, or expired.

In some embodiments, the stored value (502) may have more value than what is required in a transaction. After such a transaction, the balance of the stored value (502) is decreased; and the user of the phone number (123) may use it for the next transaction, if it is allowed by the conditions (504).

In one embodiment, one of the conditions (504) of the stored value (502) requires a transaction with the merchant operating the server (113). For example, the stored value (502) can be provided as a coupon redeemable for a purchase from the merchant. The stored value (502) can be provided as an incentive or rebate attached to an advertisement. The stored value (502) may be replicated for distribution to different users, when permitted by the conditions (504) attached to the stored value (502). The merchant does not have to pay the interchange (101) when requesting such a stored value (502). The interchange (101) settles the cost for the stored value (502) with the merchant at the time of processing the transaction that is required by the conditions (504).

Figure 34:
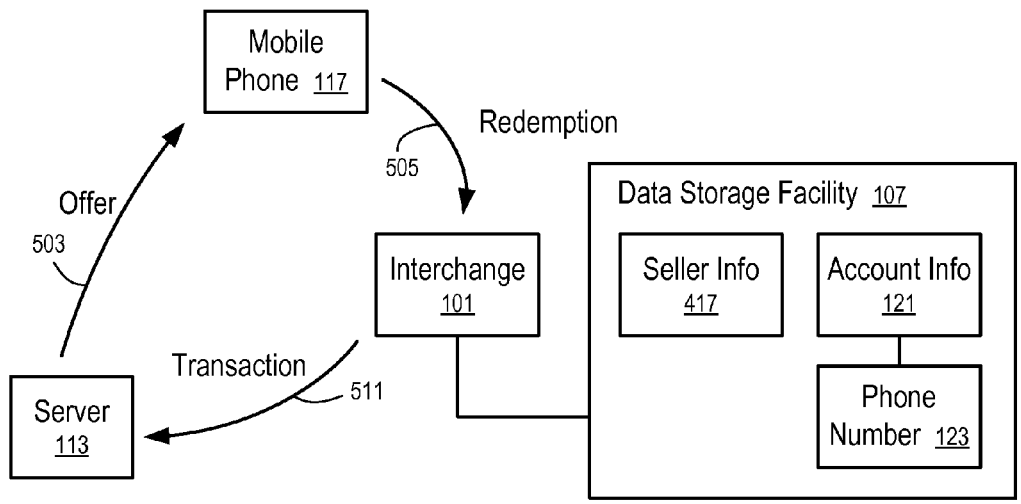

In one embodiment, the server (113) may not pre-request the stored value (502) from the interchange (101), as illustrated in FIG. 34. The server (113) may provide to the mobile phone (117) an offer (503) that includes an identification of the merchant and a value redeemable through the interchange (101). When the mobile phone (117) provides the offer (503) to the interchange (101) for redemption (505), the interchange (101) matches the identification of the merchant with the seller info (417) to identify the server (113) and communicate with the server (113) for a transaction (511) involving the redemption. In one example, the transaction (511) involves a payment transaction for a purchase made according to the offer (503) and the settlement of the value specified in the offer (503). In another example, the transaction (511) involves charging the merchant for the value provided in the offer (503), when there is no purchase required in the offer (503) (e.g., when the offer (503) represents a cash reward, or a gift).

Figure 35:
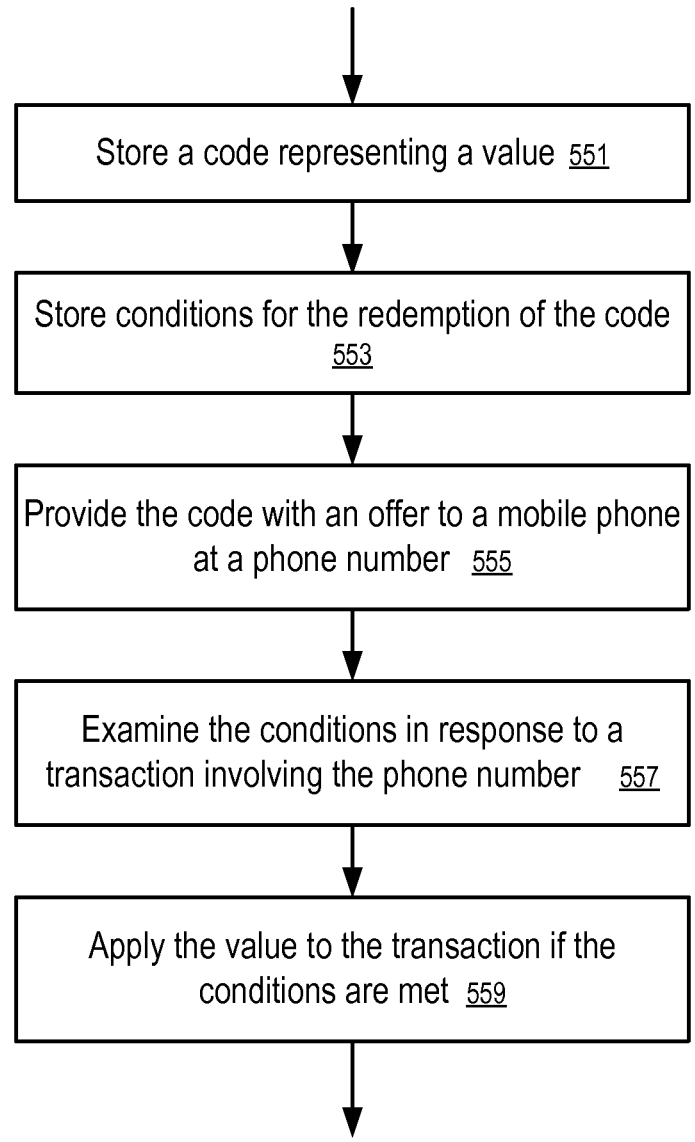
FIG. 35 shows a method to provide offers according to one embodiment.

FIG. 35 shows a method to provide offers according to one embodiment. In FIG. 35, the interchange (101) is to store (521) a code representing a stored value (502), store (523) conditions (504) for the redemption of the code, provide (525) the code with an offer (503) to a mobile phone (117) at a phone number (123), examine (527) the conditions (504) in response to a transaction involving the phone number (123), and apply (529) the stored value (502) to the transaction if the conditions (504) are met.

In one embodiment, the stored value (502) is a fixed amount (e.g., a predetermined cash reward, rebate, incentive, etc.). Alternatively, the stored value (502) may be an amount based on the amount of a future transaction (e.g., a predetermined percent of the purchase price of one or more items in a predetermined category, etc.)

In one embodiment, the interchange (101) is to transmit a message to the mobile phone (117) at the phone number (123) to provide the offer (503) and the code, in response to a request from a merchant. The request from the merchant includes the offer (503) and specifies the stored value (502). The interchange (101) generates the code in response to the request from the merchant and transmits the message on behalf of the merchant. In one embodiment, the request from the merchant also includes the phone number (123). Alternatively, the request from the merchant does not include the phone number (123); and the interchange (101) identifies the phone number (123) on behalf of the merchant.

In one embodiment, the interchange (101) charges the merchant the stored value (502) in response to the generation of the code. Alternatively, the interchange (101) charges the merchant the stored value (502) in response to a communication from the mobile phone (117) that causes the redemption of the stored value (502).

In one embodiment, the interchange (101) is to further store data associating the code representing the stored value (502) with the phone number (123) (e.g., in response to receiving the code from the mobile phone (117) at the phone number (123), or in response to the interchange (101) transmitting the code to the mobile phone (117) at the phone number (123)).

For example, one sending user may transmit the code to the mobile phone of a receiving user; and the receiving user may transmit the code to the interchange (101). In response to receiving the code from the receiving user, the interchange (101) removes data that associates the code with the sending user and stores data to associate the code with the receiving user. In another example, the sending user may send the code via the interchange (101) by specifying the phone number of the receiving user and identifying the code. In response to transmitting the code to the receiving user to fulfill the request from the sending user, the interchange (101) re-associates the code with the receiving user.

In one embodiment, the interchange (101) examines the conditions (504) in response to a payment transaction for a purchase made by the user of the phone number (123) according to the offer (503). In one embodiment, the purchase is from the same merchant that provides the offer (503), as required by the conditions (504). Alternatively, the conditions (504) may not require the purchase from the same merchant that provides the offer (503); and the stored value (502) may be redeemed in a purchase from another merchant that is different from, and not related to, the merchant that provides the offer (503) (e.g., the offer (503) and the conditions (504) do not identify the merchant from which the purchase that includes the redemption of the offer (503) is made). In some embodiments, the conditions (504) may specify a different merchant (e.g., when the merchants have an agreement for cross promotion) for the redemption of the offer (503)).

In one embodiment, the interchange (101) is configured to provide credits or refunds from merchants to the mobile phone (117) at the phone number (123), through which respective payments were made to the merchants. In one embodiment, the interchange (101) is to store the credits or refunds as stored value credits for the respective phone number (123).

In one embodiment, the merchant provides a credit or refund as store credit, which is to be used only at the store of the same merchant. Alternatively, the merchant may provide the credit or refund in a "cash" type by not imposing limits on the use of the amount of the credit or refund. In some embodiments, the merchant may provide the credit or refund in a combination of a first amount of store credit and a second amount of "cash."

In some embodiments, the interchange (101) allows the merchant to impose certain conditions on the availability and/or the use of the refund or credit. For example, the merchant may specify that the refund or credit be used by the user before an expiration date; if the credit or refund is not used by the user by the expiration date, the offer of refunds or credits is cancelled. For example, the merchant may specify that the credit or refund be used by the user in transactions with a designated set of merchants, such as business partners of the merchant; and the credit or refund cannot be used for purchases from merchants outside the designated set of merchants.

Figure 36:
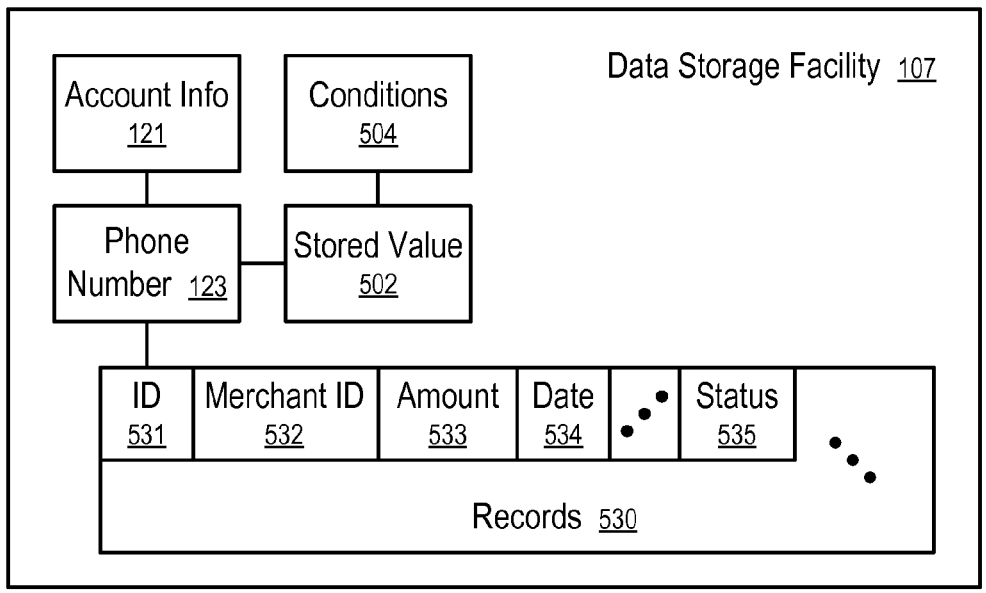
FIG. 36 shows a data record to provide refunds or credits according to one embodiment.

FIG. 36 shows a data record to provide refunds or credits according to one embodiment. In FIG. 36, the data storage facility (107) of the interchange (101) stores records (530) of payments processed by the interchange (101).

In one embodiment, a payment record includes a plurality of fields, such as payment ID (531), merchant ID (532), amount (533), date (534), status (535), etc.

In one embodiment, the ID (531) representing the payment is linked to the phone number (123) to indicate that the payment is made and/or confirmed via the phone number (123).

In one embodiment, the ID (531) is provided to the merchant to identify the payment, without revealing the phone number (123) to the merchant. For example, when the server (113) of a merchant redirects the web browser of the user to a web page of the interchange (101) to process a payment, the interchange (101) provides the ID (531) as an identification of the payment request (e.g., via associating the ID (531) with an identifier provided by the server (113) to identify the payment request). In one embodiment, the ID (531) is the same as the identifier provided by the server (113) to identify the payment request. In some embodiments, the server (113) is to communicate with the interchange (101) directly to request the ID (531) for a payment, before communicating with the user to process the payment and/or redirecting the user to the interchange (101); and the server (113) then uses the ID (531) to identify the payment request.

In one embodiment, the merchant ID (532) identifies the merchant and/or the server (113) of the merchant. The interchange (101) may selectively present records having the merchant ID (532) to the corresponding merchant represented by the merchant ID (532). For example, the merchant may use a web portal of the interchange (101) to view a list of payment records processed by the interchange (101), to check the statuses of the payments, to select a payment, and/or to provide refund or credit towards the selected payment.

In one embodiment, the amount (533) specifies the amount paid to the merchant. In another embodiment, the amount (533) specifies the total amount the user is charged for the payment; and the total amount includes the amount paid to the merchant and the amount incurred as a cost for processing the payment, such as a fee charged by the interchange (101), and/or the fee charged by the telecommunication carrier when the funds for the payment are collected via one or more premium messages sent to the mobile phone (117) of the user. In some embodiments, various amounts discussed above are stored in the payment record. In one embodiment, a full refund or credit offers the amount (533) that is paid to the merchant, but not the cost incurred in processing the payment. In another embodiment, a full refund or credit offers the amount (533) the user is charged for the payment, including the cost incurred in processing the payment.

In one embodiment, the date (534) of the payment request is recorded. In one embodiment, the date (534) that the payment was sent to the merchant is recorded. In one embodiment, the date (534) of the settlement of the payment with the merchant is recorded. In one embodiment, the date (534) of the settlement of the payment with the user is recorded. In some embodiments, various dates discussed above are stored in the payment record.

In one embodiment, the status (535) is to indicate the current stage of the payment request. For example, the status (535) may indicate that the interchange (101) is waiting for a confirmation of the payment request from the mobile phone (117) at the phone number (123), that the user has confirmed the payment request via the mobile phone (117), that a payment authorization has been sent to the merchant, that the payment has been settled with the merchant, that the payment has been settled with the user, or that the payment has been cancelled, refunded, or credited back to the user.

In one embodiment, a payment record further includes other fields, such as a description of the product and/or service purchased via the payment, a stock keeping unit (SKU) number of the product and/or service purchased via the payment, etc. Some embodiments have fewer fields than what is illustrated in FIG. 36.

In one embodiment, the interchange (101) allows a merchant to provide an amount of value back to the user in connection with the payment without the merchant knowing the phone number (123) of the user. For example, the merchant may provide a full refund of the payment, or provide an amount of store credits against the payment. The user may use the store credits for further purchases from the same merchant.

In one embodiment, in response to the request from the merchant to provide the amount of value back to the user, the interchange (101) stores data representing the stored value (502), which may have one or more conditions (504) imposed on the use or redemption of the stored value (502). For example, the conditions (504) may require that the user uses the stored value (502) before an expiration date, that the user uses the stored value (502) only at the server (113) of the merchant (or a set of merchants, such as the business partners of the merchant that provides the stored value), that the user makes a purchase from the merchant for an amount above a threshold, and/or that the user makes a purchase of goods or services of a particular category.

In one embodiment, the interchange (101) allows the merchant to provide the stored value (502) without the conditions (504) that limit the use of the stored value (502); and thus the stored value (502) can be used in a way resembling the use of "cash."

In one embodiment, when the stored value (502) is available from the merchant, the interchange (101) is to transmit a message to the mobile phone (117) at the phone number (123) to indicate the availability of the stored value (502). For example, the interchange (101) is to transmit a notification SMS message to the mobile phone (117) via one of the converters (131) appropriate for the controller (115) of the mobile phone (117).

In one embodiment, the interchange (101) charges the merchant in response to the request from the merchant to provide the amount of the value (502). For example, the interchange (101) may deduct the amount of the value (502) from an account of the merchant, or deduct the amount of the value (502) from funds to be transferred to the merchant if the status (535) indicates that the payment has not yet been settled with the merchant. Alternatively, the interchange (101) may postpone charging the merchant until the amount of the value (502) is used or redeemed by the user of the phone number (123); and thus, the interchange (101) can combine the operations to reduce cost.

In one embodiment, if the request from the merchant to provide the amount of the value (502) is received before the payment is settled with the user, the interchange (101) is to modify operations to obtain the funds from the user. For example, the interchange (101) may request a smaller amount of funds for the payment request, or cancel a request for funds previously sent for the settlement of the payment request with the user.

In one embodiment, the interchange (101) holds the stored value (502) in association with the phone number (123) until the stored value (502) is used by the user to pay for the next purchase.

In one embodiment, the interchange (101) is further configured to push the stored value (502) to one or more funding sources associated with the phone number (123) (e.g., in response to a request from the user of the phone number (123), or in accordance with a preference setting of the user).

For example, in one embodiment, the interchange (101) may transmit one or more premium messages to the phone number (123) to provide at least a portion of the stored value (502) to the user of the phone number (123).

For example, in one embodiment, the account information (121) includes credit card information (or debit card information, or bank account information); and the interchange (101) is to provide at least a portion of the stored value (502) to the user using the account information (121).

In one embodiment, the interchange (101) provides a user interface to allow the merchant to manage the payments. For example, the interchange (101) may provide a website to allow a merchant to sign in and view a list of the payment records that have the merchant ID (532) of the merchant. The merchant may select a payment from the list to issue refunds or credits. In one embodiment, the merchant may search for a payment record via specifying the ID (531) associated with the payment request, and/or other criteria, such as amount (533), date (534), status (535), etc.

Figure 37:
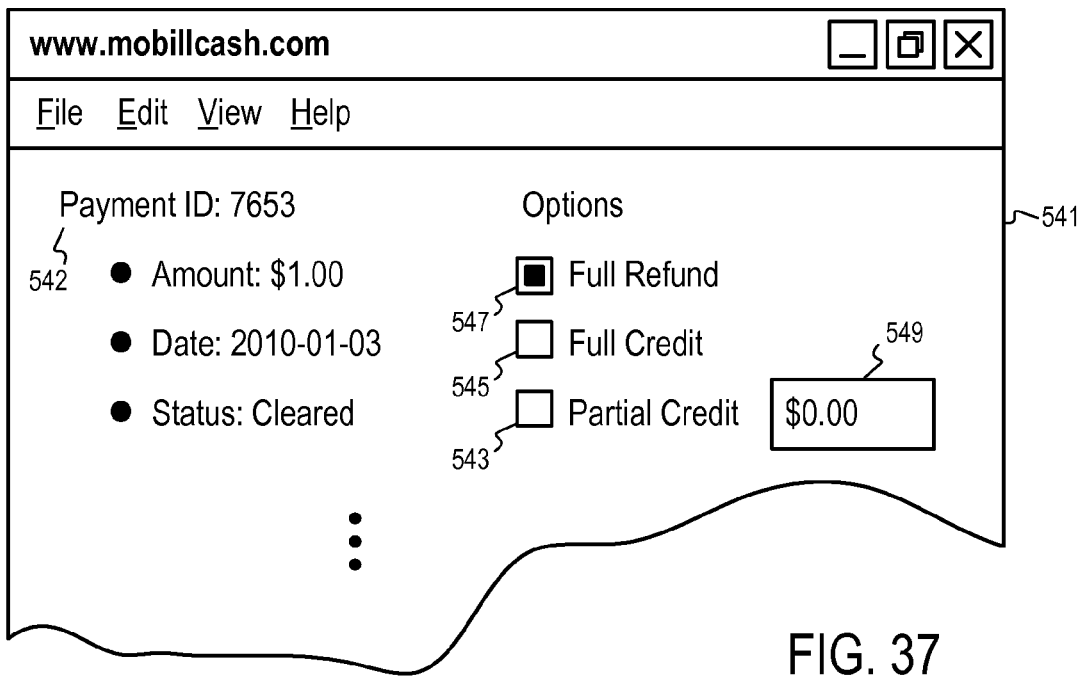
FIG. 37 illustrates a user interface to provide refunds or credits according to one embodiment.

FIG. 37 illustrates a user interface to provide refunds or credits according to one embodiment. In FIG. 37, the user interface (541) is presented via a web browser of the merchant. The user interface (541) provides a number of options (543-547) for the merchant to offer values to the user who made the payment identified by the payment ID (542).

In one embodiment, the user interface (541) presents various fields of the payment record to the merchant, such as amount (533), date (534), status (535), etc. However, in one embodiment, the user interface (541) does not present the phone number (123) associated with the payment record to the merchant to protect the privacy of the user and/or for security reasons.

In FIG. 37, the merchant can select the option (547) to provide a full refund according to the payment. When the full refund option (547) is selected, the merchant does not have to specify the amount of the refund. The interchange (101) is configured to determine the amount of the refund based on the amount (533) specified in the payment record.

In one embodiment, when the full refund option (547) is selected, the stored value (502) corresponding to the refund is not constrained with conditions (504). Alternatively, the merchant may be provided with further options to specify conditions (504) on how the stored value (502) provided by the refund can be used. For example, the merchant may request that the user accept the refund via a confirmation message from the mobile phone (117) through which the payment was initially made. For example, the merchant may specify that the confirmation message be received prior to an expiration date of the refund offer.

In FIG. 37, the merchant can select the option (545) to provide a full credit according to the payment. When the full credit option (545) is selected, the merchant does not have to specify the amount of the credit. The interchange (101) is configured to determine the amount of the credit based on the amount (533) specified in the payment record.

In one embodiment, when the full credit option (545) is selected, the stored value (502) corresponding to the credit is constrained with the condition (504) that the stored value (502) be used only towards future payments to the merchant that issues the credit. The merchant may be provided with further options to specify other conditions (504) on how the stored value (502) provided by the credit can be used. For example, the merchant may request that the user accept the credit via a confirmation message from the mobile phone (117) through which the payment was initially made. For example, the merchant may specify that the confirmation message be received prior to an expiration date of the credit offer.

In one embodiment, the merchant may specify a set of merchants which the stored value (502) can be used to pay. For example, the merchant may specify that the full credit can be used to make purchases from a plurality of business partners of the merchant.

In FIG. 37, the merchant can select the option (543) to provide a partial credit according to the payment. When the partial credit option (543) is selected, the merchant is to specify the amount of the credit using the entry box (543). Thus, the request from the merchant includes data that explicitly specifies the amount of the credit.

In one embodiment, the merchant is provided with other options, such as an option to provide a partial refund, an option to cancel a pending payment, an option to adjust a pending payment, etc.

Figure 38:
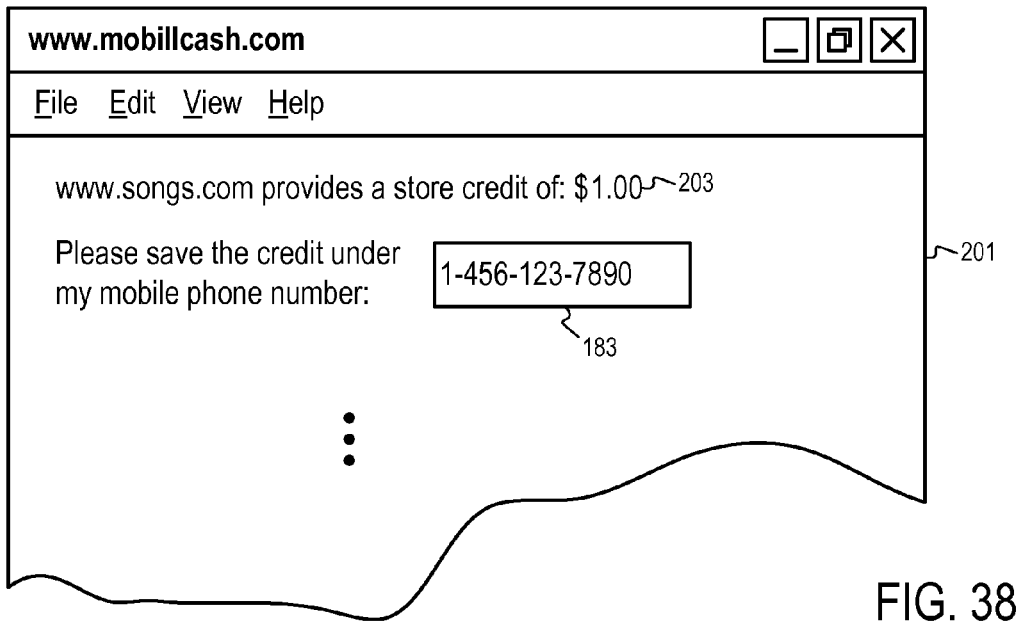
FIGS. 38 and 39 illustrate user interfaces to provide refunds or credits according to some embodiments.
Figure 39:
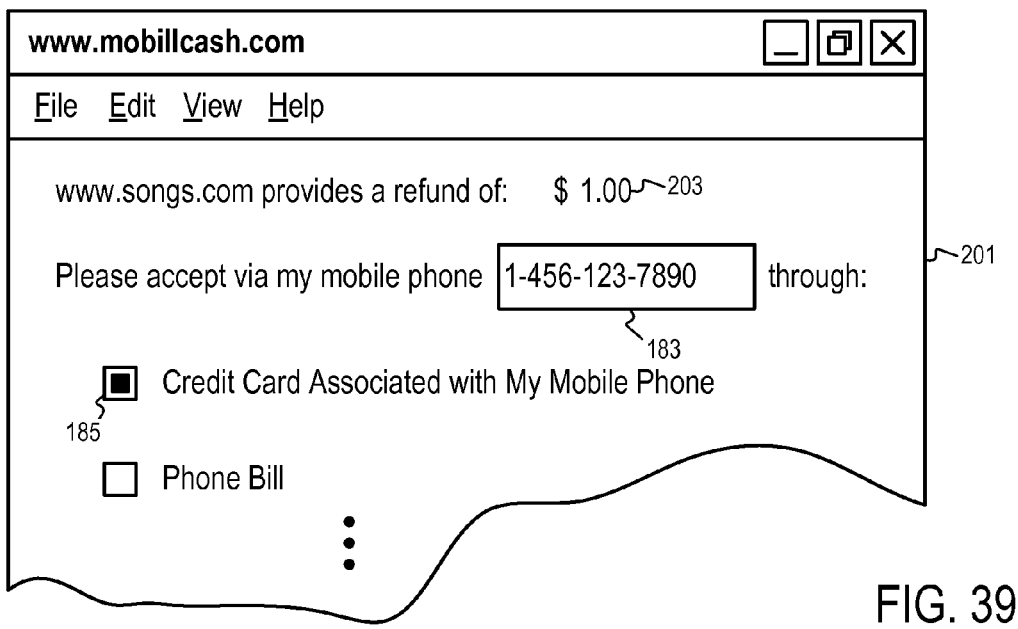

In one embodiment, the interchange (101) allows a merchant to provide credits or refunds in a way similar to requesting a payment, as illustrated in FIGS. 38 and 39.

In one embodiment, when the merchant decides to issue a credit to the user, the merchant uses the server (113) to redirect the user to the website of the interchange (101), which provides the user interface (201) in the web browser of the user, as illustrated in FIG. 38. The user interface (201) indicates the amount (203) of the credit and requests the user to identify the phone number (123) in the entry box (183) to receive the credit provided by the merchant.

In one embodiment, the user interface (201) may further include an identification of the prior payment, such as ID (531). For example, the server (113) may include the ID (531) in the URL when redirecting the user to the interchange (101) to provide the ID (531) to the interchange (101). The URL may further include parameters that represent the conditions (504) specified by the merchant.

In one embodiment, the interchange (101) is to determine whether the user is allowed to receive the credit through comparing the phone number (123) provided in the entry box (183) and the phone number (123) associated with the prior payment. If there is a mismatch in the phone numbers, the request from the user is rejected.

Alternatively, when the user interface (201) is generated based on an identification of the prior payment, such as ID (531), it is not necessary for the user to provide the phone number (123) in the entry box (183); and the interchange (101) can look up the phone number (123) based on the association between the phone number (123) and the payment record that includes the ID (531). In some embodiments, the user is allowed to provide an alternative phone number to receive the credit.

In one embodiment, after the user submits the form presented in the user interface (201), the interchange (101) stores the data to represent the stored value (502), as illustrated in FIG. 36.

In one embodiment, when the merchant decides to issue a refund to the user, the merchant uses the server (113) to redirect the user to the website of the interchange (101). The URL used to redirect the user to the interchange (101) may include parameters specifying the amount (203) and/or the identification of the prior payment, such as the ID (531). In response, the interchange (101) provides the user interface (201) in the web browser of the user, as illustrated in FIG. 39. The user interface (201) requests the user to identify the phone number (123) in the entry box (183) to receive the refund provided by the merchant.

In FIG. 39, the user is provided with a list of options to receive the refund. For example, the user may select option (185) to receive the refund on a credit card associated with the mobile phone (117) at the phone number (123). Alternatively, the user may request the refund to be applied to the phone bill of the mobile phone (117) at the phone number (123). Alternatively, the user may request the refund to be stored on the interchange (101) as the stored value (502), as illustrated in FIG. 36.

In one embodiment, when the refund is made towards a prior payment, the interchange (101) may determine the funding source of the prior payment, and automatically apply the refund to the corresponding funding source.

In one embodiment, when the credit or refund is provided to the user outside the context of a prior payment, the interchange (101) is configured to communicate with the mobile phone (117) at the phone number (123) specified in the entry box (183) to confirm the acceptance of the credit or refund.

The stored value (502) is attached to the phone number (123) after the confirmation is made via the phone number (123).

In one embodiment, the merchant may issue credits or refunds via coupons, in a way as illustrated in FIGS. 31-34. A code is generated to represent the coupon, which is provided to the user via the mobile phone (117) at the phone number (123). The coupon/code can be transferred by the user to a friend, or others, and/or deposited with the phone number (123) for automated redemption or use.

Figure 40:
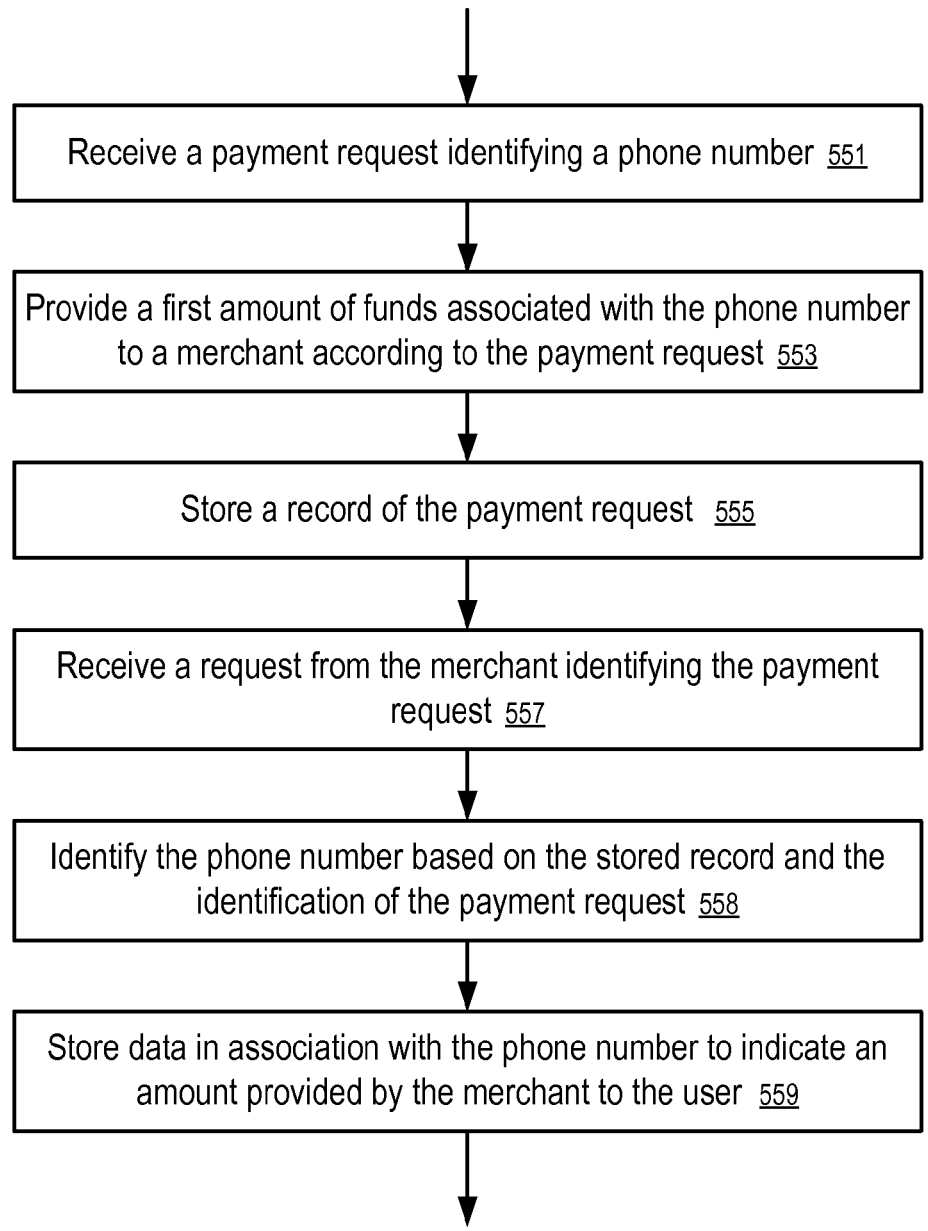
FIG. 40 illustrates a method to provide refunds or credits according to one embodiment.

FIG. 40 illustrates a method to provide refunds or credits according to one embodiment. In FIG. 40, a computing device (e.g., interchange (101)) is configured to receive (551) a payment request identifying a phone number (123), provide (553) a first amount of funds associated with the phone number (123) to a merchant according to the payment request, store (555) a record of the payment request, receive (557) a request from the merchant identifying the payment request, identify (558) the phone number (123) based on the stored record and the identification of the payment request, and store (559) data (e.g., 502) in association with the phone number (123) to indicate an amount provided by the merchant to the user, such as a credit or refund provided by the merchant to the user.

In one embodiment, the amount is available to the user of the mobile phone (117) at the phone number (123) only in a transaction in which the user pays the merchant via the computing device, as required by the conditions (504). In another embodiment, the availability of the amount is not based upon a future purchase from the merchant.

In one embodiment, the computing device further stores data (e.g., 504) to indicate one or more conditions for the availability of the amount.

In one embodiment, the amount can be applied to a transaction between the user and a merchant different from the merchant that provides the amount; and the computing device may transfer a portion of the amount directly from the merchant that provides the amount to the merchant involved in the transaction, in response to a payment request for the transaction.

In one embodiment, the computing device is configured to charge the merchant according to the amount in response to the request from the merchant to provide the credit or refund.

In one embodiment, the computing device is configured to block the merchant from obtaining the phone number (123) of the mobile phone (117) in a transaction to pay for the purchase and in the credit or refund process.

In one embodiment, the computing device is configured to transmit a premium message from the computing device to the mobile phone (117) to collect funds for a payment towards the purchase, prior to the receiving of the request.

In one embodiment, the computing device is configured to generate a code to represent the amount. The interchange (101) is to transmit a message to the mobile phone (117) of the user to inform the user of the availability of the amount and to provide the code. The user may send the code, and thus the amount of the credit or refund, to another user. A user receiving the code may deposit the code, and thus the associated amount of the refund or credit, with the computing device in connection with the phone number (123) of the user.

In one embodiment, the amount is equal to a price of the purchase paid by the user, such as a price that includes a fee charged by the computing device, or a price that is paid to the merchant.

In one embodiment, the interchange (101) is configured to facilitate the transfer of funds to a mobile phone (117). Any person can use the interchange (101) to send money to a mobile phone number (123). In one embodiment, the interchange (101) is to send money to a person identified or represented by a phone number (123) (e.g., MSISDN (Mobile Station International Subscriber Directory Number)), or an account and destination mobile number.

For example, a merchant can send money via the interchange (101) to the phone number (123) of a customer (e.g., as cash back, rebate, etc.). For example, a parent can send money via the interchange (101) to the mobile phone (117) of a child. For example, a person can send money via the interchange (101) to a friend of the person. For example, a family member can send money via the interchange (101) to a mobile phone (117) of another family member. For example, a person can send money via the interchange (101) to a charity organization.

In one embodiment, a sender may request the interchange (101) to send money to the phone number (123) via a text message, a mobile application, a form embedded in a web page of the interchange (101), or a phone call to a voice portal or a customer service representative of the interchange (101).

In one embodiment, the interchange (101) is to authenticate the requester and/or confirm the request via communications with a mobile phone (117) of the sender, before sending the money from the sender to the recipient.

In one embodiment, the sender may request the interchange (101) to send money from a particular funding source associated with the mobile phone (117) of the sender. Examples of the funding source include the mobile phone bill, a credit card, a prepaid card, a debit card, a bank account, a checking account, a stored value/credit account, etc. The stored value may be credits from refunds from merchants, or user added credits from adding money from personal bank accounts, credit accounts or user deposited amounts. In one embodiment, the stored value account is hosted on the interchange (101) and pre-associated with the phone number (123), as illustrated in FIG. 36. In one embodiment, the stored value account is hosted on a third party payment intermediary service.

In one embodiment, the funding source is pre-associated with the phone number (123) of the sender in the data storage facility (107) of the interchange (101); and the requester of the transaction is to use the phone number (123) of the sender to identify the funding source.

In some embodiments, the requester has the option to directly or explicitly identify a particular funding source (e.g., the account number) without specifying the phone number (123) of the mobile phone (117) of the sender.

In one embodiment, a recipient is allowed to request the transfer via an initial communication with the interchange (101). For example, the recipient may request the transfer of money from a sender via a text message to the interchange (101) identifying the phone number of the sender and the phone number of the recipient. In other examples, the request can be made via a mobile application running on the mobile phone of the recipient, a form embedded in a web page of the interchange (101), or via a phone call to a voice portal or a customer service representative of the interchange (101). The interchange (101) is to communicate with the mobile phone of the sender to confirm the transaction prior to perform the transaction.

Figure 41:
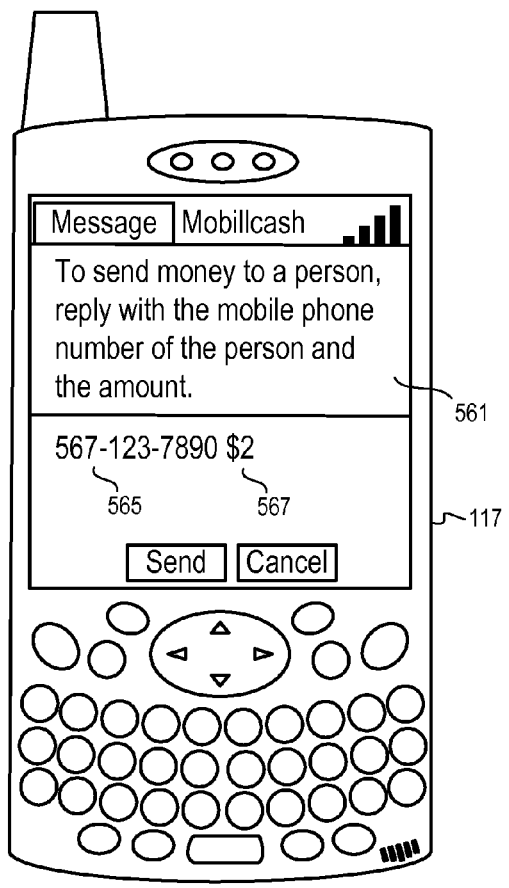
FIGS. 41-43 illustrate user interfaces to send funds to a phone number according to one embodiment.
Figure 42:
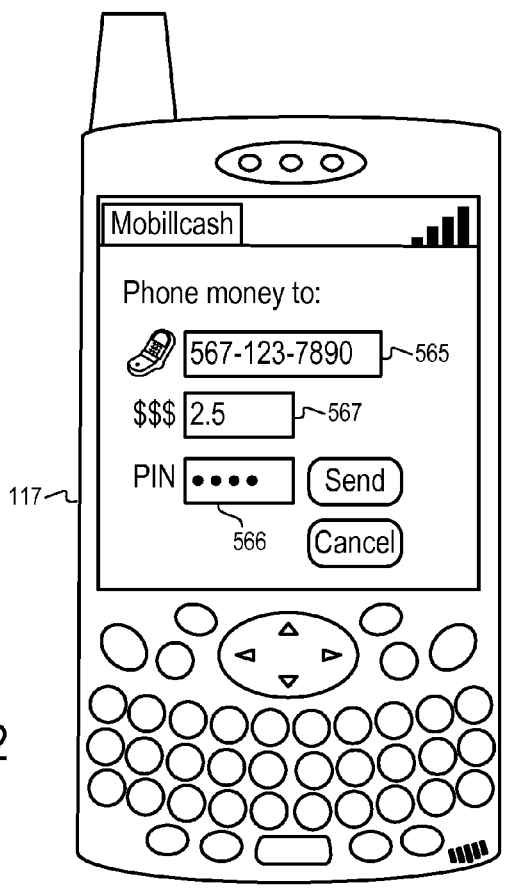
Figure 43:
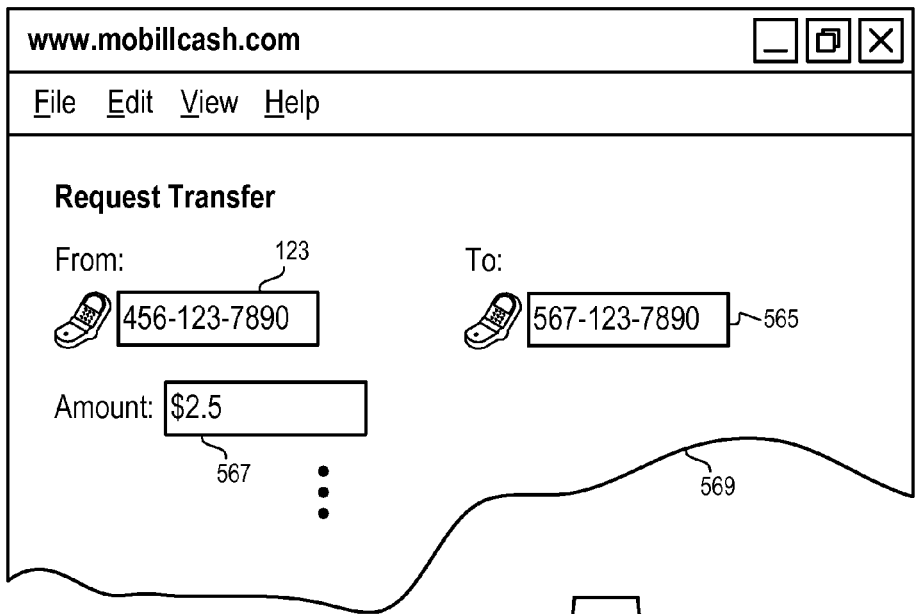

FIGS. 41-43 illustrate user interfaces to send funds to a phone number according to one embodiment.

In FIG. 41, a mobile phone (117) sends a text message to the interchange (101) to request the interchange (101) to transfer money from a funding source of the mobile phone (117) to a phone number (565) identified in the text message. In FIG. 41, the text message further specifies the amount (567) of money that is to be transferred. In one embodiment, the text message is sent via SMS (or MMS).

In FIG. 41, the text message is composed as a reply to a previous text message (561) received in the mobile phone (117) from the interchange (101). Alternatively, the user may directly send the text message identifying the phone number (565) and the amount (567) to a phone number (or a short code) of the interchange (101) to make the transfer request, without having to reply to a previous text message (561) received from the interchange (101).

In one embodiment, the funding source of the mobile phone (117) is the telecommunication carrier of the mobile phone (117). For example, the interchange (101) is to send one or more premium messages (e.g., mobile terminated premium messages) to the mobile phone (117) to collect funds via the telecommunication carrier and provide the funds to the phone number (565). For example, in one embodiment, the mobile phone (117) is to transmit one or more premium messages (e.g., mobile originated premium messages) to the interchange (101) to provide funds to the interchange (101) for delivery to the phone number (565). In one example, the interchange (101) is to collect the funds via the telecommunication carrier of the mobile phone (117) using operator billing.

In one embodiment, the interchange (101) identifies the phone number (123) of the mobile phone (117) from the text message that identifies the phone number (565) and the amount (567). The phone number (123) is associated with account information (121) that identifies additional funding sources, such as a credit account, a debit account, a prepaid account, a bank account, a checking account, a payment intermediary service account, etc.

When the phone number (123) is associated with multiple funding sources, the text message may further include an indication of a particular funding source from which the money is to be transferred. In one embodiment, the user information (129) includes a preference setting indicating the default funding source, which is used when the text message does not identify a particular one of the funding sources associated with the phone number (123).

In one embodiment, the interchange (101) is to transmit a confirmation message to the mobile phone (117) and request the user of the mobile phone (123) to confirm the request via selecting a funding source from the plurality of funding sources associated with the phone number (123) of the mobile phone (117).

In one embodiment, the interchange (101) is to authenticate the requester via a password or a PIN. The interchange (101) is to obtain the funds from the funding source after the requester and/or the sender is authenticated.

FIG. 41 illustrates an example in which the request is sent from the mobile phone (117) of the sender. In another embodiment, the mobile phone (117) is to send a message to the interchange (101) to request funds to be sent from a phone number specified in the message. For example, in one embodiment, the interchange (101) has at least two phone numbers (or short codes) to receive requests: a first phone number to receive requests for sending money from the mobile phone (117) to the phone number (565) identified in the message, and a second phone number to receive requests for receiving money at the mobile phone (117) to the phone number (565) identified in the message. If the message is received at the first phone number, the mobile phone (117) is to provide funds and the phone number (565) is to receive the funds; and if the message is received at the second phone number, the user of the phone number (565) is to provide the funds and the mobile phone (117) is to receive the funds. In some embodiments, the message is to include an indication of whether the phone number (565) specified in the message is a sender or a recipient of the transfer.

When the mobile phone (117) is used to request funds to be sent from the phone number (565), the interchange (101) is to transmit a message to the phone number (565) to request authorization, before initiating the transaction.

FIG. 42 illustrates an example of using a mobile application running inside the mobile phone (117) to request the interchange (101) to send money from a funding source associated with the mobile phone (117) to the phone number (565) specified in the request. In one embodiment, the mobile application communicates with the interchange (101) via a data communication channel using Internet Protocol. In one embodiment, the mobile application communicates with the interchange (101) via Hypertext Transfer Protocol (HTTP). In one embodiment, the mobile application is implemented via a browser running on the mobile phone (117). In one embodiment, the mobile application is implemented outside the browser application on the mobile phone (117).

In one embodiment, the request sent to the interchange (101) from the mobile application running inside the mobile phone (117) includes an identification of the mobile phone (117) (e.g., MSISDN or the phone number (123)).

In one embodiment, the mobile application includes a field (566) to receive the PIN for the authentication of the requester, when the mobile application is used to send money from a funding source associated with the mobile phone (117).

In one embodiment, the mobile application includes an option that allows the user to indicate whether the phone number (565) is to receive funds or to provide funds. In one embodiment, a separate mobile application on the mobile phone (117) allows the user to request funds to be sent to the mobile phone (117).

In one embodiment, the interchange (101) provides a web portal to allow a user to use a form illustrated in FIG. 43 to request sending money from a source phone number (123) to a destination phone number (565). For example, a user terminal (111) running a web browser can access a webpage (569) on the web portal of the interchange (101) to identify the source phone number (123), the destination phone number (565) and the amount (567) to be sent from the source phone number (123) (or to be received in the destination phone number (565)).

In one embodiment, the webpage (569) further includes options (e.g., 205, 185) to specify account information of a funding source of the request, as in FIGS. 7 and 8, when the requester is the sender.

In one embodiment, when the requester is the sender, the webpage further includes fields to authenticate the user via a password or PIN, as illustrated in FIG. 22.

In one embodiment, the interchange (101) is to communicate with the mobile phone (117) identified by the source phone number (123) to confirm the request. For example, the interchange (101) is to transmit a message to the mobile phone (117) at the source phone number (123) to request a confirmation reply form the mobile phone (117). For example, in one embodiment, the interchange (101) is to provide a one time code as a response to the request received via the webpage (569) and request the requester to provide the one time code back to the interchange (101) via the mobile phone (117) at the source phone number (123). For example, in one embodiment, the interchange (101) is to provide a one time code to the mobile phone (117) at the source phone number (123) and request the one time code back at the web portal to confirm the request.

In one embodiment, the one time code based on the confirmation is combined with a password/PIN based authentication process to approve the request.

In one embodiment, the request can also be made directly to the interchange (101) via other communication channels, such as email, instant message, voice portal, customer representatives, etc. For example, the requester may call a phone number of the interchange (101) to interact via an interactive voice response (IVR) system to specify the request, or to provide the request to a live customer representative.

Figure 44:
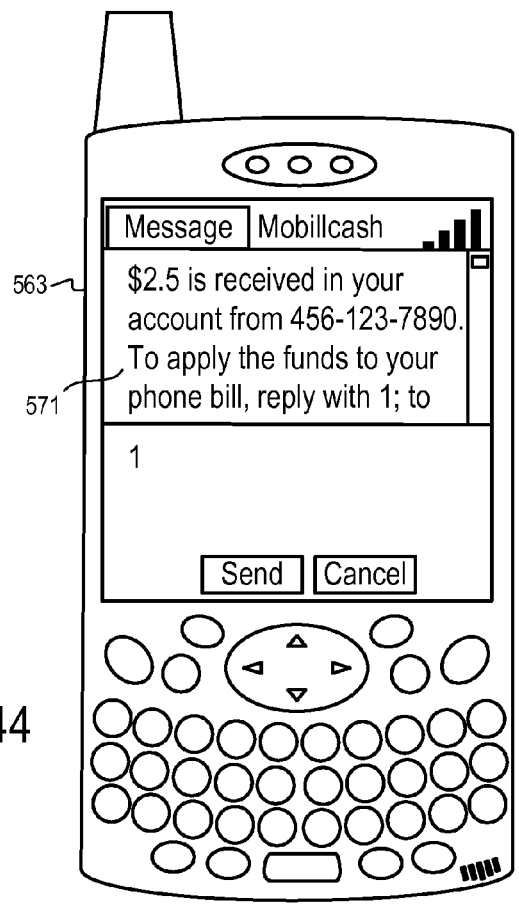
FIG. 44 illustrates a user interface to receive funds according to one embodiment.

FIG. 44 illustrates a user interface to receive funds according to one embodiment. After the request to provide funds to a mobile phone (563) at the destination phone number (565) is confirmed and/or approved, the interchange (101) is to obtain funds from the funding source associated with the source phone number (123) and provide the funds to the destination phone number (565).

In one embodiment, the interchange (101) is to send a text message (571) to the mobile phone (563) at the destination phone number (565). The text message (571) informs the user of the mobile phone (563) about the availability of the funds sent from the source phone number (123).

In one embodiment, the text message (571) provides a list of options, such as an option to apply the funds to the phone bill of the mobile phone (563), or an option to transfer the funds to an account associated with the destination phone number (565) in the data storage facility (107) of the interchange (101), such as a credit card account, a debit card account, a bank account, a checking account, a payment intermediary account identified by an email, etc. In one embodiment, the user can reply to the text message (571) with an indication of the selected option to instruct the interchange (101) to perform the operations associated with the selected option.

For example, in one embodiment, when the user selects the option to apply the funds to the phone bill of the mobile phone (563), the interchange (101) is to transmit one or more premium message to the destination phone number (565) to provide the funds to the mobile phone account of the mobile phone (563). Alternatively, the interchange (101) may provide the funds to the mobile phone account via operator billing.

In one embodiment, the interchange (101) is to store data representing the funds in association with the destination phone number (565) in the data storage facility (107), in a way similar to refunds provided to the phone number (123) as illustrated in FIG. 36.

In one embodiment, the interchange (101) is to generate a code to represent the funds; and the text message (563) notifying the user of the funds is to include the code. In one embodiment, the code is constructed in a way similar to the code that represents the refunds or coupons discussed above. In one embodiment, the code is a one time code; and a possessor of the code can use the funds associated with the code to make a purchase, to make a deposit to an account hosted on the interchange (101), or to transfer the funds to an account hosted on a separate platform, such as a bank account, a credit card, a debit card, etc. For example, the user may send a text message including the code to confirm a payment request to cause the funds represented by the code to be applied toward the payment. For example, the user may send a text message including the code to a friend, a family member, a charity, or other entities, to provide the funds. For example, the user may send a text message including the code to the interchange (101) from the mobile phone (563) to deposit the funds into an account associated with the mobile phone (563).

Figure 45:
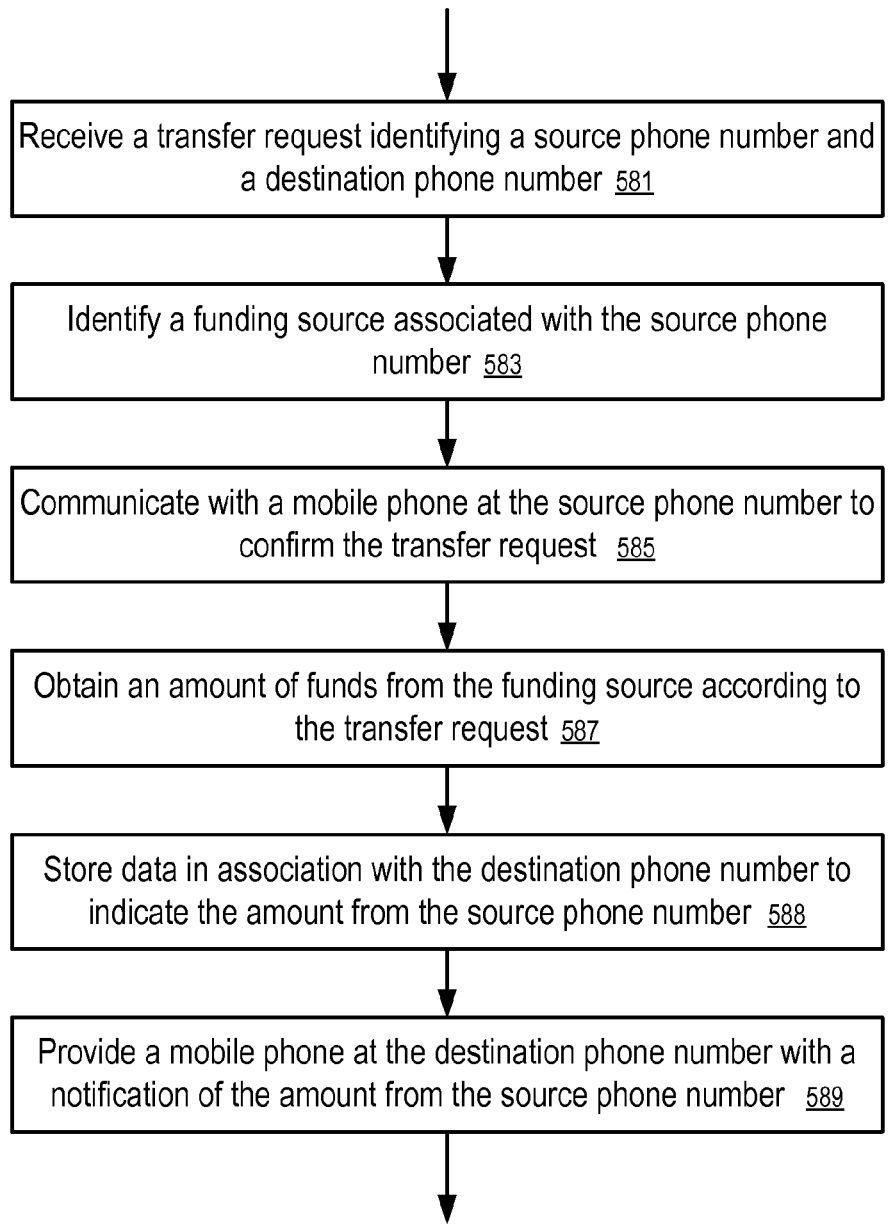
FIG. 45 shows a method to provide funds to a mobile phone according to one embodiment.

FIG. 45 shows a method to provide funds to a mobile phone according to one embodiment. In FIG. 45, the interchange (101) is to receive (581) a transfer request identifying a source phone number (123) and a destination phone number (565) and identify (583) a funding source associated with the source phone number (123). The interchange (101) is to communicate (585) with a mobile phone (117) at the source phone number (123) to confirm the transfer request. After the request is confirmed, the interchange (101) is to obtain (587) an amount (567) of funds from the funding source according to the transfer request, store (588) data in association with the destination phone number (565) to indicate the amount (567) from the source phone number (123) and to provide (589) a mobile phone (563) at the destination phone number (565) with a notification message (571) about the amount (567) from the source phone number (123).

In one embodiment, the interchange (101) is to communicate with the mobile phone (117) at the source phone number (123) to confirm the transfer request, if the request is not from the mobile phone (117). In one embodiment, a fee is charged for the transfer; and the amount that is deducted from an account associated with the source phone number (123) is greater than the amount that is provided to an account associated with the destination phone number (565).

In one embodiment, an indication of the funding source is received together with the confirmation from the mobile phone (117) at the source phone number (123).

In one embodiment, the confirmation further includes an indication of the amount (567) from the mobile phone (117) at the source phone number (123). In one embodiment, the transfer request also identifies the amount (567); and the interchange (101) is to confirm the request based at least in part on matching the indication of the amount (567) received in the confirmation from the mobile phone (117) at the source phone number (123) and the amount (567) identified in the request.

In one embodiment, the interchange (101) is to determine whether the request is received from a device separate from the mobile phone (117) at the source phone number (123). In one embodiment, the interchange (101) is to use a password or a PIN to determine whether the request is from an authorized user of the mobile phone (117). When the interchange (101) fails to positively associate the request with the mobile phone (117), the interchange (101) is to request a confirmation via communications with the mobile phone (117) at the source phone number (123).

In one embodiment, the transfer request is received from a mobile phone (563) at the destination phone number (565) via one of: a short message service (SMS), a mobile application, a web browser, and a voice portal. In another embodiment, the transfer request is received from a mobile phone (117) at the source phone number (123) via one of: a short message service (SMS), a mobile application, a web browser, and a voice portal.

In one embodiment, when the interchange (101) receives a payment request identifying the destination phone number (565), the interchange (101) is to communicate with the mobile phone (563) at the destination phone number (565) to confirm the payment request and then apply at least a portion of the amount (567) of funds towards the payment request.

In one embodiment, the funding source is a telecommunications carrier of a mobile phone (117) at the source phone number (123); and the interchange (101) is to obtain the funds via transmitting one or more premium messages to the mobile phone (117) at the source phone number (123) to cause the telecommunications carrier to charge the mobile phone (117) and provide the amount (567) of funds to the interchange (101). Alternatively, the funding source may be an account, such as a credit card account, a debit card account, a prepaid card account, a bank account, a checking account, or a stored value account.

In one embodiment, when the interchange (101) receives a reply from the mobile phone (563) to the notification message (571), the interchange (101) is to send one or more premium messages to the mobile phone (563) at the destination phone number (565) to provide funds to a user of the mobile phone (563) via a telecommunications carrier of the mobile phone (563).

In one embodiment, when the interchange (101) receives a reply from the mobile phone (563) to the notification message (571), the interchange (101) is to provide the amount (567) of funds to a destination account associated with the destination phone number (565) in the data storage facility (107) of the interchange (101), such as a credit card account, a debit card account, a prepaid card account, a bank account, a checking account, or a stored value account identified by an email address.

In one embodiment, the destination account is specified via the reply to the notification message (571); and the interchange (101) is to further store in the data storage facility (107) data associating the destination account with the destination phone number (565) in response to the reply to the notification message (571), in the same way the account information (121) is associated with phone number (123) in FIG. 1.

In one embodiment, the interchange (101) is to generate a code to represent the amount (567) of funds; and the message to the mobile phone (563) at the destination phone number (565) includes the code. In one embodiment, the amount of funds is transferable to a user of a third mobile phone via communicating the code to the third mobile phone. For example, in one embodiment, when the interchange (101) receives a payment request from the third mobile phone, where the payment request contains the code, the interchange (101) is to fulfill the payment request on behalf of the user of the third mobile phone using at least a portion of funds represented by the code.

In one embodiment, the interchange (101) is to determine the country and the carrier of a mobile phone (117) without requiring the user to specify this information at the time of payment. The interchange (101) is to look up the carrier information from a third party database, or a database established and maintained by the interchange (101), based on prior responses received from the mobile phone (117). In one embodiment, the interchange (101) is to dynamically determine the carrier information by requesting a response from the mobile phone (117) first, and then determine the country and carrier based on the received response. In one embodiment, the request is sent via a web page.

Figure 46:
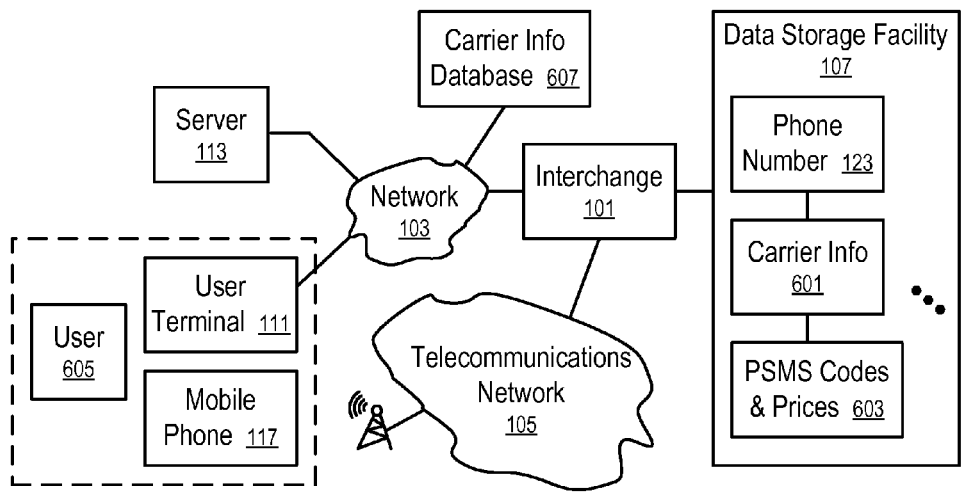
FIG. 46 shows a system to determine carrier information to collect funds via premium messages according to one embodiment.

FIG. 46 shows a system to determine carrier information to collect funds via premium messages according to one embodiment.

In FIG. 46, a user (605) uses a user terminal (111) to interact with the server (113) of a merchant and/or the interchange (101) over the network (103). To make a payment for a purchase from the merchant, the user (605) may use the user terminal (111) to present the phone number (123) of the mobile phone (117) to the merchant and/or the interchange (101) as a way to make payment.

In one embodiment, the user terminal (111) and the mobile phone (117) are separate devices. In response to the payment request identifying the phone number (123), the interchange (101) is to identify carrier information (601) associated with the phone number (123).

In one embodiment, the interchange (101) uses a third party carrier information database (607) to look up the carrier information (601) associated with the phone number (123) of the mobile phone (117). For example, the interchange (101) may submit a query to the carrier information database (607) over the network (103); the query identifies the phone number (123) to request corresponding carrier information (601); and the carrier information database (607) is to look up the carrier information (601) of the phone number (123) and provide the carrier information (601) to the interchange (101) over the network (103), as a response to the received query. The interchange (101) is to then store data associating the carrier information (601) with the phone number (123) in the data storage facility of the interchange (101) for subsequent use.

In one embodiment, the carrier information (601) includes the identification of the telecommunication carrier of the mobile phone (117). Different telecommunication carriers may have different price structures for premium messages. In one embodiment, the data storage facility (107) stores data associating the carrier information (601) with the corresponding premium SMS (PSMS) codes and prices (603).

In one embodiment, each PSMS code is associated with a predetermined price. The telecommunication carrier is to charge a recipient receiving a premium message that contains a PSMS code a fee according to the predetermined price associated with the PSMS code, and provide a portion of the collected fee to the sender of the premium message. Based on the PSMS codes and prices (603), the common format processor (133) of the interchange (101) is to generate a set of premium messages, each having one PSMS code, with a total price of the premium messages matching the amount to be paid to the merchant in accordance with the payment request received from the user terminal (111).

In one embodiment, the common format processor (133) of the interchange (101) is to also use the carrier information (601) to select an appropriate and/or optimal converter from the set of converters (131) that are configured to interface with different controllers (115) of mobile communications.

In one embodiment, the interchange (101) is configured to ping the phone number (123) via the telecommunications network (105) to identify the carrier information (601).

In one embodiment, the interchange (101) is configured to ping the phone number (123) to determine the cellular base station with which the mobile phone (117) is in contact; and determine the carrier information (601) from the pinging process to determine the cellular base station.

In one embodiment, the interchange (101) is to transmit a message in the telecommunications network (105) in an attempt to make a connection to or reach the mobile phone (117) at the phone number (123). A response to the message is used to determine the carrier information (601). In one embodiment, the response is obtained from the telecommunications network (105) without actually establishing a phone connection with the mobile phone (117).

In one embodiment, the user (605) is required to transmit a message from the mobile phone (117) to confirm the payment transaction; and the message from the mobile phone (117) is used to identifier the carrier information (601).

For example, in one embodiment, the interchange (101) may provide a code to the user terminal (111) and request the user (605) to provide the code back to the interchange (101) via the mobile phone (117) at the phone number (123). When the correct code is received back from the mobile phone (117) via the telecommunications network (105), the request to pay via the phone number (123) is confirmed; and the carrier information (601) is derived from the confirmation communications from the mobile phone (117).

In one embodiment, the mobile phone (117) is to provide the code back to the interchange (101) via a web page, or a WAP application. The interchange (101) is to determine the carrier information (601) based on the routing information of the web communications of a message received from the mobile phone (117).

In one embodiment, the mobile phone (117) is to provide the code back to the interchange (101) via an SMS message; and the interchange (101) is to determine the carrier information (601) from the incoming SMS message.

Figure 47:
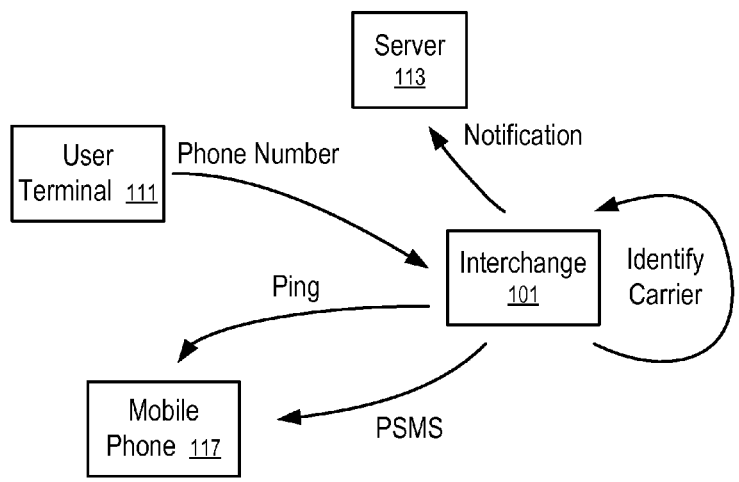
FIG. 47 illustrates a method to collect funds to make a payment according to one embodiment.

FIG. 47 illustrates a method to collect funds to make a payment according to one embodiment. In FIG. 47, the interchange (101) is to receive a phone number (123) from a user terminal (111) to process a payment request. In response, the interchange (101) is to ping the mobile phone (117) at the phone number (123) and identify the carrier of the mobile phone (117) through the pinging operation. After the carrier of the mobile phone (117) at the phone number (123) is determined, the interchange is to generate premium messages based on the predetermined set of PSMS codes and prices (603) of the carrier, and transmit the premium messages to the mobile phone (117) via the carrier. The carrier of the mobile phone (117) is to charge the user of the mobile phone (117) to collect funds from the interchange (101), in accordance with predefined PSMS services.

In one embodiment, when the interchange (101) is notified of the delivery of the premium messages to the mobile phone (117) at the phone number (123), the interchange (101) provides a notification message to the server (113) of the merchant to indicate that the payment has been processed and the merchant may release the product or service to the user (605).

In one embodiment, in response to the notification message, the merchant (113) is to release the product or service prior to the interchange (101) receiving the funds from the telecommunication carrier.

Figure 48:
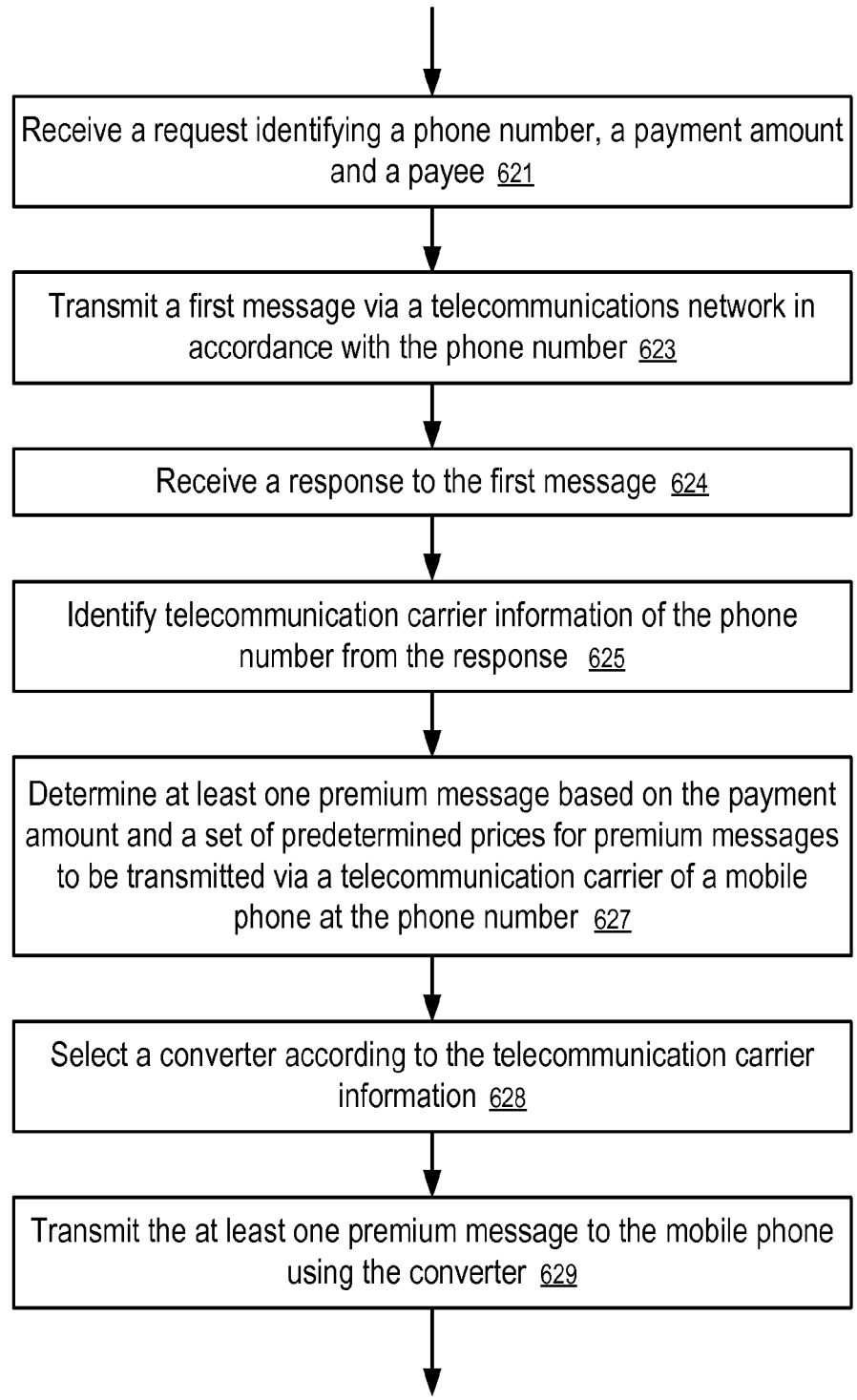
FIG. 48 shows a method to transmit premium messages according to one embodiment.

FIG. 48 shows a method to transmit premium messages according to one embodiment. In FIG. 48, the a request identifying a phone number (123), a payment amount and a payee is received (621) in an interchange (101). In response, the interchange (101) is to transmit (623) a first message via a telecommunications network (105) in accordance with the phone number (123), receive (624) a response to the first message, and identify (625) telecommunication carrier information (601) of the phone number (123) from the response.

In one embodiment, the common format processor (133) of the interchange (101) is to determine (627) at least one premium message based on the payment amount and a set of predetermined prices for premium messages to be transmitted via a telecommunication carrier of a mobile phone (117) at the phone number (123), select (628) a converter (131) according to the telecommunication carrier information, and transmit (629) the at least one premium message to the mobile phone (117) using the converter (131).

In one embodiment, the interchange (101) is to identify the set of predetermined prices (603) and/or select the converter (131) based on the telecommunication carrier information (601).

In one embodiment, the interchange (101) is use the converter (131) to transmit a text message requesting a confirmation of a payment to the payee; and the transmitting (629) of the at least one premium message is in response to a confirmation response from the user (605) of the mobile phone (117). In one embodiment, the confirmation response includes a text message from the mobile phone (117) at the phone number (123).

In one embodiment, the interchange (101) is to determine whether the confirmation response comprises a code provided in the text message requesting the confirmation; and the transmitting (629) of the at least one premium message is in response to a determination that the confirmation response includes a code provided in the text message requesting the confirmation.

In one embodiment, the common format processor (133) of the interchange (101) is to generate the at least one premium message based on the telecommunication carrier information (601).

In one embodiment, the transmitting (623) of the first message includes a message to initiate a phone call to the phone number (123), or a pinging message in a telephone communications network. In one embodiment, the response to the first message is received (624) from a telecommunications network (105) without an input from the user (605).

In one embodiment, the first message transmitted (623) in the telecommunications network (105) includes a text message destined to the phone number (123). The text message identifies the request received (621) in the interchange (101); and the response received (624) in response to the first message includes a confirmation from the user (605) to make the payment. In one embodiment, the response received (624) is a message transmitted from the mobile phone (117) via short message service (SMS).

In one embodiment, the interchange (101) is to present a user interface to the user (605) to receive (621) the payment request identifying the phone number (123); and the request received in the interchange (101) does not identify the telecommunication carrier information (601). In one embodiment, the user interface is provided via a web page rendered in a web browser of the user (605), as illustrated in FIGS. 8 and 43.

In one embodiment, the web page is presented in response to a web request redirected from a merchant requesting a payment from the user (605); and the interchange (101) is to use the funds to fulfill the payment on behalf of the user (605).

In one embodiment, the interchange (101) is to store in a database (e.g., data storage facility (107)) the telecommunication carrier information (601) for the phone number (123).

Different methods to determine carrier information are combined. For example, if the interchange (101) determines that the data storage facility (107) has carrier information (601) for the phone number (123), the interchange (101) may skip pinging the mobile phone (117). For example, if the interchange (101) determines that the data storage facility (107) does not have carrier information (601) for the phone number (123), or the data storage facility (107) has carrier information (601) that may be out of date, the interchange (101) may ping the mobile phone (117) and/or query the carrier information database (607).

Figure 49:
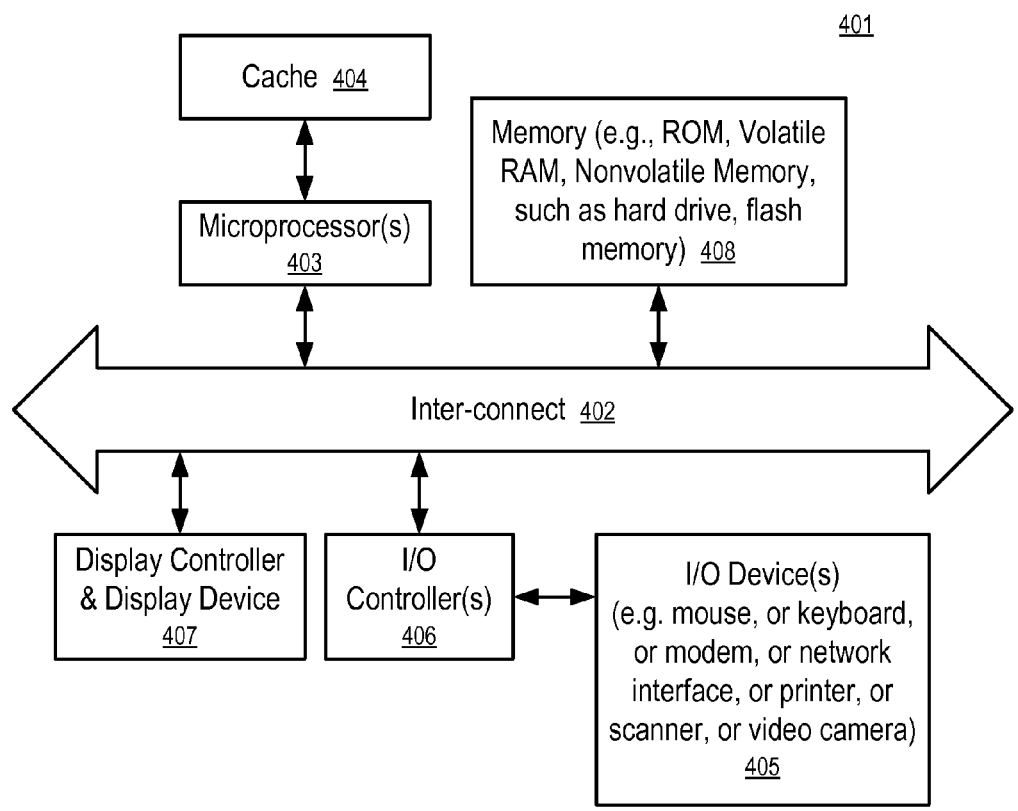
FIG. 49 shows a data processing system, which can be used in various embodiments.

FIG. 49 shows a data processing system, which can be used in various embodiments. While FIG. 49 illustrates various components of a computer system, it is not intended to represent any particular architecture or manner of interconnecting the components. Some embodiments may use other systems that have fewer or more components than those shown in FIG. 49.

In one embodiment, each of the interchange (101), the data storage facility (107), the controllers (115), the mobile phones (117), the user terminals (111), the account server (125) and the servers (113) can be implemented as a data processing system, with fewer or more components, as illustrated in FIG. 49.

In FIG. 49, the data processing system (401) includes an inter-connect (402) (e.g., bus and system core logic), which interconnects a microprocessor(s) (403) and memory (408). The microprocessor (403) is coupled to cache memory (404) in the example of FIG. 49.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed:

1. A method, comprising:
storing, in a data storage facility of an interchange telecommunication carrier, information for each of a plurality of phone numbers;
receiving, in the interchange, a request identifying a phone number, a payment amount and a payee;
in response to the request, determining whether the phone number received in the request matches a phone number in the data storage facility having telecommunication carrier information;
if the phone number does not have telecommunication carrier information in the data storage facility, transmitting from the common format processor a pinging message in accordance with the phone number;
receiving, at the interchange, a response to the pinging message;
identifying from the response, by the interchange, telecommunication carrier information of the phone number;
if the phone number does have telecommunication carrier information in the data storage facility then skipping the transmission of the pinging message;
preparing at least one charging message based on the payment amount to be transmitted via a telecommunication carrier of a mobile phone at the phone number identified in the response or the data storage facility; and
transmitting, from the interchange, the at least one charging message to the mobile phone using the telecommunication carrier information, wherein the telecommunication carrier of the mobile phone is to collect funds from a user of the mobile phone according to at least the payment amount and to provide the at least a portion of the funds to the interchange, wherein the interchange is to pay the at least a portion of amount to the payee in accordance with the request.

2. The method of claim 1, further comprising:
identifying a set of predetermined prices based on the telecommunication carrier information; and
determining at least one premium message based on the payment amount and a set of predetermined prices for premium messages, the at least one charging message being the at least one premium message.

3. The method of claim 2, wherein the interchange including a common format processor and a plurality of converters to interface with a plurality of controllers, the converters configured to communicate with the controllers in different formats, the converters to communicate with the common format processor in a common format, further comprising:
selecting the first converter based on the telecommunication carrier information, the premium message being transmitted using a first converter of the converters according to the telecommunication carrier information.

4. The method of claim 3, further comprising:
transmitting, using the first converter, a text message requesting a confirmation of a payment to the payee;
wherein the transmitting of the at least one premium message is in response to a confirmation response from the user.

5. The method of claim 4, wherein the confirmation response comprises a text message from the mobile phone at the phone number.

6. The method of claim 4, further comprising:
determining whether the confirmation response comprises a code provided in the text message requesting the confirmation;
wherein the transmitting of the at least one premium message is in response to a determination that the confirmation response comprises a code provided in the text message requesting the confirmation.

7. The method of claim 1, further comprising:
determining at least one premium message based on the payment amount and a set of predetermined prices for premium messages, the at least one premium message being based on the telecommunication carrier information, the at least one charging message being the at least one premium message.

8. The method of claim 1, wherein the transmitting of the pinging message comprises a message to initiate a phone call to the phone number.

9. The method of claim 1, wherein the response to the pinging message is received from a telecommunications network without an input from the user.

10. The method of claim 1, wherein the pinging message comprises a text message destined to the phone number.

11. The method of claim 10, wherein the text message identifies the request; and the response comprises a confirmation from the user to make the payment.

12. The method of claim 11, wherein the response comprises a message transmitted from the mobile phone via short message service (SMS).

13. The method of claim 1, further comprising:
presenting a user interface to the user to receive the request identifying the phone number, wherein the request does not identify the telecommunication carrier information.

14. The method of claim 13, wherein the user interface is provided via a web page rendered in a web browser of the user.

15. The method of claim 14, wherein the web page is presented in response to a web request redirected from a merchant requesting a payment from the user; and the interchange is to use the funds to fulfill the payment on behalf of the user.

16. The method of claim 1, further comprising:
storing in a database the telecommunication carrier information for the phone number after determining the telecommunication carrier information from the first message.

17. The method of claim 1, further comprising:
receiving, in the interchange, a second request identifying a second phone number;
querying a database to identify second telecommunication carrier information of the second phone number; and
transmitting at least one charging message to the mobile phone according to the second telecommunication carrier information.

18. A computer-readable storage medium storing instructions, the instructions causing a computer to perform a method, the method comprising:
storing, in a data storage facility of an interchange telecommunication carrier, information for each of a plurality of phone numbers;
receiving, in the interchange, a request identifying a phone number, a payment amount and a payee;
in response to the request, determining whether the phone number received in the request matches a phone number in the data storage facility having telecommunication carrier information;

if the phone number does not have telecommunication carrier information in the data storage facility, transmitting from the common format processor a pinging message in accordance with the phone number;

receiving, at the interchange, a response to the pinging message;

identifying from the response, by the interchange, telecommunication carrier information of the phone number;

if the phone number does have telecommunication carrier information in the data storage facility then skipping the transmission of the pinging message;

preparing at least one charging message based on the payment amount to be transmitted via a telecommunication carrier of a mobile phone at the phone number identified in the response or the data storage facility; and transmitting, from the interchange, the at least one charging message to the mobile phone using the telecommunication carrier information, wherein the telecommunication carrier of the mobile phone is to collect funds from a user of the mobile phone according to at least the payment amount and to provide the at least a portion of the funds to the interchange, wherein the interchange is to pay the at least a portion of amount to the payee in accordance with the request.

19. A system, comprising:

a data storage facility; and an interchange coupled with the data storage facility; telecommunication carrier information for each of a plurality of phone numbers stored in the data storage facility;

wherein in response to a request identifying a phone number, a payment amount and a payee, the interchange is to determine whether the phone number received in the request matches a phone number in the data storage facility having telecommunication carrier information;

if the phone number does not have telecommunication carrier information in the data storage facility, transmit a pinging message to the phone number;

receive a response to the pinging message and identify telecommunication carrier information of the phone number from the response;

select a first converter from the converters based on the telecommunication carrier information associated with the phone number;

prepare at least one charging message based on the payment amount to be transmitted via a telecommunication carrier of a mobile phone at the phone number identified in the response or the data storage facility; and transmit the at least one charging message to the mobile phone using the telecommunication carrier of the mobile phone to collect funds from a user of the mobile phone according to at least the payment amount and to provide the at least a portion of the funds to the interchange, wherein the interchange is to pay at least a portion of the amount to the payee in accordance with the request.

* * * * *